(12) United States Patent
Farb

(10) Patent No.: US 12,228,105 B2
(45) Date of Patent: Feb. 18, 2025

(54) FLAT ROOF GREEN ENERGY SUPPORT STRUCTURE

(71) Applicant: FLOWER TURBINES, INC., Lawrence, NY (US)

(72) Inventor: Mark Daniel Farb, Lawrence, NY (US)

(73) Assignee: Flower Turbines, Inc., Lawrence, NY (US)

( * ) Notice: Subject to any disclaimer, the term of this patent is extended or adjusted under 35 U.S.C. 154(b) by 0 days.

(21) Appl. No.: 18/669,782

(22) Filed: May 21, 2024

(65) Prior Publication Data

US 2024/0337252 A1    Oct. 10, 2024

Related U.S. Application Data

(63) Continuation of application No. PCT/US2024/023527, filed on Apr. 8, 2024.
(Continued)

(51) Int. Cl.
*F03D 1/02* (2006.01)
*B60L 53/30* (2019.01)
(Continued)

(52) U.S. Cl.
CPC .............. *F03D 1/02* (2013.01); *B60L 53/30* (2019.02); *B60L 53/51* (2019.02); *B60L 53/52* (2019.02); *B60L 53/53* (2019.02); *F03D 3/005* (2013.01); *F03D 9/007* (2013.01); *F03D 9/25* (2016.05); *F03D 13/20* (2016.05); *F21S 9/026* (2013.01); *F21S 9/035* (2013.01); *H02J 7/0042* (2013.01); *H02J 7/1415* (2013.01); *H02J 7/143* (2020.01);
(Continued)

(58) Field of Classification Search
CPC .......... F03D 13/20; F03D 9/007; H02S 10/12; H02S 20/24; F05B 2200/708; F05B 2240/9112; F24S 25/00; F24S 25/10; F24S 25/30; F24S 25/35; Y02B 10/10
USPC ............. 248/237, 188.1, 678, 519, 148, 910
See application file for complete search history.

(56) References Cited

U.S. PATENT DOCUMENTS

| 1,352,952 A | 9/1920 | Gracey |
| 1,581,537 A | 4/1926 | Hennigh |
(Continued)

FOREIGN PATENT DOCUMENTS

| CA | 2800765 A1 | 12/2010 |
| CN | 2409347 Y | 12/2000 |
(Continued)

OTHER PUBLICATIONS

International Search Report and Written Opinion for International Application No. PCT/US2022/082035 dated Mar. 28, 2023 (8 pages).
(Continued)

*Primary Examiner* — Anita M King
(74) *Attorney, Agent, or Firm* — Finnegan, Henderson, Farabow, Garrett & Dunner LLP

(57) ABSTRACT

An apparatus for mounting green energy sources on a flat roof, includes multiple roof trusses for mounting atop the roof. The roof trusses support beams on which wind turbines are mounted. The roof trusses are secured to the roof with weighted bases. In addition to supporting wind turbines, the roof trusses may also support solar panels angled relative to a pitch of the roof.

21 Claims, 32 Drawing Sheets

Related U.S. Application Data

(60) Provisional application No. 63/503,549, filed on May 22, 2023, provisional application No. 63/495,097, filed on Apr. 9, 2023.

(51) Int. Cl.

| | | |
|---|---|---|
| *B60L 53/51* | (2019.01) | |
| *B60L 53/52* | (2019.01) | |
| *B60L 53/53* | (2019.01) | |
| *F03D 3/00* | (2006.01) | |
| *F03D 9/00* | (2016.01) | |
| *F03D 9/25* | (2016.01) | |
| *F03D 13/20* | (2016.01) | |
| *F21S 9/02* | (2006.01) | |
| *F21S 9/03* | (2006.01) | |
| *H02J 7/00* | (2006.01) | |
| *H02J 7/14* | (2006.01) | |
| *H02J 7/34* | (2006.01) | |
| *H02J 7/35* | (2006.01) | |
| *H02S 10/12* | (2014.01) | |
| *H02S 20/20* | (2014.01) | |
| *H02S 20/24* | (2014.01) | |
| *H04N 7/18* | (2006.01) | |

(52) U.S. Cl.
CPC ............ *H02J 7/1438* (2013.01); *H02J 7/342* (2020.01); *H02J 7/35* (2013.01); *H02S 10/12* (2014.12); *H02S 20/20* (2014.12); *H02S 20/24* (2014.12); *H04N 7/18* (2013.01); *B60L 2200/12* (2013.01); *F05B 2220/708* (2013.01); *F05B 2240/14* (2013.01); *F05B 2240/9112* (2013.01); *H02J 2300/24* (2020.01); *H02J 2300/28* (2020.01)

(56) References Cited

U.S. PATENT DOCUMENTS

| | | | |
|---|---|---|---|
| 4,036,360 A | 7/1977 | Deffeyes | |
| 4,714,225 A * | 12/1987 | Skinner .................. | E04H 12/22 248/533 |
| 4,973,219 A | 11/1990 | Brickner et al. | |
| 5,044,878 A | 9/1991 | Wilhelm | |
| 5,143,170 A | 9/1992 | Hunt et al. | |
| 5,624,006 A | 4/1997 | Richardson, Jr. | |
| 5,798,631 A | 8/1998 | Spee | |
| 6,784,566 B2 | 8/2004 | Thomas | |
| 6,824,073 B1 | 11/2004 | Haney | |
| 7,592,537 B1 | 9/2009 | West | |
| 7,679,207 B2 | 3/2010 | Cory | |
| 7,891,573 B2 | 2/2011 | Finkam | |
| 7,902,688 B2 | 3/2011 | Krivcov | |
| 7,944,067 B2 | 5/2011 | Kammer | |
| 7,988,413 B2 | 6/2011 | Haar | |
| 8,207,623 B2 | 6/2012 | Rivas | |
| 8,333,564 B2 | 12/2012 | Krivcov | |
| 8,364,323 B2 | 1/2013 | Arinaga | |
| 8,491,262 B2 | 7/2013 | McGrath | |
| 8,648,483 B2 | 2/2014 | Haar | |
| 8,696,313 B2 | 4/2014 | Deeley | |
| 9,051,918 B1 | 6/2015 | Hench | |
| 9,127,646 B2 | 9/2015 | Cory | |
| 9,157,664 B2 * | 10/2015 | Place ..................... | F24S 25/10 |
| 9,328,717 B1 | 5/2016 | Walker | |
| 9,689,372 B2 | 6/2017 | Gonzalez | |
| 9,803,799 B1 | 10/2017 | Yang | |
| 9,835,138 B2 | 12/2017 | Westergaard | |
| 10,006,438 B2 | 6/2018 | de Boer | |
| 10,330,086 B2 | 6/2019 | Farb | |
| 10,400,746 B1 | 9/2019 | Shoffler | |
| 10,400,747 B2 | 9/2019 | D'Aix-Marseille et al. | |
| 10,605,229 B2 | 3/2020 | Zhang | |
| 10,612,519 B2 | 4/2020 | Franke et al. | |
| 10,767,630 B1 | 9/2020 | Venkitanarayanan | |
| 11,060,502 B2 | 7/2021 | Wang | |
| 11,143,164 B1 | 10/2021 | Landis | |
| 11,208,982 B2 | 12/2021 | Palamara | |
| 11,831,164 B2 | 11/2023 | Farb | |
| 11,891,980 B2 | 2/2024 | Farb | |
| 11,905,929 B2 | 2/2024 | Farb | |
| 2002/0105190 A1 | 8/2002 | Thomas | |
| 2002/0125880 A1 | 9/2002 | Murai | |
| 2004/0164561 A1 | 8/2004 | Nagawa | |
| 2005/0034937 A1 | 2/2005 | Agardy | |
| 2005/0143221 A1 | 6/2005 | Kuwahara | |
| 2006/0131889 A1 | 6/2006 | Corten | |
| 2006/0153682 A1 | 7/2006 | Vanderhye | |
| 2008/0083689 A1 | 4/2008 | Schroeder | |
| 2008/0223982 A1 | 9/2008 | Pri-Paz | |
| 2008/0284170 A1 | 11/2008 | Cory | |
| 2008/0284171 A1 | 11/2008 | Cory | |
| 2009/0040750 A1 | 2/2009 | Myer | |
| 2009/0097981 A1 | 4/2009 | Gabrys | |
| 2009/0186745 A1 | 7/2009 | Lewiston | |
| 2009/0220342 A1 | 9/2009 | Wu et al. | |
| 2009/0224556 A1 | 9/2009 | Berenda et al. | |
| 2009/0243295 A1 | 10/2009 | Kammer | |
| 2009/0267351 A1 | 10/2009 | Buns | |
| 2009/0269209 A1 | 10/2009 | Urban | |
| 2009/0278352 A1 | 11/2009 | Rivas | |
| 2010/0140939 A1 | 6/2010 | Scholte-Wassink | |
| 2010/0252706 A1 | 10/2010 | Hargis | |
| 2011/0037269 A1 | 2/2011 | Poon et al. | |
| 2011/0089701 A1 | 4/2011 | Blake | |
| 2011/0111700 A1 | 5/2011 | Hacket | |
| 2011/0164977 A1 | 7/2011 | Vallejo | |
| 2011/0215640 A1 | 9/2011 | Donnelly | |
| 2011/0302864 A1 | 12/2011 | Ramsay | |
| 2011/0304150 A1 | 12/2011 | Hara | |
| 2011/0311364 A1 | 12/2011 | Conner | |
| 2012/0056424 A1 | 3/2012 | Holstein | |
| 2012/0169052 A1 | 7/2012 | Leipold-Buettner | |
| 2012/0175879 A1 | 7/2012 | Keech | |
| 2012/0187695 A1 | 7/2012 | Desplats | |
| 2012/0189448 A1 | 7/2012 | Jaquier | |
| 2012/0217824 A1 | 8/2012 | Gupta | |
| 2012/0265356 A1 | 10/2012 | Yasugi | |
| 2013/0008242 A1 | 1/2013 | Sakaguchi | |
| 2013/0114312 A1 | 5/2013 | Reichard | |
| 2013/0197704 A1 | 8/2013 | Pan | |
| 2013/0207624 A1 | 8/2013 | Aaltonen | |
| 2013/0219812 A1 | 8/2013 | Goodman et al. | |
| 2013/0313827 A1 | 11/2013 | Lovmand et al. | |
| 2013/0333689 A1 * | 12/2013 | Umemoto ............... | F24S 30/45 126/600 |
| 2014/0010656 A1 | 1/2014 | Nies | |
| 2014/0145550 A1 | 5/2014 | Hitchcock | |
| 2014/0150774 A1 * | 6/2014 | Chang ..................... | F24S 25/10 126/600 |
| 2014/0150843 A1 | 6/2014 | Pearce | |
| 2014/0150845 A1 * | 6/2014 | Chang .................... | F24S 30/452 136/246 |
| 2014/0234103 A1 | 8/2014 | Orbrecht | |
| 2015/0076828 A1 | 3/2015 | Palethorpe | |
| 2015/0123401 A1 | 5/2015 | Vigars | |
| 2015/0137519 A1 | 5/2015 | Tarnowski | |
| 2015/0377213 A1 | 12/2015 | Deshpande | |
| 2016/0222946 A1 | 8/2016 | Krings | |
| 2016/0312768 A1 | 10/2016 | Takakura | |
| 2016/0378085 A1 | 12/2016 | Guo | |
| 2017/0054301 A1 | 2/2017 | Fintzos | |
| 2017/0058899 A1 | 3/2017 | Ichihara | |
| 2017/0074249 A1 | 3/2017 | Smook | |
| 2017/0114778 A1 | 4/2017 | Madson | |
| 2017/0214249 A1 | 7/2017 | Seeley | |
| 2017/0298902 A1 | 10/2017 | Gdovic | |
| 2017/0324367 A1 | 11/2017 | Collins | |
| 2018/0010576 A1 | 1/2018 | Brake et al. | |
| 2018/0097360 A1 | 4/2018 | Batten | |
| 2018/0110328 A1 | 4/2018 | Mayer | |
| 2018/0142669 A1 | 5/2018 | Cho et al. | |

(56) References Cited

U.S. PATENT DOCUMENTS

| | | |
|---|---|---|
| 2018/0171972 A1 | 6/2018 | Merz et al. |
| 2018/0175661 A1 | 6/2018 | Tuerk |
| 2018/0238305 A1 | 8/2018 | McMahon |
| 2018/0301906 A1 | 10/2018 | Qureshi |
| 2018/0306169 A1 | 10/2018 | Dharmadhikari et al. |
| 2018/0340515 A1 | 11/2018 | Hitachi |
| 2019/0052206 A1 | 2/2019 | Noderer |
| 2019/0093628 A1 | 3/2019 | Lin |
| 2019/0186145 A1 | 6/2019 | Farb |
| 2019/0360469 A1 | 11/2019 | De Boer |
| 2020/0106295 A1 | 4/2020 | Trzemzalski |
| 2020/0232446 A1 | 7/2020 | Hawkins |
| 2020/0280281 A1 | 9/2020 | Vaidyanathan |
| 2021/0033062 A1 | 2/2021 | Mishra |
| 2021/0075252 A1 | 3/2021 | Caamano et al. |
| 2021/0098994 A1 | 4/2021 | White |
| 2021/0126541 A1 | 4/2021 | Zhang |
| 2021/0148330 A1 | 5/2021 | Kukkonen |
| 2021/0164442 A1 | 6/2021 | Bonfiglio |
| 2021/0262441 A1 | 8/2021 | Jacobsen |
| 2021/0262443 A1 | 8/2021 | Goldblatt |
| 2021/0301784 A1 | 9/2021 | Cory |
| 2022/0060016 A1 | 2/2022 | Mitsunaga |
| 2022/0077686 A1 | 3/2022 | Ma |
| 2022/0263457 A1 | 8/2022 | Akhavan-Tafti |
| 2022/0299959 A1 | 9/2022 | Schirmer |
| 2022/0321052 A1 | 10/2022 | Sassi |
| 2022/0407349 A1 | 12/2022 | Owens |
| 2023/0092176 A1 | 3/2023 | Ricketts |
| 2023/0141320 A1 | 5/2023 | Sepulveda Gonzalez |
| 2023/0184218 A1 | 6/2023 | Lund |
| 2023/0246584 A1 | 8/2023 | Perret |
| 2023/0250793 A1 | 8/2023 | Farb et al. |
| 2023/0250801 A1 | 8/2023 | Farb |
| 2023/0250804 A1 | 8/2023 | Farb |
| 2023/0283079 A1 | 9/2023 | Weaver |
| 2023/0323858 A1 | 10/2023 | Farb |
| 2023/0324866 A1 | 10/2023 | Farb |
| 2023/0327455 A1 | 10/2023 | Farb |
| 2023/0327456 A1 | 10/2023 | Farb |
| 2023/0340936 A1 | 10/2023 | Gaber |
| 2023/0402739 A1 | 12/2023 | Hoganson |
| 2024/0060468 A1 | 2/2024 | Abdallah |

FOREIGN PATENT DOCUMENTS

| | | |
|---|---|---|
| CN | 103683622 A | 3/2014 |
| CN | 109630360 A | 4/2019 |
| CN | 107131099 B | 11/2019 |
| CN | 113272545 A | 8/2021 |
| DE | 102018128308 A1 | 5/2020 |
| EP | 3096004 A1 | 11/2016 |
| EP | 3023636 B1 | 4/2021 |
| EP | 3885574 B1 | 2/2024 |
| ES | 2388388 A1 | 10/2012 |
| GB | 2440264 A | 1/2008 |
| JP | 2007107496 A | 4/2007 |
| KR | 20100039917 A1 | 4/2010 |
| KR | 20110008951 U | 9/2011 |
| KR | 101476673 B1 | 12/2014 |
| KR | 102060281 B1 | 12/2019 |
| RO | 130984 A2 | 3/2015 |
| RU | 2588914 C2 | 7/2016 |
| WO | 2013073930 A1 | 5/2013 |
| WO | 2013174090 A1 | 11/2013 |
| WO | 2013175035 A1 | 11/2013 |
| WO | 2018029401 A1 | 2/2019 |
| WO | 2020254161 A1 | 6/2020 |
| WO | 20200150108 A1 | 7/2020 |
| WO | 2021231485 A1 | 11/2021 |

OTHER PUBLICATIONS

"Outer Rotor Permanent Magnet Direct Drive Wind Turbin" dated XX, https://www.pengky.cn/zz-direct-drive-turbine/external-rotor-generator/external-rotor-generator.html (Last accessed May 4, 2023).

PCT International Search Report and Written Opinion mailed Jul. 28, 2023, issued in corresponding International Application No. PCT/US23/62170 (6 pgs.).

Blum, Franz, et al. "Device for providing a platform on the roof of a building", May 14, 2020, EPO, DE 102018128308-A1 (Year: 2020).

Arias, Vega Fernando etal., "Mounting for Instruments on Buildings and Method for Installing Same", Oct. 15, 2012, ES-2388388-A1 (Year: 2012).

Guetty, Richard Jean Claude, "Covering Element for Houses, Motor-Vehicles or the Like", Mar. 30, 2015, Romanian Patent Office, RO 130984A2 (Year: 2016).

Berhanu et al., "Numerical and experimental investigation of an exhaust air energy recovery Savonius wind turbine for power production," Science Direct, (2021), https://doi.org/10.1016/j.matpr.2021.02.675.

Chong et al., "Design of an exhaust air energy recovery wind turbine generator for energy conservation in commercial buildings," Science Direct, vol. 67, pp. 252-256, (2014). https://doi.org/10.1016/j.renene.2013.11.028.

Singh et al., "Recovery of Energy From Exhaust Air of Textile Industry With the Help of Vawt," International Research Journal of Engineering and Technology (IRJET), 7(3), 4820-4828, (2020).

Ismail et al., "Study on the Potentiality of Power Generations from Exhaust Air Energy Recovery Wind Turbine: A Review," Journal of Advanced Research in Fluid Mechanics and Thermal Sciences, 87(3), 148-171, (2021), https://doi.org/10.37934/arfmts.87.3.148171.

Shahid, Rehan, "Generating Electricity From Exhaust Air Using Wind Turbine", Aug. 5, 2015, Retrieved from: https://www.linkedin.com/pulse/generating-electricity-using-exhaust-air-rehan-shahid. (Year: 2015).

Daniel, Mark Farb. 2023. Leaves on a Pole. U.S. Appl. No. 29/883,242, filed Jan. 26, 2023.

Chandler D.L., "A new method boosts wind farms' energy output, without new equipment," MIT News, Aug. 22, 2022.

Francisco Haces-Fernandez, Hua Li, David Ramirez, "Improving wind farm power output through deactivating selected wind turbines, Energy Conversion and Management", vol. 187, 2019, pp. 407-422, ISSN 0196-8904.

Howland, M.F., Quesada, J.B., Martinez, J.J.P. et al. "Collective wind farm operation based on a predictive model increases utility-scale energy production." Nat Energy 7, 818-827 (2022).

Howland MF, Lele SK, Dabiri JO. "Wind farm power optimization through wake steering." Proc Natl Acad Sci U S A. Jul. 16, 2019;116(29):14495-14500. doi: 10.1073/pnas.1903680116. Epub Jul. 1, 2019. PMID: 31262816; PMCID: PMC6642370.

M. Pape and M. Kazerani, "Turbine Startup and Shutdown in Wind Farms Featuring Partial Power Processing Converters," in IEEE Open Access Journal of Power and Energy, vol. 7, pp. 254-264, 2020, doi: 10.1109/OAJPE.2020.3006352.

PCT International Search Report and Written Opinion mailed Nov. 23, 2023, issued in corresponding International Application No. PCT/US2023/065609 (17 pgs.).

Syahputra et al. "Performance Improvement for Small-Scale Wind Turbine System Based on Maximum Power Point Tracking Control." in: Energies 2019, 12(20), Oct. 17, 2019, [online] [retrieved on Dec. 27, 2023 (Dec. 27, 2023)] Retrieved from the Internet < URL: https://www.mdpi.com/1996-1073/12/20/3938 >, entire document.

International Search Report and Written Opinion for PCT/US2023/073016 dated Feb. 8, 2024, 9 pages.

"Each Wind Harvester Project in 2023 and 2024 will advance our commercialization objectives" Wind Harvest International, 2023, Inc. https://windharvest.com/about/projects/ (Last accessed on Feb. 17, 2023).

International Search Report and Written Opinion, dated Sep. 13, 2023, issued in International Patent Application No. PCT/US2023/65612 (10 pages).

(56) References Cited

OTHER PUBLICATIONS

International Search Report and Written Opinion, dated Mar. 28, 2024, issued in International Patent Application No. PCT/US2023/074425 (8 pages).
International Search Report and Written Opinion, dated Jun. 21, 2024, issued in International Patent Application No. PCT/US2024/11337.
International Search Report and Written Opinion for International Application No. PCT/US2022/082035 dated Mar. 28, 2022 (8 pages).
International Search Report and Written Opinion, dated Aug. 14, 2024, issued in International Patent Application No. PCT/US24/23527.
Chandler, David L. (2024). "MIT engineers' new theory could improve the design and operation of wind farms," MIT News on Campus and Around the World. Retrieved from https://news.mit.edu/2024/new-theory-could-improve-design-and-operation-wind-farms-0821.
Tran et al., "The aerodynamic interference effects of a floating offshore wind turbine experiencing platform pitching and yawing motions", Jun. 2014, Journal of Mechanical Science and Technology 29 (2) (2015) 549-561. (Year: 2014).
Chen et al., "Interactions between approaching flow and hydrokinetic turbines in a staggered layout", Jun. 2023, Renewable Energy 218 (2023) 119339. (Year: 2023).
Wei et al., "An experimental study on the effects of relative rotation direction on the wake interferences among tandem wind turbines", Jan. 2014, Science China Physics, Mechanics & Astronomy, May 2014 vol. 57 No. 5: 935-949. (Year: 2014).

\* cited by examiner

FLAT ROOF GREEN ENERGY SUPPORT STRUCTURE

CROSS REFERENCES TO RELATED APPLICATIONS

This application is a continuation of PCT International Application No. PCT/US2024/023527, filed Apr. 8, 2024, which claims the benefit of priority of U.S. Provisional Patent Application No. 63/495,097, filed on Apr. 9, 2023, and U.S. Provisional Patent Application No. 63/503,549, filed on May 22, 2023, the entire contents of all of which are incorporated herein by reference.

TECHNICAL FIELD

The present disclosure generally relates to the field of fluid turbines. More specifically, the present disclosure relates to systems, methods, and devices for operating fluid turbines.

BACKGROUND

As challenges posed by climate change continue to increase, more attention is being devoted to green energy alternatives to fossil fuels. Some attractive alternatives to fossil fuels include turbines that harness power from a fluid flow, such as wind, ocean currents, a steam flow, or a gas flow. In some cases, due to physical constraints limiting how much energy may be generated by any single turbine, clusters of turbines may be constructed, allowing for aggregation of energy generated by multiple individual turbines. For example, aggregating energy produced by a cluster of turbines may allow scaling up green energy production sufficiently to provide a reliable supply of green energy to an electrical grid, as a replacement for fossil fuels. However, clusters of fluid turbines may require coordinated maintenance, repairs, and safety checks. In addition, in some cases, coordinating the operations of clustered turbines may improve performance, allowing them to increase green energy production with improved efficiency. Systems and methods for coordinating operations of clustered turbines may therefore be beneficial.

SUMMARY

Embodiments consistent with the present disclosure provide systems and methods generally relating to installing one or more fluid turbines and/or solar collectors. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer readable storage media may store program instructions, which are executable by at least one processing device and perform any of the steps and/or methods described herein.

Consistent with disclosed embodiments, systems and methods are provided for wind energy harvesting. The embodiments may include an industrial housing requiring venting; a vent outlet in the industrial housing; at least one industrial fan within the industrial housing and associated with the vent outlet for evacuating exhaust from the industrial housing through the vent outlet and for forming an exhaust flow zone outside the industrial housing opposite the vent outlet, the exhaust flow zone being defined by a first boundary extending from the industrial structure on a first side of the vent outlet and a second boundary extending from the industrial structure on a second side of the vent outlet; at least one wind turbine positioned external to the vent outlet and including a turbine blade portion and an electric generator; wherein the at least one wind turbine is positioned with respect to the vent outlet such that during each rotational cycle, the blade portion of the at least one wind turbine is partially within the exhaust flow zone and partially outside the exhaust flow zone straddling the first boundary.

Consistent with disclosed embodiments, systems and methods are provided for mounting a plurality of green energy sources on a flat roof. The embodiments may include a plurality of triangular external roof trusses configured for mounting atop the flat roof, each triangular external roof truss including a pair of upper chords, each upper chord having a proximal end configured to meet another of the pair of upper chords at a peak, and each upper chord having a distal end, and wherein each triangular external roof truss further includes a transversely extending support beam having opposing ends, each opposing end being configured to meet an associated one of the distal ends of the upper chords at a heel location, such that each triangular external roof truss has a pair of heel locations associated therewith; a plurality of heel weight bases, each heel weight base being connectable to an associated one of the plurality of triangular external roof trusses at an associated heel location, and each heel weight base being configured to lie on the flat roof for securing the associated heel location of the associated triangular external roof truss to the flat roof; a plurality of vertical support beams, each vertical support beam being configured to project from an associated one of the transversely extending support beams through and beyond the peak, wherein a portion of each vertical support beam beyond the peak is configured to support a wind turbine; and a scaffold structure for maintaining the plurality of triangular external roof trusses at a spaced distance from each other, the spaced distance being selected such that adjacent ones of the plurality of upper chords are enabled to support at least one solar panel thereon at an acute angle relative to the flat roof.

Consistent with disclosed embodiments, a green energy electrical charging station is provided. The green energy electrical charging station may include a support pole; a bench configured for connecting to and extending from the support pole; a canopy configured for connecting to the support pole for shading at least a portion of the bench; at least one solar collector configured for location on at least a portion of the canopy; at least one wind turbine configured to be supported by the support pole above the canopy; at least one battery for electrical association with the at least one solar collector and the at least one wind turbine; at least one first electrical circuit for delivering electrical power from the at least one wind turbine and the at least one solar collector to the at least one battery; at least one electrical outlet for location in proximity to the bench; and at least one second electrical circuit for delivering electrical power from the at least one battery to the at least one electrical outlet.

DETAILED DESCRIPTION

Figure 1:
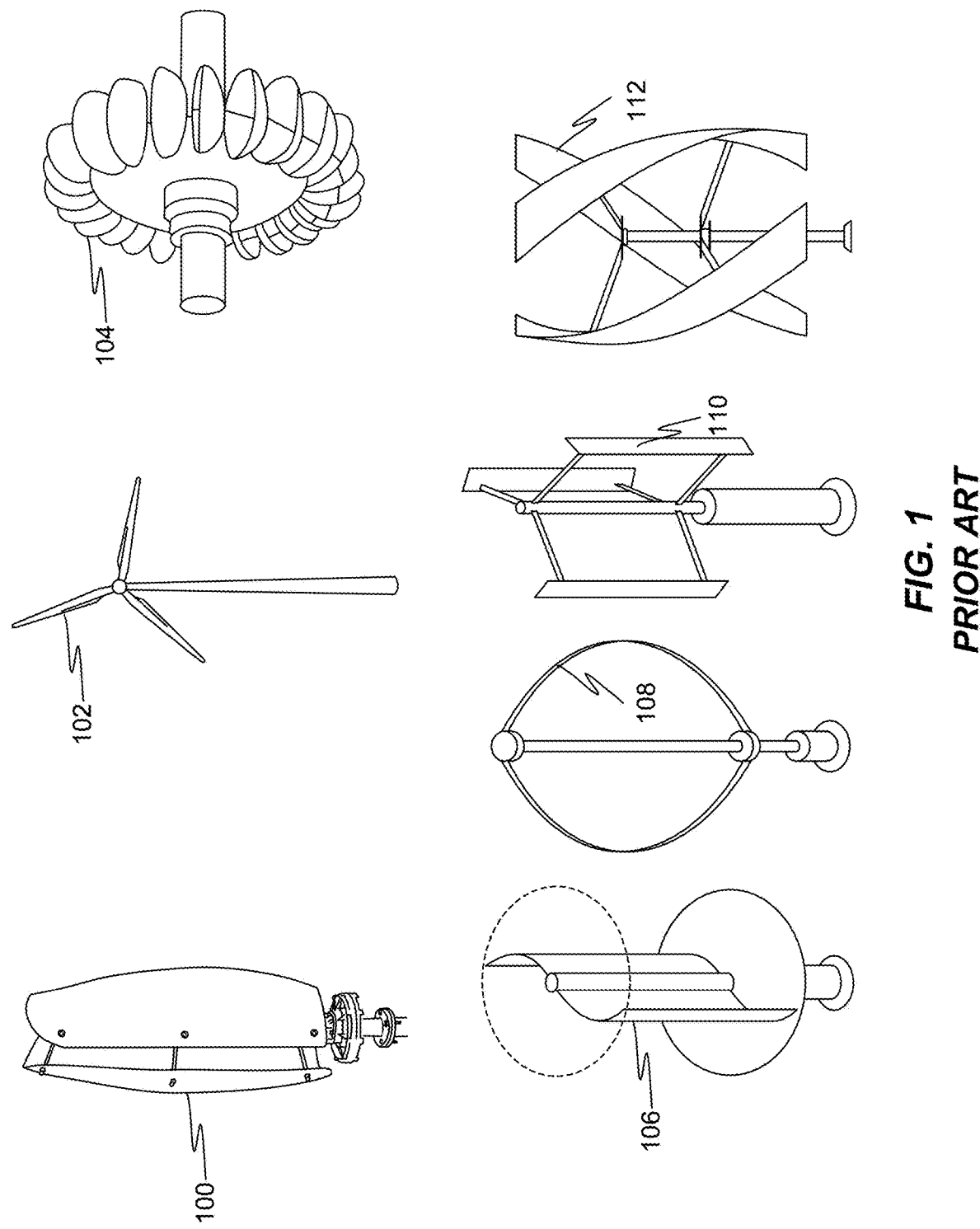
FIG. 1 illustrates an exemplary variety of fluid turbines, each of which is consistent with some embodiments of the present disclosure.

Disclosed herein are systems and methods for installing fluid turbines and/or solar collectors. The fluid turbines referred to herein may be configured to harness energy from wind, water, steam, and/or gas flow. Although some non-limiting examples are given relating to wind turbines (specifically vertical wind turbines), these examples are intended for illustrative purposes only, and do not limit this disclosure. Furthermore, in some cases the term "fluid turbine" may be understood to include an electric energy generator in an integral fluid energy conversion system.

Various terms used in this detailed description and in the claims may be defined or summarized differently when discussed in connection with differing disclosed embodiments. It is to be understood that the definitions, summaries, and explanations of terminology in each instance apply to all instances, even when not repeated, unless the transitive definition, explanation or summary would result in inoperability of an embodiment.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily lack that feature or characteristic.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

The terms, generally, substantially, or approximately as used in this disclosure should be interpreted to encompass commonly understood design, machining, and/or manufacturing tolerances. For example, equidistant may refer to the same distance within +/−1%, +/−2%, or within +/−5%. Substantially and/or approximately transverse may refer to transverse within +/−1%, +/−2%, +/−5%, +/−10%, or +/−15%.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the specific embodiments and examples, but is inclusive of general principles described herein and illustrated in the figures in addition to the general principles encompassed by the appended claims.

Aspects of the present disclosure is directed to systems, devices, methods, and non-transitory computer readable media for operating one or more fluid turbines (e.g., a cluster of fluid turbines) under variable fluid conditions. In some cases, each fluid turbine in a cluster may be exposed to substantially the same environmental factors (e.g., the same or similar wind conditions, water current, and temperature). Under low fluid conditions, energy produced by one or more fluid turbines may fail to meet one or more threshold requirements associated with supplying generated electrical energy to an electrical grid. For instance, AC voltage generated under low fluid conditions may fail to meet a threshold for an inverter and/or an electrical grid requirement. Low fluid conditions may refer to a fluid having a fluid velocity below a minimal fluid flow threshold. For example, a fluid velocity above the minimal power threshold may be necessary for a fluid turbine to generate power. Disclosed embodiments may allow harnessing energy generated under low fluid conditions to increase operational efficiency of one or more fluid turbines and facilitate compliance with one or more standards and/or regulations for supplying AC power to an electrical grid.

A flow (e.g., a fluid flow) may refer to movement or continual deformation of a fluid under an applied force. Flow may correspond to kinetic energy of particles or molecules of a fluid. For example, a temperature gradient in a fluid may cause warmer fluid to rise and cooler fluid to sink in a cyclical flow motion. Uneven heating of the Earth by the sun (e.g., combined with the Earth's rotation) may cause wind (e.g., airflow). Similarly, wind, water density differentials, gravity, and the Earth's rotation may cause ocean currents (e.g., water flow). Examples of turbines for obtaining energy from a flow may include a windmill, a waterwheel, a steam turbine, or a gas turbine. A wind flow may refer to a fluid flow consisting of air. A water flow may refer to a fluid flow consisting of water, e.g., as an ocean or river current.

A fluid turbine may include a mechanical device configured to capture energy from a fluid flow (e.g., a flow of water, steam, gas, or wind) and convert the captured energy to a form of work (e.g., a rotary motion). A fluid turbine may include at least one moving part coupled to a plurality of blades connected to a shaft. A fluid turbine may rotate, for example, in response to an air flow incident on a plurality of blades or in response to water flow on an impeller (e.g., paddle wheel, a water wheel), or in response to steam or gas flow. The plurality of blades and shaft may be connected to a rotor of an electric energy generator for converting the mechanical rotational motion of the plurality of blades and shaft to electrical energy, as described in greater detail below. A fluid turbine may have a horizontal axis of rotation (e.g., the axis around which the fluid turbine rotates is substantially parallel to the ground or flow), or a vertical axis of rotation (e.g., the axis around which the fluid turbine rotates is at a right angle to the ground or flow). In some embodiments the axis of rotation may be neither horizontal or vertical, and in other embodiments, the axis of rotation may be variable. A fluid turbine may begin generating power when a fluid flow exceeds a lower threshold (e.g., a cut-in value). In some embodiments, a fluid turbine may be associated with at least one processor configured to control the operation of the fluid turbine, as described in greater detail herein below.

A shaft of a fluid turbine may include a pole, a rod, a post, a support, a pylon, or any other axle or axis. In some embodiments, a shaft may be used to support one or more objects. For example, blades of a vertical fluid turbine may be connected to a shaft allowing the blades to be supported vertically by the shaft which may rotate with the blades. Connecting the shaft with the blades to a rotor may allow transferring kinetic energy of a flowing fluid to a rotary motion by the rotor to produce electrical energy. As another example, blades of an impeller may be connected to a horizontally oriented shaft that may rotate with the blades.

A blade (e.g., as part of a plurality of blades) of a turbine may refer to an object having a cross-sectional shape having a curved surface (e.g., an airfoil shape or a cupped shape typical of drag-type turbines) configured to cause a motion (e.g., a rotational motion) consistent with the fluid motion incident on the blades. A fluid turbine may include a plurality of blades mounted onto a rim of a disc. Movement of a fluid across the blades may produce a tangential force that may cause rotation of a rotor connected thereto. Moving fluid may act on the blades of a fluid turbine causing the blades to rotate and impart rotational energy to a rotor. The blades may extend from the rotor in that they protrude from the rotor or from a mounting plate mechanically connected to the rotor. Connecting a plurality of blades to a rotor (e.g., directly or indirectly) may cause the plurality of blades to extend outwards and/or upwards from the rotor.

A cluster of fluid turbines may refer to a plurality of fluid turbines positioned in relative proximity to each other, to form a group or collection of fluid turbines. A cluster of fluid turbines may include at least two fluid turbines at a location including a plurality of fluid turbines. In some embodiments, a cluster of fluid turbines may include all of the fluid turbines at a location. In some embodiments, a cluster of fluid turbines may include fewer than all of the fluid turbines at a location. Clustered fluid turbines may be positioned in an arrangement such that each fluid turbine may be exposed to substantially similar environmental conditions and fluid flow (e.g., wind conditions, temperature, precipitation, water current). In some embodiments, at least some of clustered fluid turbines may be fluidly coupled such that blade motion of a fluidly-coupled upstream fluid turbine may cause a fluid flow or turbulence that may affect or influence the blade motion of a fluidly-coupled downstream fluid turbine in the cluster. In some embodiments, each clustered fluid turbine may be fluidly coupled with at least one other fluid turbine. In some embodiments, at least one clustered fluid turbine may be independent such that blade motion of the independent clustered turbine may be indifferent to blade motion of any other clustered fluid turbine, and may not affect blade motion of any other clustered fluid turbine. In some embodiments, each fluid turbine in a cluster may be independent.

Electrical energy may refer to energy associated with electrically charged particles. Electrical energy may be supplied as current (e.g., an electron flow) through an electric potential (e.g., voltage). A fluid turbine coupled to an energy generator may convert mechanical energy (e.g., in a fluid flow) to electrical energy for supplying to an electrical energy sink, such as a capacitor, a battery, an electrical load, and/or an electrical grid.

A voltage may refer to an electrical potential difference between two points. A voltage may be associated with a tension between two points to reduce or eliminate an electrical potential difference therebetween. For example the tension may be reduced by a current flowing from one point to the other point, e.g., crossing the electrical potential difference.

Power (e.g., electric power) may refer to a rate at which electrical energy may be transferred by an electric circuit. Electric power may be measured in watts (e.g., Kilowatts, or Megawatts) and may refer to a rate of electrical energy transferred by an electric circuit. Power may be calculated from a known voltage and/or current level (e.g., watts=volts×amps). Electric power may be generated by an electric energy generator (e.g., connected to a fluid turbine). As used herein, the phrase "power generated by a fluid turbine" or "power output from a fluid turbine" may refer to power generated by an energy generator associated with the fluid turbine.

An energy generator (e.g., an alternator) may include a device configured to convert motive or mechanical power to electric power. An energy generator may include a rotor and a stator in which windings (e.g., copper wires) may be electromagnetically coupled to an alternating magnetic field for conversion of non-electrical energy (e.g. rotational or kinetic energy) to electrical energy. An energy generator may be associated with a fluid turbine (e.g., steam, water, air, and/or gas turbine). Mechanical energy as rotational motion of a fluid turbine may be transferred to a rotor of an electric generator. The rotational motion of the rotor may cause an alternating magnetic field to surround the windings, which may induce an alternating current, thereby converting mechanical energy to electrical energy. In some embodiments, the rotor may include a magnet or magnets, and the stator may include windings. In some embodiments, the rotor may include windings and the stator may include a magnet or magnets. In some embodiments, a rotor may be configured to rotate within a stator (e.g., a stator may be formed as a ring or donut surrounding a rotor.) In some embodiments, a rotor may be configured to rotate about a stator (e.g., a rotor may be formed as a ring or donut surrounding a stator). In some embodiments, a rotor of an energy generator may be connected to rotatable blades and/or a rotatable shaft of a fluid turbine, allowing the rotor to rotate in response to a fluid flow.

A rotor may refer to a rotating component of an electromagnetic system (e.g., an electric motor, electric energy generator, or an alternator). A rotor may rotate, turn, or spin to induce a torque around an axis of the rotor. A stator may refer to a stationary (e.g., non-moving) component of a rotary electromagnetic system. A rotor electromagnetically coupled to a stator may allow for interactions between an electromagnetic coil of an electric conducting wire (e.g., windings) and an alternating magnetic field. The interactions may allow conversion of electrical energy to mechanical energy as rotational motion (e.g., as in a motor) and to convert mechanical energy as rotational motion to electrical energy (e.g., as in an electric energy generator). For example, energy may flow from a rotating component to a stator, as in an energy generator where a stator may convert a rotating magnetic field to an alternating electric current.

Electronic circuitry may include any combination of electronic components (e.g., one or more of memory units, switches, transistors, diodes, gates, capacitors, inductors, resistors, transformers, converters, inverters, rectifiers, DC-DC converters, more power supplies, voltage sensors, current sensors, a voltage booster, a voltage buck, a dump load, a regulator and/or other electronic componentry) connected via one or more connecting wires and/or contacts for performing one or more operations (e.g., logical operations) in response to receiving an electric signal as an input (e.g., from at least one processor operating as a controller). Circuitry may include one or more integrated circuits (ICs), including one or more processors. Circuitry may further include one or more communication channels and/or links. The communication links may couple the one or more ICs to the memory, thereby enabling the one or more ICs to receive a computing instruction and/or data stored thereon required to perform a corresponding logical operation. The communication channels coupling the one or more ICs to the memory may include wired channels, such as one or more cables, fibers, wires, buses, and any other mechanically coupled communication channel. The communication channels may include wireless channels such as short, medium, and long-wave radio communication channels (e.g., Wi-Fi, BlueTooth, Zigbee, cellular, satellite), optical, and acoustic communication channels. The communications channels or links may include wires, cables, and/or fibers configured to transmit power (e.g., AC and/or DC power) generated by one or more fluid turbines. The communications channels or links may include communication links for transmitting electronic signals readable by at least one processor.

At least one processor may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact.

A processor may be configured to perform calculations and computations, such as arithmetic and/or logical operations to execute software instructions, control and run processes, and store, manipulate, and delete data from memory. An example of a processor may include a microprocessor manufactured by Intel™. A processor may include a single core or multiple core processors executing parallel processes simultaneously. It is appreciated that other types of processor arrangements could be implemented to provide the capabilities disclosed herein.

At least one processor may include a single processor or multiple processors communicatively linked to each other and capable of performing computations in a cooperative manner, such as to collectively perform a single task by dividing the task into subtasks and distributing the subtasks among the multiple processors, e.g., using a load balancer. In some embodiments, at least one processor may include multiple processors communicatively linked over a communications network (e.g., a local and/or remote communications network including wired and/or wireless communications links). The multiple linked processors may be configured to collectively perform computations in a distributed manner (e.g., as known in the art of distributed computing).

In some embodiments, at least one processor may include a plurality of processors configured to control a plurality of geographically-associated fluid turbines (e.g., a cluster of fluid turbines). In some embodiments, one or more fluid turbines in a cluster of fluid turbines may be associated with one or more specific processors, e.g., dedicated to a specific fluid turbine or a subset of specific fluid turbines in a cluster. In some embodiments, one or more processors may be configured in a central control unit to collectively control the operations of each fluid turbine in a cluster of fluid turbines. In some embodiments, at least one processor may include one or more processors dedicated to a specific fluid turbine in a cluster of fluid turbines, and one or more processors in a central control unit configured to control operations of the entire cluster of fluid turbines. In some embodiments, at least one processor may control operations of a plurality of geographically-associated fluid turbines to allow the plurality of geographically-associated fluid turbines to operate collectively as a single fluid energy conversion system.

A non-transitory computer-readable storage medium (e.g., a memory) refers to any type of physical memory on which information or data readable by at least one processor can be stored. Examples include Random Access Memory (RAM), Read-Only Memory (ROM), volatile memory, nonvolatile memory, hard drives, CD ROMs, DVDs, flash drives, disks, any other optical data storage medium, any physical medium with patterns of holes, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located locally (e.g., in physical proximity to at least one processor and connected via a local communications link) or at a remote location (e.g., accessible to at least one processor via a communications network). Additionally, one or more computer-readable storage mediums can be utilized in implementing a computer-implemented method. Accordingly, the term computer-readable storage medium should be understood to include tangible items and exclude carrier waves and transient signals.

In some embodiments, a memory may include a plurality of memory storage devices configured to store information for controlling a plurality of geographically-associated fluid turbines (e.g., a cluster of fluid turbines). In some embodiments, one or more fluid turbines in a cluster of fluid turbines may be associated with one or more specific memory devices, e.g., dedicated to a specific fluid turbine or a subset of specific fluid turbines in a cluster. In some embodiments, one or more memory devices may be configured with a central control unit to collectively store information for controlling each fluid turbine in a cluster of fluid turbines. In some embodiments, a memory may include one or more memory devices dedicated to a specific fluid turbine in a cluster of fluid turbines, and one or more memory devices in a central control unit configured to store information for controlling the entire cluster of fluid turbines. In some embodiments, a memory may store information for controlling operations of a plurality of geographically-associated fluid turbines to allow the plurality of geographically-associated fluid turbines to operate collectively as a single fluid energy conversion system.

Consistent with the present disclosure, disclosed embodiments may involve a network. A network may include any type of physical or wireless computer networking arrangement used to exchange data. For example, a network may be the Internet, a private data network, a virtual private network using a public network, a Wi-Fi network, a LAN or WAN network, a combination of one or more of the forgoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Direct current (DC) (e.g., a DC power signal) may refer to a one-directional flow of electric charge. DC power may be used to operate a processor or controller. An example of DC power may include power produced by an electrochemical cell (e.g., a battery) or power stored in a capacitor. Electronic devices such as processors, controller, and memory devices may be operated using DC power.

Alternating current (AC) (e.g., an AC power signal) may refer to a bi-directional flow of electrical charge exhibiting a periodic change in direction. An AC current flow may change between positive and negative due to the positive or negative flow of electrons, producing a sinusoidal AC wave.

An alternator may create AC power by positioning a conductive coil (e.g., copper windings) inside a fluctuating magnetic field. The fluctuating magnetic polarities may cause electric current in the conductive coil to change direction, producing an electrical waveform signal. AC power may travel farther than DC power without losing power, which may be advantageous for delivering power from power generating systems to consumers of electricity. An electric energy generator may generate AC power, and an electric power grid may supply AC power to consumers.

A three-phase voltage signal may refer to a voltage signal distributed as three voltage signals, each voltage signal at a phase shift of 120 degrees from the other voltage signals such that peaks and valleys of the three voltage signals do not align. The three voltage signals may be offset from each other by one-third of each cycle such that the waveform produced by each phase may be offset from one-third of a cycle produced by the other two phases. A three-phase voltage signal may allow for efficient stepping up and stepping down of high voltages for power transmission.

A load (e.g., an electrical load) may refer to an impedance or resistance. Such a load may be imposed on an electric energy generator (e.g., and a fluid turbine connected thereto) causing rotation of the electric energy generator and/or a fluid turbine connected thereto to slow. Generating a load may involve drawing away at least some electrical energy produced by an energy generator to an energy sink. Drawing away more electrical energy (e.g., increasing a load) may increase an impedance causing a rotational velocity of the fluid turbine to slow down. Drawing away less electrical energy (e.g., decreasing the load) may reduce an impedance cause a rotational velocity of the fluid turbine to increase.

A rectifier may refer to a device or circuitry that converts an alternating current (AC) to a direct current (DC) signal (e.g., an AC-to-DC converter). A rectifier may convert AC power (e.g., generated by an electric energy generator) to DC power (e.g., to power at least one processor). In some embodiments, each of the geographically-associated fluid turbines may be associated with a dedicated rectifier. The dedicated rectifiers for each fluid turbine may be housed in a separate housing (e.g., per fluid turbine), or in a common housing for multiple fluid turbines.

An inverter (e.g., a power inverter) may refer to a device or circuitry that converts a direct current (DC) signal to an AC signal (e.g., a DC-to-AC converter). An inverter may convert a DC signal to produce a square wave, a sine wave, a modified sine wave, a pulsed sine wave, a pulse width modulated wave (PWM) depending on the circuit design of the inverter. An inverter may convert DC power to AC power for transmitting to an electric power grid. In some embodiments, the plurality of geographically-associated fluid turbines may be associated with a single inverter for outputting collectively generated AC power to a power grid.

For instance, each AC power signal outputted by each geographically-associated fluid turbine may be converted to a DC power signal via each of the dedicated rectifiers. Circuitry (e.g., including at least one processor) may process the DC power signals to enable combining each of the DC power signals to form an aggregate DC power signal, such that converting the aggregate DC power signal via an inverter may produce an AC power signal that may be compatible for transmitting to an electric power grid.

A capacitor may refer to an electronic component configured to store electrostatic energy in an electric field by storing electric charge on two opposing surfaces (e.g., conducting plates) separated by an insulator (e.g., a dielectric medium). Applying an electric potential difference (e.g., a voltage) across the plates of a capacitor, may cause an electric field to develop across the dielectric medium, causing a net positive charge to accumulate on one plate and net negative charge to accumulate on the opposing plate, allowing for storage of electrical energy as a potential difference between the two plates. The plates of a capacitor may be connected to other circuit components (e.g., via contacts of the capacitor) allowing for integration of one or more capacitors into an electronic circuit. In some embodiments, a capacitor may function as a source of electrical energy (e.g., similar to a battery). However, a capacitor may be differentiated from a battery because a capacitor may lack a chemical reaction to receive, store and generate electrical energy. A capacitor may be manufacturable on a microelectronic scale for integration with other microelectronic components, e.g., in a photolithographic process.

A battery may refer to an electrical device configured to convert chemical energy into electrical energy or vice versa. A battery may include one or more cells, each cell containing electrodes and an electrolyte. When the electrodes are connected to an external circuit, a chemical reaction may occur in the electrolyte, creating a flow of electrons, which generates an electric current. The amount of electrical energy that can be stored in a battery may be determined by the capacity (e.g., measured in amp-hours, Ah, or milliampere-hours, mAh). Batteries may be rechargeable, or non-rechargeable.

A battery bank may include a plurality of batteries connected together in a series or parallel configuration to provide a larger capacity and/or higher voltage. A battery bank may be used to store electrical energy generated by a renewable energy source, such as a plurality of fluid turbines, e.g., for subsequent use by a consumer. In some embodiments, a battery bank may include multiple batteries connected in series to increase the voltage while maintaining a steady capacity. In some embodiments, a battery bank may include multiple batteries connected in parallel to increase capacity while maintaining a steady voltage. In some embodiments, a battery bank may include multiple batteries connected in series and in parallel to allow increasing voltage and capacity. A charge controller may be used to ensure that the batteries in a battery bank have a similar state of charge and similar electrical characteristics, e.g., to prevent overcharging, over-discharging, and/or uneven aging of one or more batteries included therein.

A DC-DC converter may include an electric power converter, for example, an electronic circuit and/or a device configured to convert a DC voltage signal from a first DC voltage level to a second voltage level. A DC-DC converter may reduce (e.g., buck) a DC voltage signal or increase (e.g., boost) a DC voltage signal. For instance, a DC-DC converter may store electrical energy temporarily and release the electrical energy at a different voltage. In some embodiments, a DC-DC converter may be designed to (e.g., substantially) maximize energy harvested from fluid turbines and/or photovoltaic cells (e.g., as a power optimizer). DC-DC converters may include electronic voltage converters (e.g., using one or more capacitors, inductors, and/or transformers), magnetic voltage converters (e.g., using an inductor and/or transformer to periodically release energy from a magnetic field stored therein), bi-directional DC-DC converters, and/or capacitive voltage converters.

A charge controller may refer to an electronic device configured to help ensure compliance of a fluid turbine with one or more regulations and/or specifications. For instance, a charge controller may prevent overcharging of a battery bank by a fluid turbine while limiting a rotational speed of the fluid turbine (e.g., when the battery bank is full and/or under high fluid speed conditions), and may allow aggregation of power from multiple fluid turbines without incurring loss due to interference. A charge controller may include an AC-to-DC converter (e.g., a rectifier), one or more of a voltage sensor switch, a voltage regulator (e.g., for regulating a DC voltage for supplying DC power to a battery bank), and/or a dump load (e.g., for diverting excess power to prevent overcharging). In some embodiments, a charge controller may include at least one processor configured to control one or more operational aspects of a fluid turbine and an associated generator. In some embodiments, a charge controller may include a user interface and/or features to protect against excessive voltage, current, and/or temperature. For example, the user interface may be associated one or more light emitting diodes or LEDs (e.g., to emit warning lights), speakers (e.g., to emit warning sounds), an electronic screen, and/or any other interface that may allow a user to interact with the charge controller.

A charge controller may be connected to an AC output of an electric energy generator connected to a fluid turbine. The AC-to-DC converter of the charge controller may convert the AC output to a DC signal (e.g., for aggregating with other DC signals produced by other charge controllers associated with other fluid turbines without incurring lossy interference). At least one voltage sensor switch of the charge controller (e.g., controlled by at least one processor) may transmit the DC signal to charge the battery bank when the DC voltage level is below an upper limit for the battery bank, and may divert the DC signal (e.g., excess DC power) to the dump load when the DC voltage level exceeds the upper limit. The voltage regulator may regulate the DC voltage transmitted to the battery bank to comply with one or more specifications, regulations, and/or recommendations associated with the battery bank.

An aggregate level of electrical energy refers to a level of electrical energy produced by combining and/or merging a plurality of signals conveying electrical energy generated by different energy sources (e.g., generators). Such signals conveying electrical energy may include a voltage signal (measured in volts), a current signal (measured in amps), and/or a power signal (measured in watts, as voltage multiplied by current). In some cases, producing an aggregate level of electrical energy may include synchronizing a plurality of AC signals, for example by synchronizing the frequency, the phase angle, and/or adjusting a voltage and/or current level to reach a matched voltage and/or current level. In some cases, producing an aggregate level of electrical energy may include storing electrical energy included in one or more energy signals temporarily (e.g., in one or more capacitors and/or batteries) and/or retrieving stored electrical energy. In some cases, there may be a need for producing more volts (e.g., more voltage) than amps (e.g., current), or more amps (e.g., current) than volts (e.g., voltage). For example, if the battery bank is 48 volts and/or the inverter operates on a minimum voltage of 48 volts, but the generator is a 24 volt generator, the charge controller may selectively increase the voltage and lower the amperage of the turbines.

A power signal refers to a rate at which electrical energy is transferred. An aggregate power signal refers to a rate at which a combined level of electrical energy may be transferred, e.g., to an electrical energy sink. Power signals from different energy generators may be synchronized and matched for combination using electrical devices such as power combiners and/or power distribution panels. The combined (e.g., aggregate) power signal may be transmitted to an electrical grid or to power a load.

An electrical grid (e.g., a power grid) may include an interconnected network delivering electric power (e.g., AC power) from a single or plurality of energy generators to a single or plurality of consumers. An electrical grid may be designed to supply electricity at a substantially steady voltage level under varying electrical power demand (e.g., by electrical energy sinks) and supply by (e.g., by energy generators). An electrical grid may use one or more tap changers or transformers to adjust a voltage and cause the voltage to remain within electrical grid specification. Attributes of power supplied to an electrical grid (e.g., frequency, phase, power level) by one or more energy generators may be required to comply with regulations or standards.

A signal may refer to information encoded for transmission via a physical medium. Examples of signals may include signals in the electromagnetic radiation spectrum (e.g., AM or FM radio, Wi-Fi, Bluetooth, radar, visible light, lidar, IR, Zigbee, Z-wave, and/or GPS signals), sound or ultrasonic signals, electrical signals (e.g., voltage, current, or electrical charge signals), electronic signals (e.g., as digital data), tactile signals (e.g., touch), and/or any other type of information encoded for transmission between two entities via a physical medium.

A sensor may refer to a device that outputs an electronic signal in response to detecting, sensing, or measuring a physical phenomenon. A sensor may convert a measurement of a physical phenomenon to a medium (e.g., an electronic medium) for receiving by at least one processor. A sensor may include one or more of a mechanical sensor, an optical sensor, a resistive sensor, a capacitive sensor, a temperature sensor, a piezoelectric sensor, a Hall sensor, a thermocouple sensor, photoelectric sensor, a digital position sensor, a current sensor, a voltage sensor, a photoelectric encoder, a pressure sensor, a fluid (e.g., liquid) level sensors, a flow sensor, and/or any other type of sensor that may be used to detect position, linear displacement, pressure, temperature, flow, vibrations, rotational velocity, current, voltage, power, and/or any other parameter associated with, e.g., generation of electrical energy.

A controller (e.g., a charge controller) may enable maximum energy extraction by adjusting a shaft speed (e.g., corresponding to a rotational speed) of a fluid turbine in response to varying fluid speeds. The controller may adjust the shaft speed by sending an electrical signal to the copper windings of a generator rotor coupled thereto. The electrical signal may introduce an impedance (e.g., by shunting or shorting the copper windings) causing a rotational speed of the rotor to slow down, and causing a corresponding slowing of the fluid turbine coupled thereto for producing maximum power under varying fluid conditions. A charge controller may adjust a shaft speed by increasing or decreasing a load on an energy generator connected thereto. In some embodiments, the controller may include at least one processor.

Maximum Power Point Tracking (MPPT) refers to one or more techniques and/or protocols for using the maximum power available in a fluid flow to extract maximum power from a fluid energy conversion system (e.g., a fluid turbine mechanically coupled to an energy generator). Examples of MPPT protocols include Perturb and Observe (hill climbing method), Incremental Conductance, Fractional Short Circuit Current, Fractional Open Circuit Voltage, Fuzzy Control, Neural Network, Extremum Seeking Control, and Model Predictive Control, among others. Under a given fluid flow velocity, a fluid turbine may output differing levels of power, depending on a rotational velocity of the blades and/or rotor. One such rotational velocity may correspond to a maximum power output for a fluid turbine operating under a specific fluid flow velocity. Maintaining a rotational velocity of a fluid turbine to correspond to a peak power output when operating under a particular fluid flow velocity may improve efficiency of a fluid turbine system. However, under a varying fluid flow, a rotational velocity for a fluid turbine may vary accordingly. Thus, under varying fluid flow conditions, efficiency in energy production may be improved by a controller (e.g., a charge controller) dynamically adjusting a rotational velocity of a fluid turbine to achieve a rotational velocity corresponding to the maximum power output for a given fluid flow velocity at any given point in time. Such a technique may require a controller tracking a peak power output for a fluid turbine under varying fluid flow conditions, and continuously adjusting a rotational velocity to correspond to the peak power output at any particular point in time (e.g., using an MPPT protocol). Inaccuracy in tracking a peak power output for a fluid turbine may cause a controller to adjust a fluid turbine to rotate at a sub-optimal rotational velocity.

An MPPT protocol (e.g., for a single fluid turbine) may involve transmitting signals to adjust a rotational speed of a single fluid turbine by adjusting a load, adjusting a brake (e.g., a mechanical and/or electronic brake), and/or using any other method to adjust a rotational speed of a single fluid turbine. In some embodiments, an MPPT protocol for a single fluid turbine may involve increasing a load on an energy generator connected thereto and/or sending a signal to the energy generator to output a maximum (e.g., or near-maximum) energy at a point in time.

An MPPT protocol (e.g., for a cluster of fluid turbines) may involve at least one processor adjusting a rotational speed of at least some fluid turbines in a cluster of geographically-associated fluid turbines to cause the cluster to output a maximum (e.g., or near-maximum) aggregate power output at a point in time and/or under certain fluid conditions. In some embodiments, implementing an MPPT protocol for a cluster of fluid turbines may include at least one processor transmitting at least some signals associated with applying an MPPT protocol (e.g., for a single fluid turbine) to at least some individual fluid turbines in the cluster, and at least some signals unassociated with applying an MPPT protocol (e.g., for a single fluid turbine) to any individual fluid turbine in the cluster. In some instances, implementation of an MPPT protocol for a cluster of fluid turbines may override one or more signals associated with an MPPT protocol for a single fluid turbine in the cluster. In some embodiments, a charge controller may include at least one processor to implement an MPPT protocol on a fluid turbine connected thereto.

Some MPPT protocols may require one or more inputs, such as the fluid speed, a rotational speed of the fluid turbine (e.g., rotor speed), a maximum power curve for a fluid turbine, or a mechanical power equation for a fluid turbine (e.g., obtained experimentally or via a simulation).

MPPT protocols for fluid turbines may be based on direct and/or indirect power measurement, fluid speed measurement, and/or hybrid and/or smart algorithms (e.g., based on artificial intelligence techniques such as neural networks and fuzzy logic controllers) for tracking a maximum power point of a specific fluid turbine. Some MPPT protocols for fluid turbines may employ one or more fluid speed sensors (e.g., anemometers, ultrasonic fluid sensors), such as a Tip Speed Ratio (TSR) protocol, or a power signal feedback (PSF) protocol, described in greater detail below. Some MPPT protocols for fluid turbines may avoid using fluid speed sensors, such as a perturb and observe (P&O) protocol, an optimal relation based (ORB) protocol, or an incremental conductance (INC) protocol. Some MPPT techniques may combine one or more MPPT protocols (e.g., hybrid techniques) and/or additional techniques (e.g., statistical techniques and/or equations).

For example, a Tip Speed Ratio (TSR) Based MPPT protocol may use the ratio between a fluid speed and the rotational speed of the blade tips of a fluid turbine to regulate the rotational speed of an energy generator coupled thereto to maintain the TSR of the fluid turbine at an optimum value for extracting maximum power. In addition to the fluid speed and turbine rotational speed, a TSR protocol may require the optimum TSR of the fluid turbine as an input and/or a fluid parameter measurement.

As another example, a power signal feedback (PSF) protocol may be used to control a fluid turbine to extract maximum power from a fluid flow. A reference power level may be generated using a recorded maximum power curve or a mechanical power equation for the fluid turbine. The curve may be tracked for varying fluid speeds to control the fluid turbine to output maximum power.

As an additional example, a Perturb and Observe (e.g., hill-climb search, or HCS) control protocol may continuously track a power output of a fluid turbine to search for a peak power output. Applying a Perturb and Observe protocol may involve reading a power outputted by a fluid turbine under certain conditions, increasing a load causing a rotational velocity of a fluid turbine to slow, and reading power outputted by the fluid turbine while rotating at the slower rotational velocity at the same wind speed, to thereby determine if power outputted at the slower rotational velocity is greater or less than power outputted prior to increasing the load. An HCS tracking protocol may compute a desired optimum signal for operating a fluid turbine to generate a peak power output based on the location of the operating point and the relation between changes in power and speed.

A brake may refer to a device configured to adjust (e.g., slow) a rotational speed of a fluid turbine and/or an energy generator connected thereto. A brake may include a mechanical brake and/or an electronic brake. A mechanical brake may include one or more brake pads, disks, and/or drums, e.g., activated via a switch. In some embodiments, a mechanical brake may include a lock, such as a pin configured to engage and hold a brake. An electronic brake may include a switch configured to introduce and/or remove a load (e.g., a dump load) imposed on a fluid turbine.

Receiving may include retrieving, acquiring, or otherwise obtaining, e.g., data. Receiving may include reading data from memory and/or receiving data from a computing device via a (e.g., wired and/or wireless) communications channel. At least one processor may receive data via a synchronous and/or asynchronous communications protocol, for example by polling a memory buffer for data and/or by receiving data as an interrupt event.

Determining includes making at least one of a measurement, comparison, estimation, and/or calculation to arrive at a conclusive outcome. In some embodiments, determining may include employing one or more of machine learning, artificial intelligence, and/or deep learning algorithms or techniques.

Machine learning may refer to a branch of artificial intelligence utilizing algorithms to navigate through large collections of data in an iterative manner to converge to a solution. Machine learning may include supervised learning, unsupervised learning, and reinforcement learning. Supervised learning may use annotated (e.g., tagged) data sets, whereas unsupervised learning may use unclassified (e.g., non-annotated) data sets. Reinforcement learning may occur in an absence of data, and may use trial-and-error, and environmental feedback to reach a conclusion.

In some embodiments, machine learning algorithms (also referred to as machine learning models) may be trained using training examples. Some non-limiting examples of such machine learning algorithms may include classification algorithms, data regressions algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may include an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs. Some non-limiting examples of such artificial neural networks may include shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long/short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

Reference is made to FIG. 1 illustrating a variety of exemplary fluid turbines 100 to 112. Fluid turbine 100 may be an exemplary vertical wind turbine, fluid turbine 102 may be an exemplary horizontal wind turbine, fluid turbine 104 may be an exemplary water, gas, or steam turbine, fluid turbine 106 may be an exemplary Savonius (e.g., vertical) wind turbine, fluid turbine 108 may be an exemplary Darrieus-rotor (e.g., vertical) wind turbine, fluid turbine 110 may be an exemplary H-type lift vertical wind turbine, and fluid turbine 112 may be an exemplary Helix (e.g., vertical) wind turbine. It is to be noted that exemplary fluid turbines 100 to 112 are shown for illustrative purposes and are not intended to limit the disclosure to any particular type or implementation of a fluid turbine because inventive principles described herein may be applied to any turbine or turbine cluster, regardless of structure or arrangement. Moreover, while some non-limiting examples may refer to any one of fluid turbines 100-112, these examples are provided for conceptual purposes only and do not limit the disclosure to any particular implementation or type of fluid turbine.

Figure 2A:
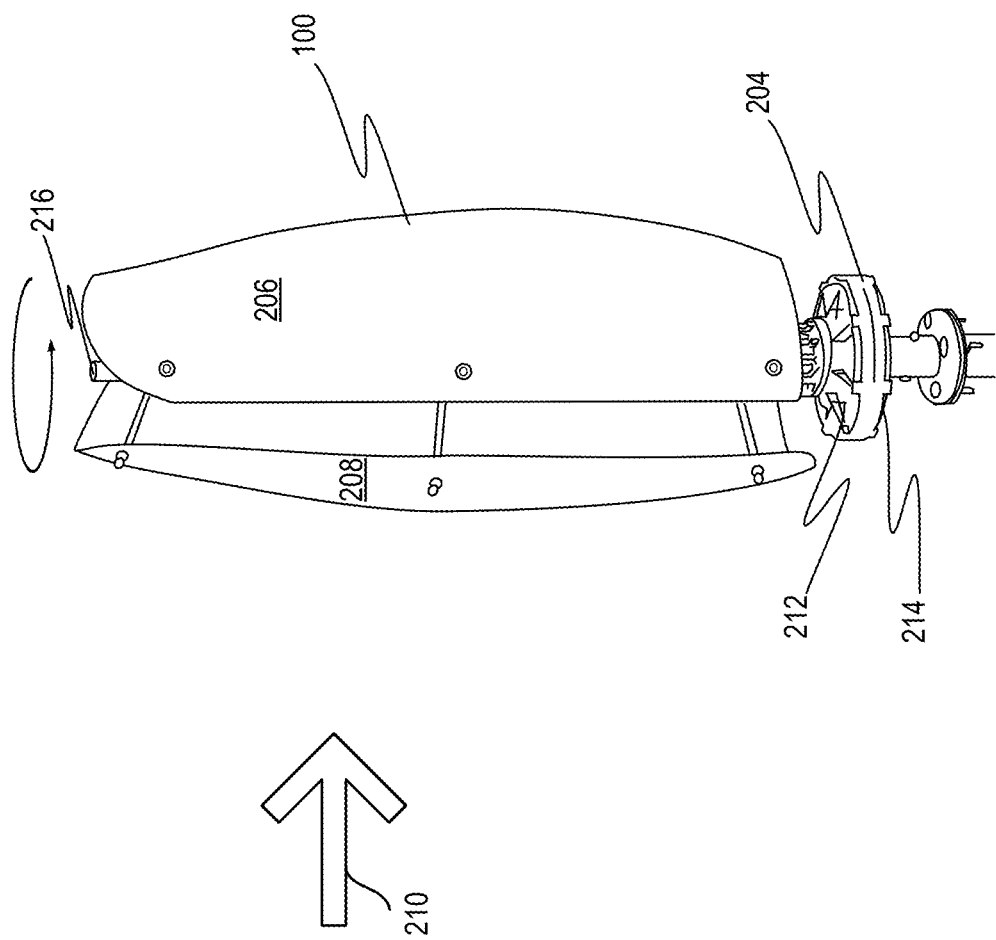
FIG. 2A is a view of a fluid energy conversion system including a fluid turbine coupled to an energy generator, consistent with some embodiments of the present disclosure.

FIG. 2A is a view of an exemplary fluid energy conversion system including a fluid turbine 100 coupled to an energy generator 204, consistent with some embodiments of the present disclosure. Fluid turbine 100 may include a plurality of blades 206 and 208 configured to spin about a shaft 216 in response to a fluid flow 210. Energy generator 204 may include a rotor 212 and a stator 214, together housing one or more permanent magnets and copper windings (e.g., the rotor may include the magnets and the stator may include the copper windings, or the reverse). Energy generator 204 may be configured to induce an alternating current (AC) when rotor 212 rotates relative to stator 214 (e.g., by generating a fluctuating magnetic field to surround the copper windings from the rotational motion). Kinetic energy contained in fluid flow 210 may exert a force on fluid turbine 100 causing blades 206 and 208 to rotate. The rotational motion of blades 206 and 208 may cause rotor 212 of energy generator 204 to spin relative to stator 214, generating an alternating current, thereby converting the kinetic energy of fluid flow 210 to electrical energy. Although fluid turbine 100 is illustrated as a vertical-axis wind turbine and fluid flow 210 is shown as air flow, this example is not intended to be limiting, and fluid turbine 100 may be a horizontal-axis wind turbine, a water turbine, a gas turbine, or a steam turbine. Similarly, fluid flow 210 may be water, gas, or steam, respectively.

Figure 2C:
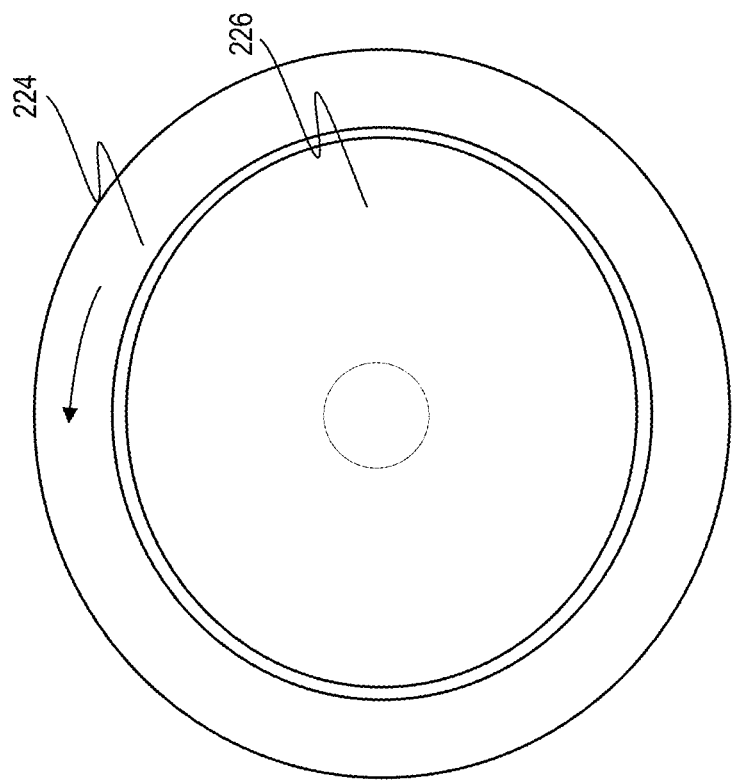
FIG. 2C exemplary top view of a fluid energy conversion system including an outer rotor and an inner stator, consistent with some embodiments of the present disclosure.
Figure 2B:
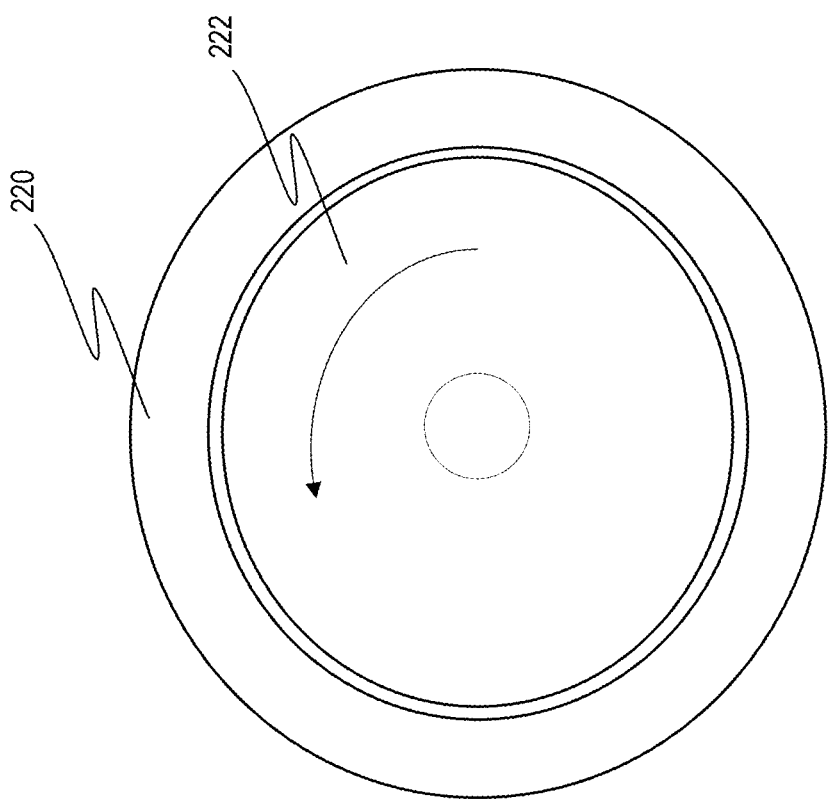
FIG. 2B is an exemplary top view of a fluid energy conversion system including an outer stator and an inner rotor, consistent with some embodiments of the present disclosure.

FIG. 2B illustrates an exemplary top view of a fluid energy conversion system including an outer stator 220 and an inner rotor 222, consistent with some embodiments of the present disclosure. Inner rotor 222 may be mechanically coupled to rotatable shaft 216 of fluid turbine 100. Inner rotor 222 may include one or more permanent magnets and outer stator 220 may include copper windings, such that when inner rotor 222 rotates due to a rotation of shaft 216 of fluid turbine 100 connected thereto, copper windings of outer stator 220 may be exposed to a fluctuating magnetic field, thereby inducing an AC signal.

FIG. 2C illustrates an exemplary top view of a fluid energy conversion system including an outer rotor 224 and an inner stator 226, consistent with some embodiments of the present disclosure. Outer rotor 224 may be mechanically coupled to rotatable shaft 216 of fluid turbine 100. Outer rotor 224 may include one or more permanent magnets and inner stator 226 may include copper windings, such that when outer rotor 224 rotates due to a rotation of shaft 216 of fluid turbine 100 connected thereto, copper windings of inner stator 226 may be exposed to a fluctuating magnetic field, thereby inducing an AC signal.

Figure 3:
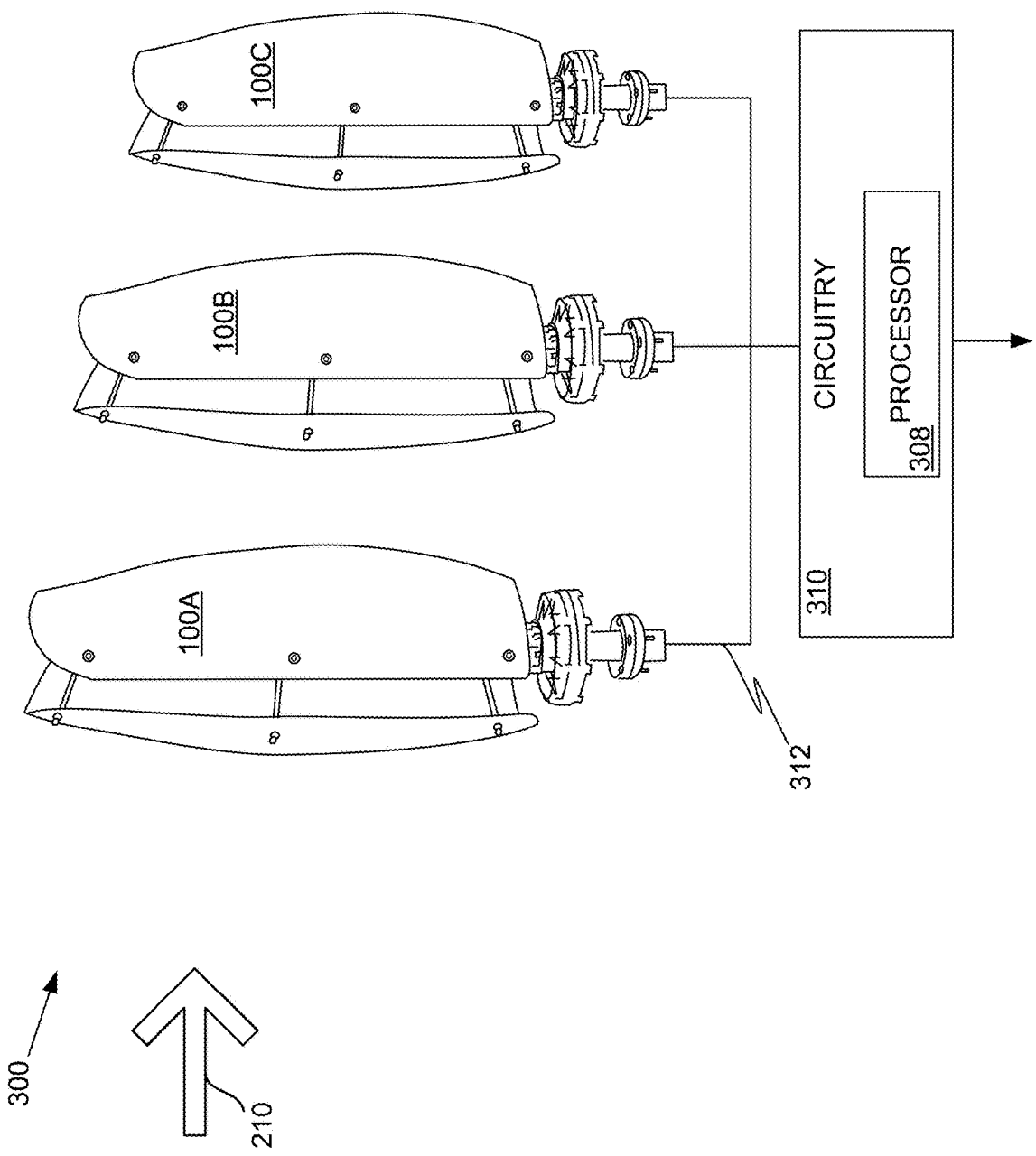
FIG. 3 is a view of an exemplary cluster of geographically associated fluid turbines, consistent with some embodiments of the present disclosure.

FIG. 3 illustrates a view of an exemplary cluster 300 of geographically associated fluid turbines 100A, 100B, and 100C, consistent with some embodiments of the present disclosure. Geographically associated fluid turbines 100A, 100B, and 100C may be connected to at least one processor 308 via circuitry 310 and one or more communication links 312. Communication links 312 may include differing types of wired communication links (e.g., wires, cables, fibers) and/or wireless communication links (e.g., WiFi, BlueTooth, Zigbee, AM, FM, PM radio transceivers, satellite or GPS transceivers, IR transceivers, ultrasound transceivers, and/or any other type of wireless communications links). Communications links may include high power communication links, e.g., for receiving electric power generated by fluid turbines 100A, 100B, and 100C, and/or for sending a load-bearing signal to fluid turbines 100A, 100B, and 100C, as well as lower power communication links, e.g., for sending and receiving data between a plurality of processors and/or sensors.

At least one processor 308 may be configured to control each of fluid turbines 100A, 100B, and 100C separately or coordinate operation of each of fluid turbines 100A, 100B, and 100. For example, at least one processor 308 may coordinate operations such as braking, slowing, stopping, locking, unlocking, and/or starting one or more of fluid turbines 100A, 100B, and 100C. As another example, at least one processor 308 may control a rotational direction and/or speed for any of fluid turbines 100A, 100B, and 100C, implement an MPPT algorithm for one or more of fluid turbines 100A, 100B, and 100C, control a relative rotational phase between any of fluid turbines 100A, 100B, and 100C, and/or perform any other procedure to coordinate operations for one or more of fluid turbines 100A, 100B, and 100C. At least one processor 308 may include one or more individual processors, each dedicated to control one of fluid turbines 100A, 100B, 100C, and/or one or more processors dedicated to control fluid turbines 100A, 100B, 100C collectively as cluster 300, operating as a single integral energy conversion system. In some embodiments, at least one processor 308 may be associated with a charge controller, as described and exemplified herein below. While cluster 300 is shown having three fluid turbines, this is for illustrative purposes only, and cluster 300 may include as few as two fluid turbines, or more than three fluid turbines. Moreover, FIG. 3 shows fluid turbines 100A, 100B, and 100C as vertical wind turbines (e.g., corresponding to fluid turbine 100 of FIG. 1). However, this is for illustrative purposes only and is not intended to limit this disclosure to any specific implementation. Cluster 300 may include different types of fluid turbines, e.g., other than fluid turbine 100, such as one or more horizontal wind turbines, as well as one or more water, steam, and/or gas turbines. It bears repeating that although the discussion of FIG. 3 occurs in connection with the example turbine structures illustrated, the principles described in FIG. 3 apply to all turbines, regardless of turbine structure.

Figure 4:
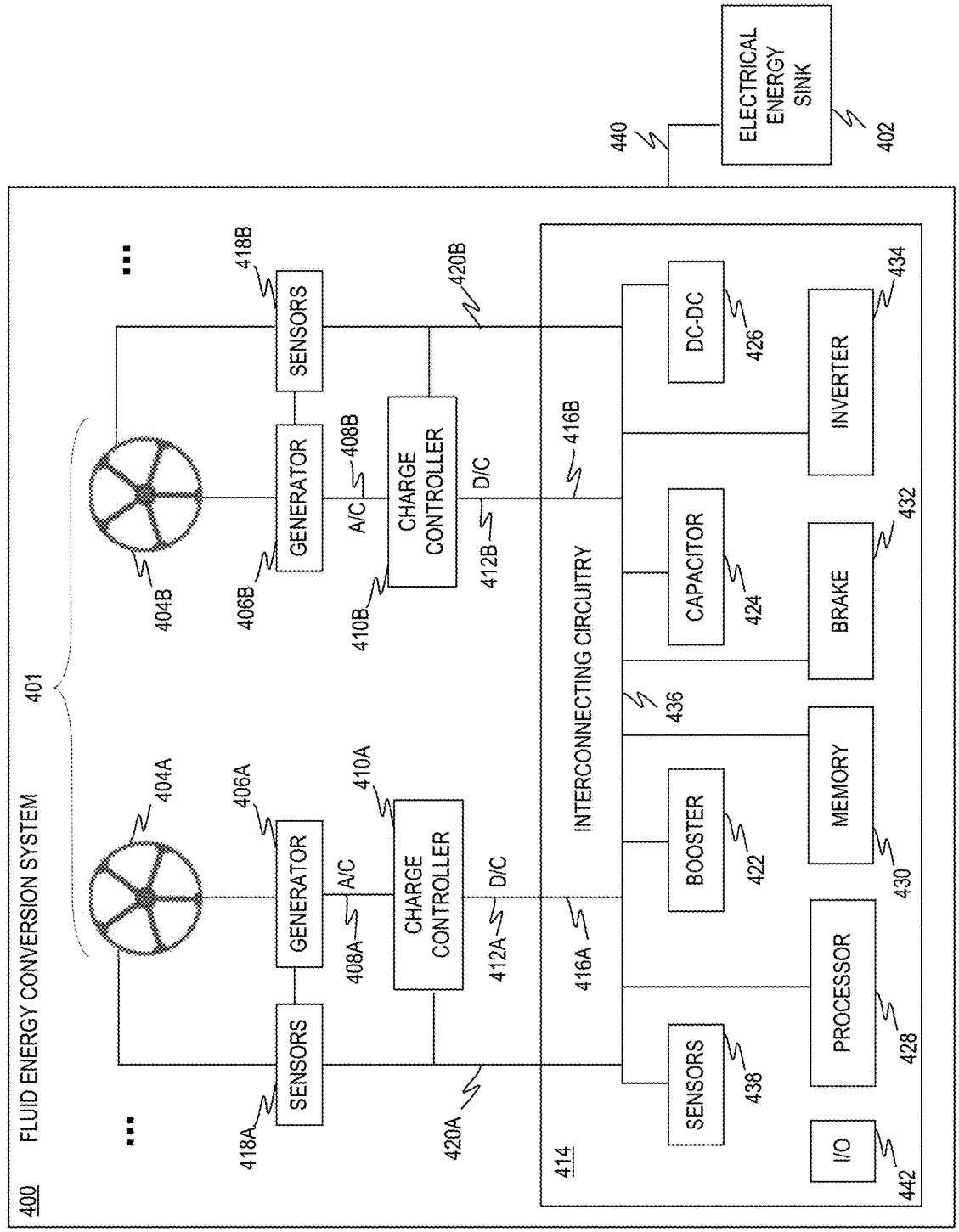
FIG. 4 is a schematic diagram of an exemplary fluid energy conversion system configured to generate electric power from a fluid flow and output the generated electric power to an energy sink, consistent with some embodiments of the present disclosure.

FIG. 4 illustrates a schematic diagram of an exemplary fluid energy conversion system 400 configured to generate electric power from a fluid flow and output the generated power to an energy sink 402, consistent with some embodiments of the present disclosure. Fluid energy conversion system 400 may include a plurality (e.g., a cluster) 401 of geographically-associated fluid turbines 404 (e.g., fluid turbines 404A and 404B). Each of fluid turbines 404A and 404B may be connected to energy generators 406 (e.g., electric energy generators 406A and 406B), respectively, for converting energy in a fluid flow (e.g., fluid flow 210 shown in FIG. 2) to electric power (e.g., a total electric power output 440) for at least one energy sink 402 (e.g., a load). Total electrical power output 440 may include a DC power output, e.g., for powering a battery bank, or an AC power output, e.g., for delivery to an electric grid. In some embodiments, a portion of total electrical power output 440 may be delivered as a DC signal to charge one or more batteries, and a portion of total electrical power output 440 may be delivered as an AC signal to an electrical grid. In some embodiments, a portion of total electrical power output 440 may be delivered as DC electrical energy to power circuitry for controlling one or more elements of fluid energy conversion system 400, such as control circuitry associated with fluid turbines 404 and/or energy generators 406. Fluid turbines 404A and 404B may be any fluid turbine, including but not limited to the various exemplary turbines illustrated in FIG. 1. Examples of an energy sink may include an electric power grid, one or more batteries, and/or any other sink for electric power. Energy generators 406A and 406B may convert mechanical rotational energy received from fluid turbines 404A and 404B to a plurality of AC power outputs 408 (e.g., AC power outputs 408A and 408B). Each of fluid turbines 404A and 404B and electric energy generators 406A and 406B may be associated with a charge controller 410 (e.g., charge controllers 410A and 410B), respectively. AC power outputs 408A and 408B may be converted to DC signals 412 (e.g., DC signals 412A and 412B) via charge controllers 410 (e.g., charge controllers 410A and 410B), respectively. Charge controller 410 may include electronic circuitry such as one or more of a rectifier (e.g., an AC-to-DC converter), a voltage sensor switch, a dump load, a braking circuit, a capacitor, and/or a voltage booster. DC signals 412A and 412B may be conveyed to interconnecting circuitry 414 via a plurality of links 416 (e.g., links 416A and 416B). Links 416A and 416B may include one or more of coaxial cables, fiber, and/or wires configured to transmit power signals.

Charge controllers 410A and 410B may transmit one or more electronic signals to interconnecting circuitry 414 via communications links 420 (e.g., communications links 420A and 420B). Communications links 420A and 420B may include one or more wired and/or wireless communication channels configured to transmit and receive electronic signals between at least one processor 428 and charge controllers 410A and 410B.

Each of fluid turbines 404A and 404B and electric energy generators 406A and 406B may be associated with at least one sensor 418 (e.g., at least one sensor 418A and 418B), described in greater detail below. Sensor 418 may connect to fluid turbine 404 and/or energy generator 406, e.g., to sense one or more operational parameters associated with fluid turbine 404 and/or energy generator 406 connected thereto. Sensor 418 may connect to charge controller 410. For example, at least one sensor 418A may connect to fluid turbine 404A and/or energy generator 406A and charge controller 410A, and at least one sensor 418B may connect to fluid turbine 404B and/or energy generator 406B and charge controller 410B.

Interconnecting circuitry 414 may include at least one sensor 438, at least one booster (e.g. voltage boosters) 422, at least one capacitor 424, at least one DC-DC converter 426, at least one processor 428, at least one memory 430, at least one brake circuit 432, an input output interface 442, and/or at least one inverter 434, interconnected via a communications link 436. In some embodiments, inverter 434 may be a single inverter configure to convert aggregated DC power produced by plurality of geographically-associated fluid turbine 404 to a grid-compatible AC signal (e.g., 110V, 120V, 220V, 240V, or any other voltage level compatible with a regional electric power grid). One non-limiting example of an inverter that may be employed is an IQ7 Plus manufactured by Enphase Energy, Inc. of Fremont California.

Figure 5:
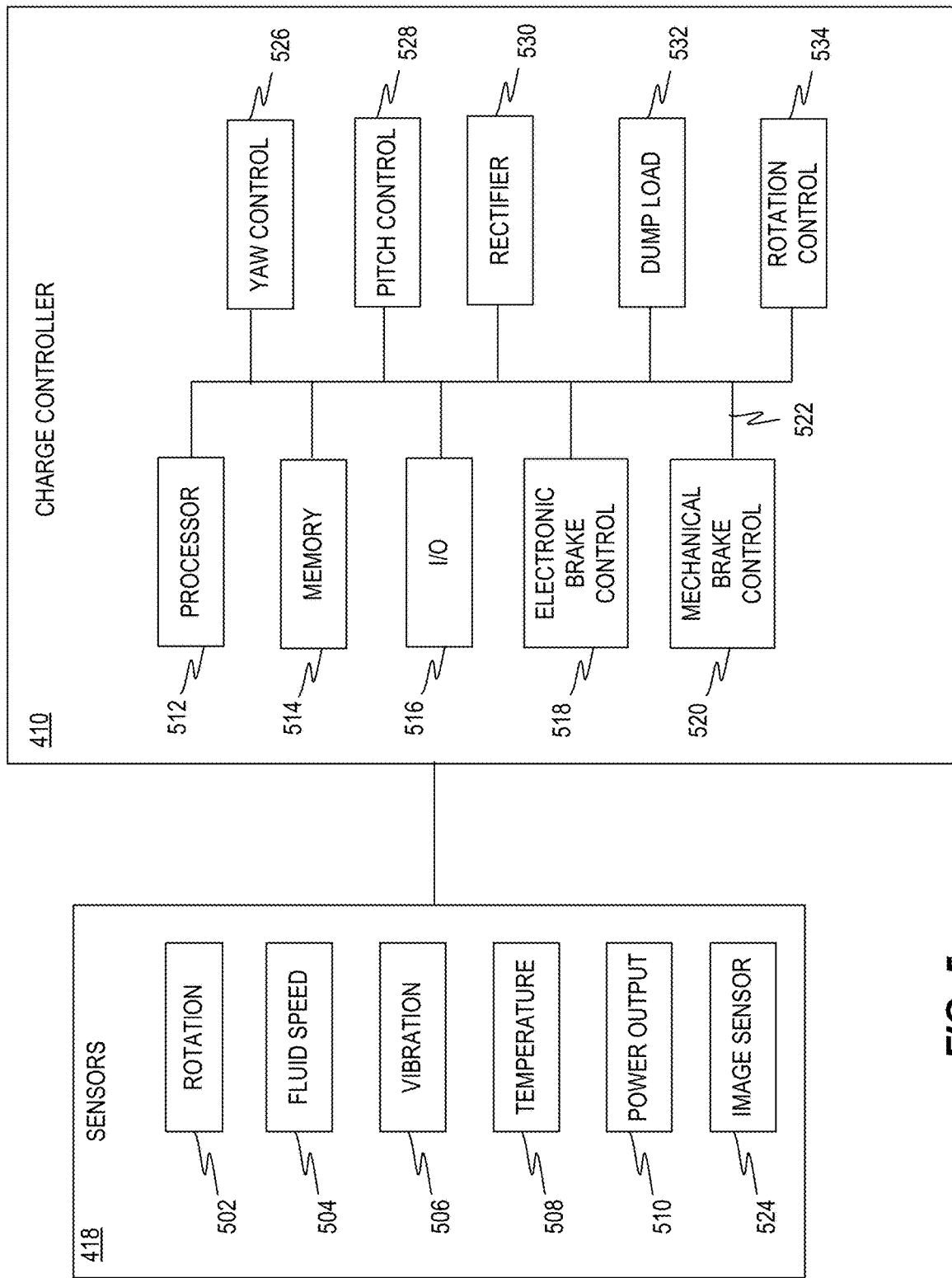
FIG. 5 is an exemplary schematic diagram of a charge controller connected to at least one sensor, consistent with some embodiments of the present disclosure.

FIG. 5 illustrates an exemplary schematic diagram of a charge controller 410 connected to at least one sensor 418, consistent with some embodiments of the present disclosure. At least one sensor 418 may include one or more rotation sensors 502, fluid speed sensors 504, vibration sensors 506, temperature sensors 508, power output sensors 510, and/or image sensors 524. The one or more rotation sensors 502 may be associated with a rotating component of fluid turbine 404 and/or energy generator 406, such as with one or more blades and/or a shaft of fluid turbine 404, and/or a rotor of energy generator 406. Fluid speed sensor 504 may be configured to sense a speed of a fluid flow affecting fluid turbine 404. Examples of fluid speed sensor 504 may include one or more of an anemometer, a water current sensor, a gas flow meter, and/or a steam flow meter for sensing. Vibration sensor 506 may include as examples one or more accelerometers, piezoelectric, piezoresistive, and/or capacitive MEMS for sensing vibrations of one or more components of fluid turbine 404 and/or energy generator 406. Temperature sensor 508 may include, for example, a thermometer, a thermostat, a thermocouple, a thermopile, an infrared thermometer, a bimetallic strip thermometer, or any other type of temperature measurement device. Power output sensor 510 may include, for example, a volt meter (e.g., a voltage sensor) and/or a current meter (e.g., a current sensor) for measuring power generated by energy generator 406. One or more image sensors 524 may include one or more cameras (e.g., a charged coupled device or CCD camera, and/or a CMOS camera for detecting visible light and/or an IR camera).

Charge controller 410 may include one or more of at least one processor 512, a memory 514, a device for input/output (I/O) 516 (e.g., for communicating with at least one processor 428 via communications link 420), an electronic brake control 518, a mechanical brake control 520, a yaw control 526, a pitch control 528, a rectifier 530, a dump load 532, and/or a rotational control 534. At least one processor 512, memory 514, I/O 516, electronic brake control 518, mechanical brake control 520, yaw control 526, pitch control 528, rectifier 530, dump load 532, rotation control 534 may be interconnected via bus system 522. In some embodiments, dump load 532 may correspond to a battery bank.

In some embodiments, dump load 532 may include a plurality of dump loads of different resistances. At least one processor 512 may switch between each of the plurality of dump loads to cause a corresponding adjustment to a rotational velocity of an associated fluid turbine and generator (e.g., to cause a fluid turbine to comply with an MPPT protocol). Additionally or alternatively, dump load 532 may include a variable electronic load (e.g., an electromechanical potentiometer and/or using one or more solid state transistors as an electronic load) allowing at least one processor 512 to adjust a load applied to a fluid generator, e.g., to comply with an MPPT protocol. In some embodiments, dump load 532 may include a plurality of dump loads of different resistances and a variable electronic load, providing at least one processor 512 with flexibility to tune a load applied to a fluid turbine, e.g., to comply with an MPPT protocol.

In some embodiments, a clock (e.g., of at least one processor) may be used as a sensor, e.g., to schedule a maintenance or safety procedure, and/or to synchronize operation of fluid turbine 404. In some embodiments, a clock may be used in conjunction with scheduling software to issue alerts (e.g., signals) to invoke braking, slowing, stopping, locking, and/or unlocking of a fluid turbine by at least one processor. In some embodiments, at least one processor 512 associated with charge controller 410 may correspond to at least one processor 308 (see FIG. 3).

Electronic brake control 518 may include an inverter and a booster, e.g., to implement an electronic braking mechanism. For example, electronic braking of fluid turbine 404 may be implemented by imposing a load (e.g., impedance) on energy generator 406. In some embodiments, electronic braking may be implemented with an AC signal. At least one processor (e.g., at least one processor 428 and/or processor 512) may determine an AC signal configured to impose a specific load to achieve a desired level of braking, e.g., by causing interference with another AC signal. In some embodiments, electronic braking may be implemented with a DC signal, e.g., to cause a switch to divert a power output of a generator to a dump load. The at least one processor may transmit a DC signal to electronic brake control 518 of charge controller 410. Electronic brake control 518 may use the DC signal to produce an AC signal, and the booster of electronic brake control 518 may amplify the AC signal to a level corresponding to the AC signal suitable for imposing a specific load on energy generator 406. The amplified AC signal may be transmitted to a rotor of energy generator 406 to impose the load and thereby control (e.g., by slowing and/or stopping) fluid turbine 404. For example, the AC signal may be used to implement an MPPT protocol, engage an electronic brake, adjust a phase of fluid turbine 404 (e.g., by slowing one fluid turbine relative to another fluid turbine), adjust a rotational speed, adjust a rotational direction, and/or to perform any other controlling operation on fluid turbine 404.

Mechanical brake control 520 may include one or more electronic switches allowing at least one processor (e.g., at least one processor 428 and/or processor 512) to control one or more mechanical brakes (e.g. brake pads, disks, and/or drums) configured with one or more rotating components of fluid turbine 404 and/or energy generator 406.

In some embodiments, electronic braking of fluid turbines 404 may be implemented by charge controllers 410, e.g., by diverting power produced by energy generators 406 to a dump load.

In some embodiments, charge controller 410 may be associated with an isolated fluid turbine (e.g., fluid turbine 100). In some embodiments, a different one of charge controllers 410 may be associated with each fluid turbine (e.g., turbines 100A, 100B, and 100C) in a cluster 300 of fluid turbines.

Figure 6:
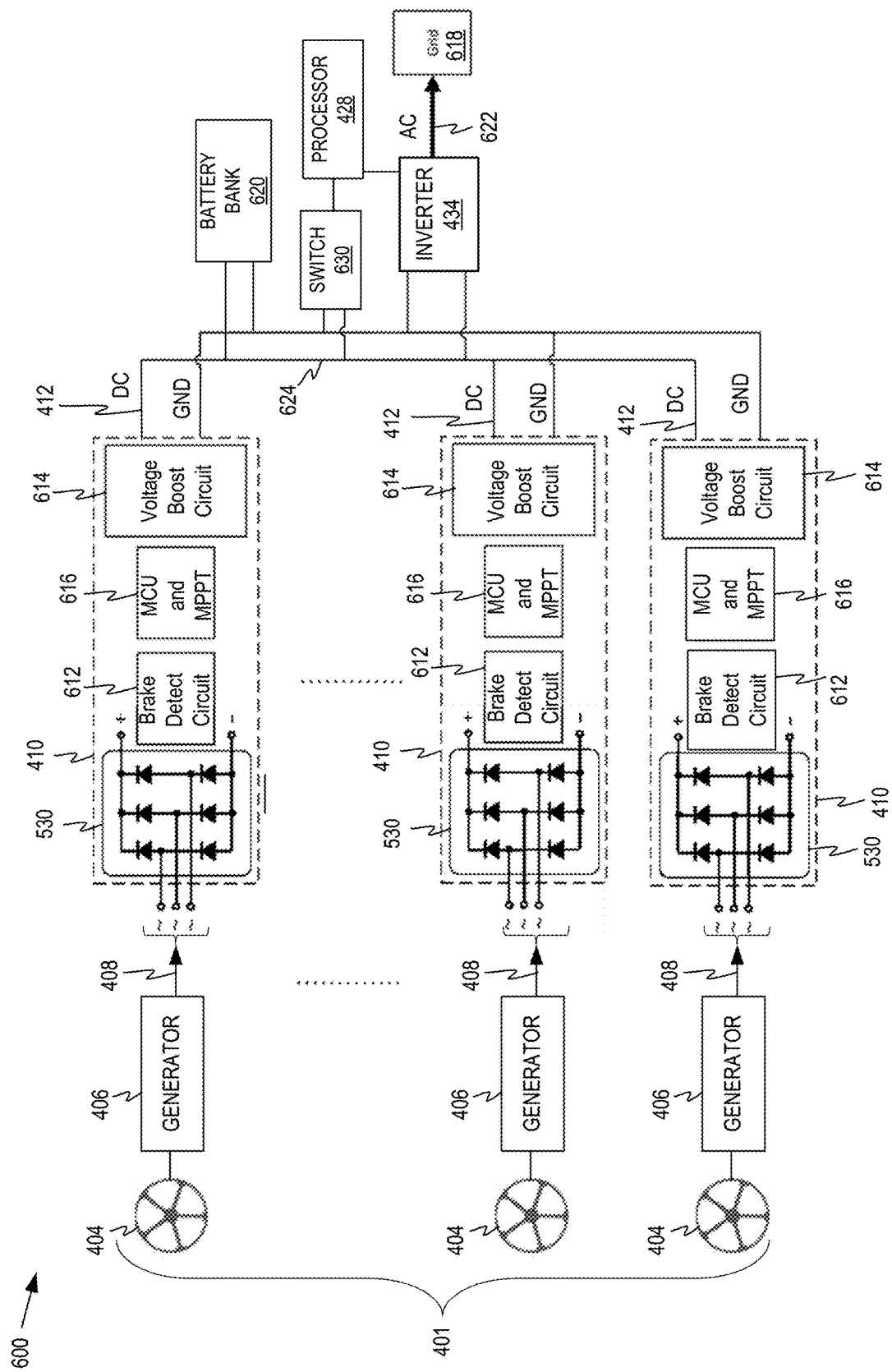
FIG. 6 is a schematic diagram of an exemplary circuit for controlling a plurality of geographically-associated fluid turbines, consistent with some embodiments of the present disclosure.

By way of a non-limiting example, FIG. 6 illustrates a schematic diagram of an exemplary circuit 600 for controlling a plurality 401 of geographically-associated fluid turbines 404, consistent with some embodiments of the present disclosure. Exemplary circuit 600 may be understood in conjunction with FIGS. 4 and 5. Fluid turbines 404 (throughout this disclosure including as described in connection with FIGS. 6-8) may be any fluid turbine, including but not limited to the various exemplary fluid turbines illustrated in FIG. 1. Fluid turbines 404 may be geographically-associated as cluster 401. Each of fluid turbines 404 may be connected to an energy generator 406 for converting energy in a fluid flow to an AC power output. Each of AC power outputs 408 may be connected to a charge controller 410. Each charge controller 410 may include one or more of rectifier 530, a brake circuit 612 (e.g., including a brake detection circuit), a voltage booster 614, and/or an MPPT control 616. Each rectifier 530 may convert an associated AC power output 408 to a DC signal, and may transmit the DC signals to brake circuit 612 and voltage booster 614 to produce a DC signal 412. Brake circuit 612 may be configured to perform electronic braking on fluid turbine 404 (e.g., based on information received from one or more of at least one sensor 418). In some embodiments, each charge controller 410 may be configured to implement an MPPT protocol on energy generator 406 connected thereto, e.g., using MPPT control 616.

Each charge controller 410 may receive a different AC power output 408 (e.g., an AC voltage) from an associated fluid turbine 404. Each charge controller 410 may convert each different AC power output 408 (e.g., AC voltage) to a different DC voltage 412 to produce a plurality of DC voltage. The plurality of DC signals 412 (e.g., DC voltages) may be combined in parallel to produce aggregated DC voltage 624. In some embodiments, generators 406 may be three-phase generators and AC power outputs 408 (e.g., AC voltages) may be three-phase AC voltages.

Each of charge controllers 410 may be connected (e.g., in parallel) to an inverter 434 and additionally to battery bank 620. Inverter 434 may be connected to an electrical grid 618. Battery bank 620 and/or electrical grid 618 may correspond to energy sink 402. Inverter 434 may be associated with at least one processor 428. In some embodiments, inverter 434 may be configured to operate in conjunction with at least one processor 428 to implement an MPPT protocol on fluid turbines 404, e.g., by manipulating a load associated with electrical grid 618. For example, increasing the load may cause rotational speeds of fluid turbines 404 to slow down, and decreasing the load may cause the rotational speeds of fluid turbines 404 to increase. Thus, in some embodiments, a single inverter 434 may be configured to implement an MPPT protocol on multiple fluid turbines 404 via multiple charge controllers 410.

Circuit 600 may include at least one switch 630. At least one processor 428 may operate at least one switch 630 to alternately direct aggregated DC voltage 624 to inverter 434 (e.g., when aggregate DC voltage 624 is compatible with inverter 434), and/or to battery bank 620 (e.g., when aggregate DC voltage 624 is incompatible with inverter 434), for instance, in response to an indication from at least one sensor (e.g., sensors 418 of FIG. 5). For example, during periods of low fluid speed conditions, at least one processor 428 may operate at least one switch 630 to direct aggregate DC voltage 624 to battery bank 620 for storage as DC energy. During periods of high fluid speed conditions, at least one processor 428 may operate at least one switch 630 to direct aggregate DC voltage 624 to inverter 434 for conversion to AC power signal 622 and for supplying AC power signal 622 to electrical grid 618. In some embodiments, during periods when DC voltage 624 is incompatible with inverter 434, at least one processor 428 may operate at least one switch 630 to draw electrical energy stored in battery bank 620 to supplement DC voltage 624 until DC voltage 624 achieves compatibility with inverter 434 for conversion to AC power signal 622, which may be supplied to electrical grid 618.

Figure 7:
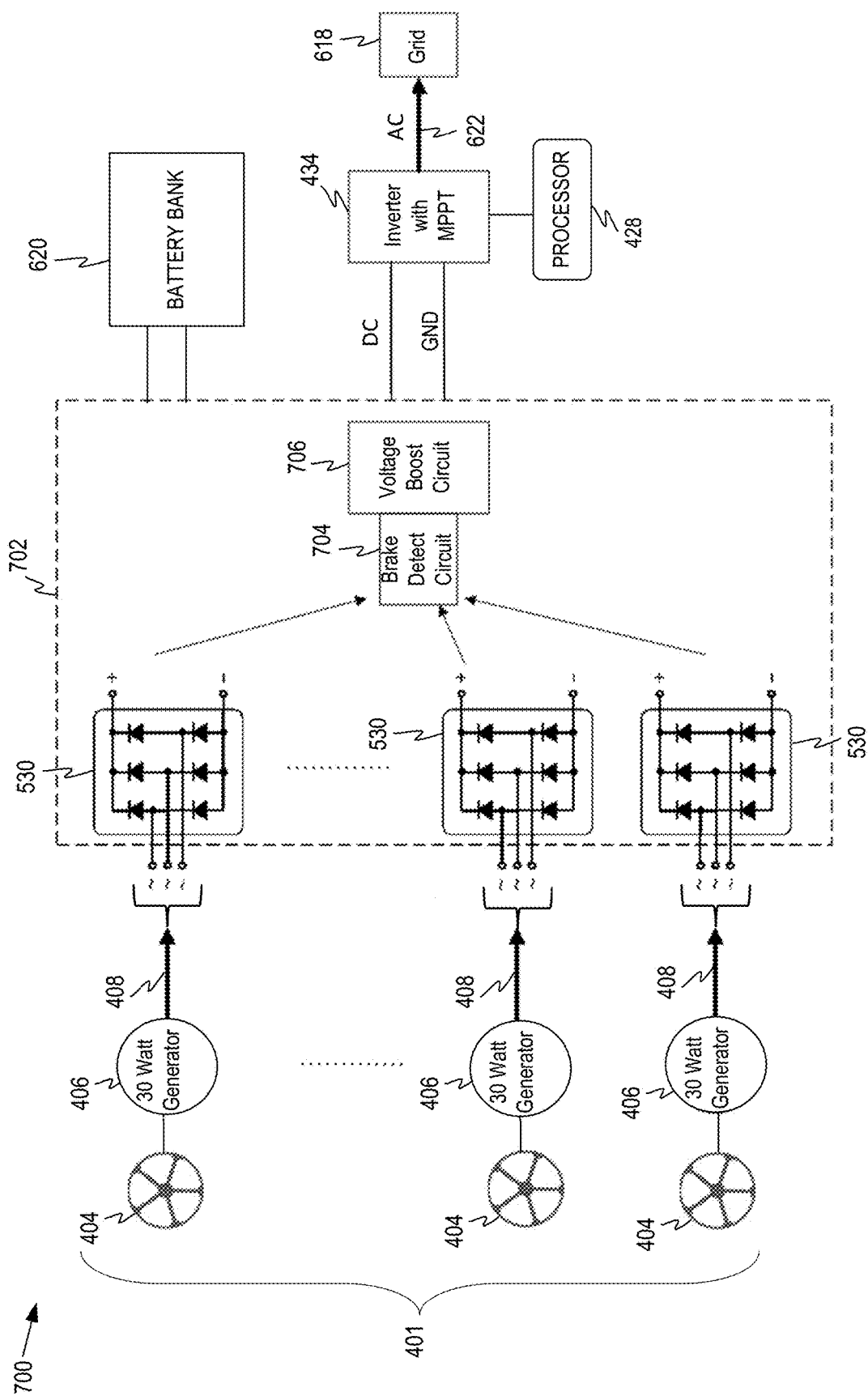
FIG. 7 is a schematic diagram of another exemplary circuit for controlling a plurality of geographically-associated fluid turbines, consistent with some embodiments of the present disclosure.

By way of another non-limiting example, FIG. 7 illustrates a schematic diagram of another exemplary circuit 700 for controlling a plurality of geographically-associated fluid turbines 404, consistent with some embodiments of the present disclosure. Circuit 700 may be substantially similar to circuit 600 (e.g., in conjunction with FIGS. 4 and 5) with the noted difference of a common (e.g., shared) charge controller 702 associated with multiple rectifiers 530 for each of energy generators 406. Each of energy generators 406 may be connected to common charge controller 702 via multiple wires (e.g. three wires for each of three phases of the output AC power signal). Each of rectifiers 530 may be connected (e.g., via two wires) to a common brake circuit 704 (e.g., including at least a braking sensor). Common brake circuit 704 may be connected to a common voltage booster 706 (e.g., a single voltage booster for all of fluid turbines 404). Charge controller 702 (e.g., common to all of fluid turbines 404) may be connected to inverter 434 for outputting AC power to electrical grid 618. Thus, a common or shared charge controller 702 may connect multiple fluid turbines 404 to a single inverter 434 via multiple rectifiers 530 (e.g., one rectifier per fluid turbine 404). In some embodiments, inverter 434 may be configured to implement an MPPT protocol on each of fluid turbines 404 via rectifiers 530. In some embodiments, a cable may connect each energy generator 406 to single charge controller 410, due to relatively low power loss of a three-phase AC output. This may be advantageous when fluid turbines 404 are spread out over a large region (e.g., when the distance between any two of fluid turbines 404 is at least greater than a blade diameter for each fluid turbine, and/or when the cluster of turbines includes many fluid turbines). Circuit 700 may lack an MPPT control, may include an individual MPPT control for each fluid turbine 404, or may include a centralized MPPT control for the plurality of geographically associated fluid turbines 404, e.g., operating as a single fluid energy conversion system.

Figure 8:
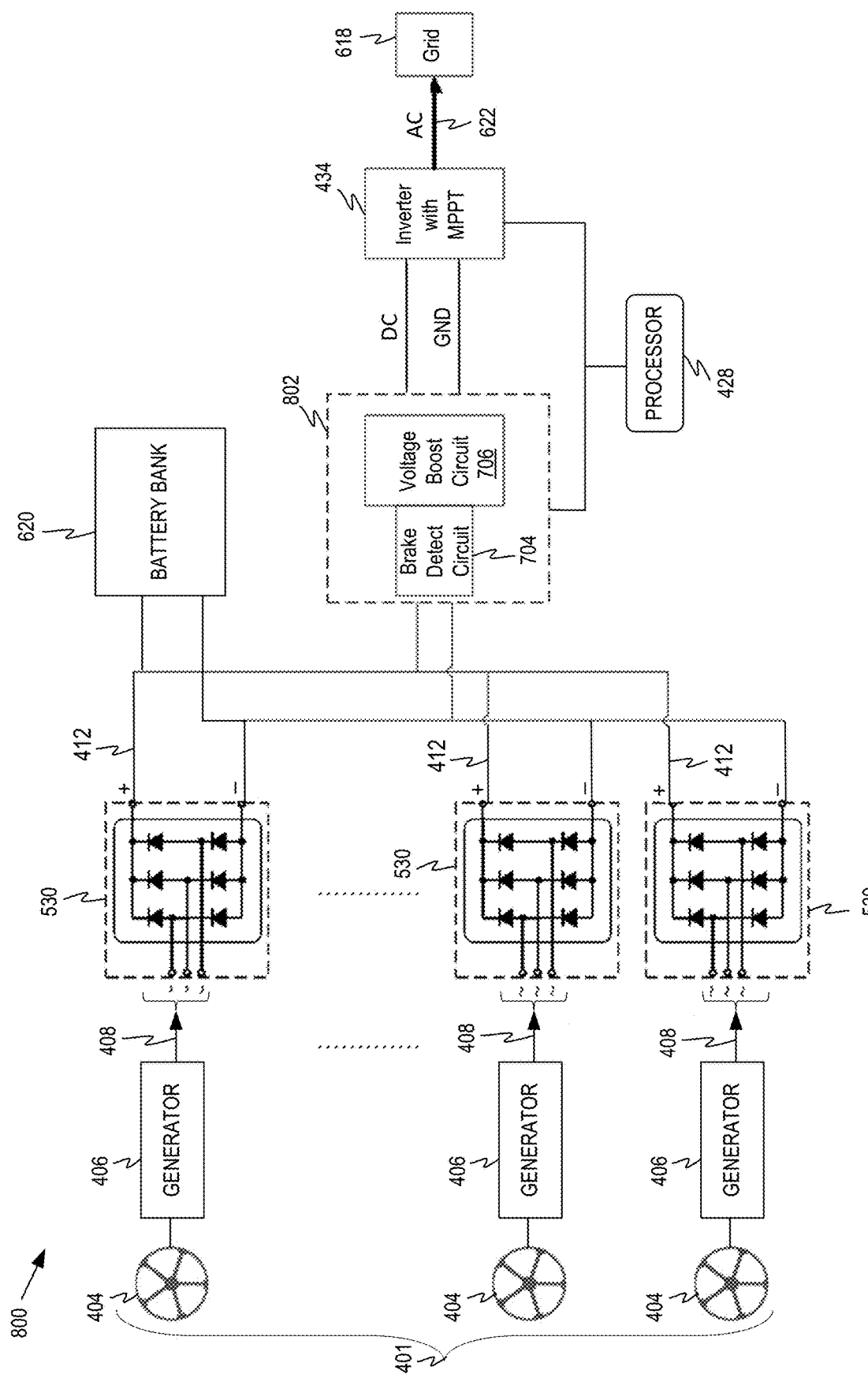
FIG. 8 is a schematic diagram of an additional exemplary circuit for controlling a plurality of geographically-associated fluid turbines, consistent with some embodiments of the present disclosure.

By way of another non-limiting example, FIG. 8 illustrates a schematic diagram of an additional exemplary circuit 800 for controlling a plurality of geographically-associated fluid turbines 404, consistent with some embodiments of the present disclosure. Circuit 800 may be substantially similar to circuits 600 and 700 (e.g., in conjunction with FIGS. 4 and 5) with the notable difference that each of energy generators 406 may be connected to a different rectifier 530 (e.g., via three inputs for a three-phase AC signal). Each of rectifiers 530 may output a DC signal (e.g., via two wires for positive and negative) to a single (e.g., common) charge controller 802, including a common brake circuit 704 and a common voltage booster 706 for the plurality of fluid turbines 404. Rectifiers 530 may be connected to charge controller 802 in parallel.

FIGS. 6-8 are intended to illustrate some exemplary implementations of circuits for controlling a cluster of fluid turbines, and are not intended to be exhaustive. Variations and modifications to one or more of the disclosed embodiments, and/or alternative combinations of two or more features disclosed, evident from the text, and/or drawings are within the scope of this disclosure. These different combinations may constitute various alternative aspects of this disclosure.

Figure 9:
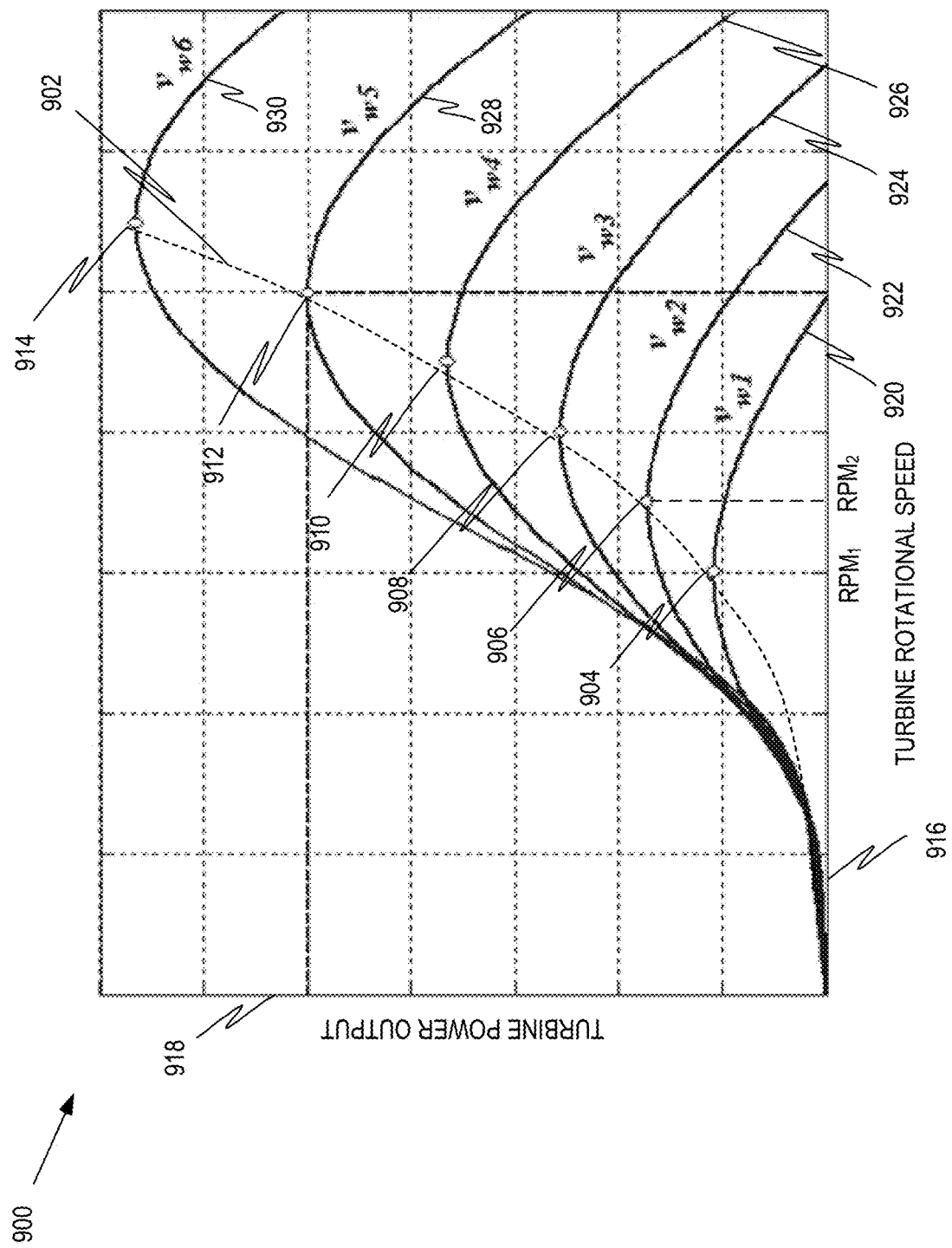
FIG. 9 is an exemplary chart showing a variation of power output versus rotational speed for a fluid turbine operating at various fluid speeds, consistent with some embodiments of the present disclosure.

FIG. 9 illustrates an exemplary chart 900 showing a variation of power output versus rotational speed for a fluid turbine operating at various fluid speeds, consistent with some embodiments of the present disclosure. Horizontal axis 916 (e.g., x-axis) of chart 900 corresponds to the rotational speed of a fluid turbine (e.g., measured as revolutions per minute RPM). Vertical axis 918 (e.g., y-axis) of chart 900 corresponds to the power outputted by a fluid turbine for each rotational speed. Chart 900 may include multiple curves (e.g., lines 920, 922, 924, 926, 928, and 930), each curve corresponding to a differing fluid speed (e.g., $v_{w1}$ to $v_{w6}$). Each of the curve of chart 900 may include a different peak (e.g., peaks 904, 906, 908, 910, 912, and 914) indicating a rotational speed at which a fluid turbine may produce a maximum (e.g., or near-maximum) level of power for the corresponding fluid speed. For instance, under fluid speed $v_{w1}$, causing a fluid turbine to rotate at a rotational speed of $RPM_1$ (e.g., by controlling a load connected thereto) may cause the fluid turbine to produce maximally achievable power 904 of curve 920 for fluid speed $v_{w1}$. Similarly, under fluid speed $v_{w2}$, causing a fluid turbine to rotate at a rotational speed of $RPM_2$ (e.g., by controlling a load connected thereto) may cause the fluid turbine to produce the maximally achievable power peak 906 of curve 922 for fluid speed $v_{w2}$, and so on.

Line 902 (e.g., tracing the peak power outputs 904 to 914 for each of fluid speeds $v_{w1}$ to $v_{w6}$) may be used to determine a target rotational speed for a fluid turbine to produce a maximum (e.g., or near-maximum) power output under each fluid speed. In some embodiments, chart 900 may be used to implement an MPPT protocol for a specific fluid turbine. In some embodiments, at least one processor (e.g., at least one processor 428 and/or 512) may use chart 900 to control a load on a fluid turbine via a charge controller (e.g., charge controllers 410, 702, and/or 802) to cause a fluid turbine to spin at a rotational speed corresponding to line 902 for a particular fluid speed. In some embodiments, each fluid turbine in a plurality of geographically-associated fluid turbines may be associated with a different version of chart 900 (e.g., depending on the design and operating parameters for each fluid turbine). In some embodiments, each fluid turbine in a plurality of geographically-associated fluid turbines may be associated with a substantially similar version of chart 900.

Figure 10:
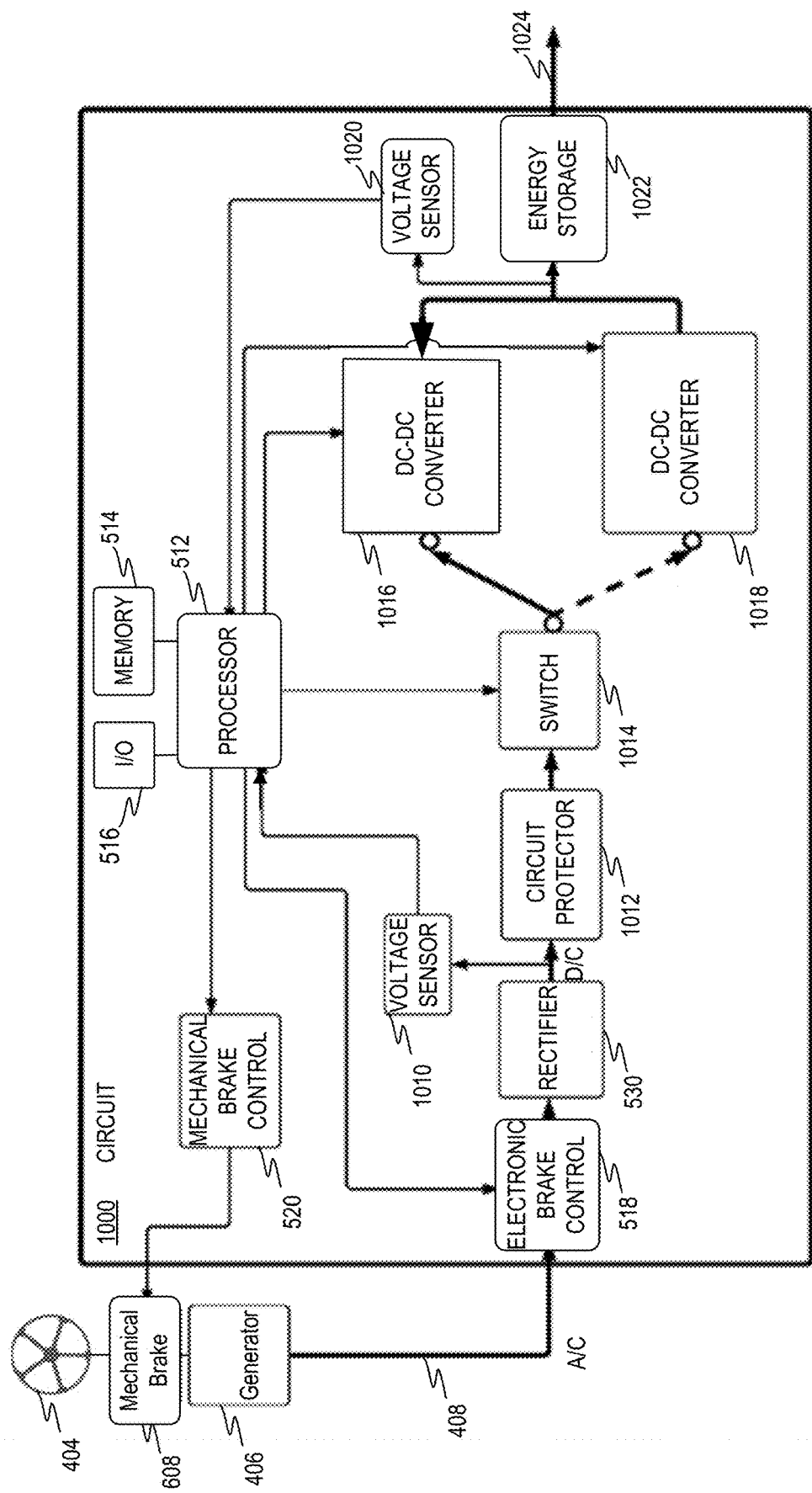
FIG. 10 is a schematic diagram of an exemplary braking circuit, consistent with some embodiments of the present disclosure.

FIG. 10 illustrates a schematic diagram of an exemplary circuit 1000, consistent with some embodiments of the present disclosure. In some embodiments, at least part of circuit 1000 may be associated with any of charge controllers 410, 702, and/or 802. In some embodiments, at least a portion of circuit 1000 may be associated with interconnecting circuitry 414. In some embodiments, a portion of circuit 1000 may be associated with any of charge controller 410, 702, and/or 802, and another portion of circuit 1000 may be associated with interconnecting circuitry 414.

Circuit 1000 may include at least one processor (e.g., at least one processor 512), memory (e.g., memory 514), mechanical brake control (e.g., mechanical brake control 520), electronic brake control (e.g., electronic brake control 518), a rectifier (e.g., rectifier 530), a first voltage sensor 1010, a circuit protector 1012 (e.g., including at least one of an electrostatic discharge, over-voltage, and/or over-current protection circuits), at least one switch 1014 (e.g., a single pole, double throw switch), a first DC/DC converter 1016 (e.g., configured to operate above a voltage threshold), a second DC/DC converter 1018 (e.g., configured to operate below the voltage threshold), a second voltage sensor 1020, an energy storage component 1022, and a DC power output 1024. Rectifier 530 may be a three-phase rectifier configured to produce a variable DC voltage output. In some embodiments, DC power output 1024 may be channeled to an inverter (e.g. inverter 434) for converting to an AC power output signal. In some embodiments, DC output 1024 may channel DC power output 1024 to a battery bank (e.g., see battery bank 620 in FIG. 6).

At least one processor 512 may control braking for fluid turbine 404 connected to energy generator 406 based on one or more signals, such as AC power output 408 (e.g., a three-phase AC power output signal) delivered to circuit 1000, and/or a signal received from one or more sensors (e.g., at least one sensor 418). Rectifier 530 may convert AC power output 408 to a DC power signal. At least one processor 512 may receive an indication of AC power output 408 as a DC power output measurement via first voltage sensor 1010. Fluid turbine 404 and energy generator 406 may be associated with mechanical brake 608. To control mechanical braking of fluid turbine 404 and/or energy generator 406, at least one processor 512 may send a control signal to mechanical brake control 520 for engaging mechanical brake 608. To control electronic braking of fluid turbine 404, at least one processor 512 may subject energy generator 406 to a load via electronic brake control 518. In some embodiments, power output sensor 510 may be associated with first voltage sensor 1010 and/or second voltage sensor 1020.

By way of a non-limiting example, first DC-DC converter 1016 may be configured to operate at 500 Watts, receive an input ranging between 18-60V and output a voltage ranging between 3.3-24V, switch on at 16.5V, and operate at an efficiency below 98.5%. Second DC-DC converter 1018 may be configured to operate at 300 Watts, receive an input ranging between 9-36V and output a voltage ranging between 8-24V, switch on at 9V, and operate at an efficiency below 97%. At least one switch 1014 may channel DC signals above or equal to 22V to first DC-DC converter 1016 and channel DC signals below 22V to second DC-DC converter 1018. In some embodiments, at least one processor 512 may subject fluid turbine 404 to an MPPT protocol by matching an electric load imposed on energy generator 406 to a rotational speed of fluid turbine 404 for a given fluid speed (e.g., based on a version of chart 900 stored in memory 514) to produce a peak (or near-peak) AC power output.

In some embodiments, at least one processor 512 may communicate with at least one processor 428, e.g., to transmit information associated with a load imposed on fluid turbine 404. For example, the information may be used by the at least one processor to implement one or more MPPT protocols (e.g., including an individual MPPT protocol or lower-level MPPT protocol for a single fluid turbines, and/or a cluster MPPT protocol or an upper-level MPPT protocol for a plurality of geographically-associated fluid turbines), to coordinate braking for a cluster of geographically-associated fluid turbines, and/or to coordinate blade orientation for a cluster of geographically-associated fluid turbines.

For example, FIG. 6 may be taken together with FIGS. 4, and 10 as a detailed schematic diagram of integral fluid energy conversion system 400. A version of circuit 1000 may be associated with each one of MPPT controls 616 of charge controllers 410, allowing each of at least one processors 512 (e.g., each dedicated to one of individual fluid turbines 404) to coordinate operations for each fluid turbine 404 (e.g., in isolation). In addition, interconnecting circuitry 414 may connect to each of MPPT controls 616, allowing at least one processor 428 to receive information from any of charge controllers 410 (e.g., each dedicated to one of individual fluid turbines 404) to coordinate operations for fluid turbines 404 operating in cluster 401 as integral fluid energy conversion system 400.

Industrial structures typically require venting for expelling waste heat and/or gases generated by performance of industrial operations therein. Some industrial structures include one or more fans for expelling air carrying waste heat and/or gases via a vent outlet, producing a flow of hot wind exhaust adjacent the vent outlet. Positioning a wind turbine adjacent to a vent outlet may permit harvesting of kinetic energy carried by the wind exhaust for conversion to electrical energy. However, there may be drawbacks to harvesting wind energy from a turbine positioned near vent outlets. For example, as a turbine completes a revolution in front of a vent outlet, the turbine may push some of wind expelled from the vent outlet back in the direction of the vent outlet, causing hot wind expelled as exhaust to be pushed back into the industrial structure. Pushing exhaust back into a venting system of an industrial structure may hamper industrial operations performed within the structure, and undermine the functionality of the vent outlet. To alleviate such drawbacks, systems and methods are disclosed for positioning a turbine to straddle an exhaust flow zone adjacent to a vent outlet. Positioning a turbine thus may allow one or more turbine blades of the turbine to capture wind exhaust for a fraction of each revolution, while reducing an amount of wind evacuated as exhaust that may be pushed back towards the vent outlet.

Some disclosed embodiments involve an industrial structure for wind energy harvesting. Wind energy harvesting refers to capturing kinetic energy carried by an airflow for conversion to other forms of energy, such as mechanical and/or electrical energy. For example, a wind turbine may harvest wind energy by converting kinetic energy carried by wind to mechanical rotational energy using one or more turbine blades, and converting mechanical rotational energy to electrical energy using an associated generator. Industrial may refer to commercial, manufacturing, and/or business related activities. An industrial scaled activity may refer to a large-scaled activity, e.g., to exploit an economy of scale. In some embodiments, an industrial process may operate uninterrupted throughout the day, week, and/or year and may continually produce a significant amount of waste heat. An industrial structure refers to a facility, building, and/or warehouse for accommodating industrial activities, processes, and/or operations. Such activities, processes, and/or operations may generate waste heat and/or gases as by-products, requiring evacuation of the same to prevent over-heating and/or build-up of toxic gasses therein. Therefore, an industrial structure may include one or more fans for evacuating air carrying waste heat and/or gasses from the industrial structure, or for cooling or ventilation. In some embodiments, other (e.g., non-industrial) buildings and facilities may be similarly used.

Some disclosed embodiments involve an industrial housing requiring venting. An industrial housing refers to a complex, facility, and/or structure for accommodating activities, processes, and/or operations associated with industry. In some embodiments, an industrial housing may be a building or a portion thereof. Some examples include manufacturing plants, refineries, server farms, warehouses, food processing plants, textile mills, automotive, plants, laboratories, agricultural processing facilities, and/or any other facility accommodating activities on an industrial scale. In other embodiments, an industrial housing may be industrial equipment, such as (by way of example only) heat exchangers, air handlers, industrial dryers, aeration systems, vacuum pumps, industrial fans and blowers, blast furnaces, and air compressors. Industrial processes may generate significant amounts of waste heat and/or gasses, which may build-up inside an industrial housing, potentially leading to over-heating and/or build-up of toxic gasses. Venting refers to expelling, evacuating, and/or releasing. An industrial housing requiring venting refers to an industrial housing warranting evacuation of waste heat and/or gasses accumulated therein or through which air is moved for purposes including cooling. For example, accumulation of waste heat and/or gasses inside an industrial housing may introduce health hazards, and/or negatively impact performance of industrial processes within the housing.

Some disclosed embodiments involve a vent outlet in the industrial housing. A vent outlet in an industrial housing refers to an opening and/or aperture in an external wall and/or roof of an industrial housing for expelling air carrying waste heat and/or gasses from inside the industrial housing to an outdoor environment. A vent outlet may face an outdoor environment, and may fluidly couple an interior of an industrial housing to the outdoor environment. The term "fluidly coupled," as used herein refers to the association of components such that a fluid such as air or other gases can pass from one component to the other. The coupling may or may not include a defined conduit along the flow path. For example, a turbine can be fluidly coupled to an airflow conduit if it is situated near an outlet of the conduit such that airflow through the conduit impacts the turbine. In other examples, two components can be fluidly coupled with an interconnecting duct.

In some embodiments, a vent outlet may be associated with a duct, conduit, and/or channel for directing an airflow from inside an industrial housing to the vent outlet where the airflow may be expelled as exhaust. For example, air carrying heat waste and/or gasses may flow through a duct inside the industrial housing and exit the industrial housing via a vent outlet. A vent outlet may be round, square, rectangular, oval-shaped, or may have any other shape conducive for evacuating exhaust.

In some disclosed embodiments, the industrial housing is a building containing machinery, and wherein the vent outlet is located in an exterior wall of the building. A building containing machinery refers to a plant and/or facility accommodating equipment for processing and/or producing products, e.g., on an industrial scale. In some embodiments, a building containing machinery may include a server farm, data center, and/or server cluster, and machinery contained therein may include one or more processors, servers, data stores, air conditioners, fans, pumps, filters, and/or any other type of machinery used in a server farm. Some additional examples of machinery that may be contained in an industrial housing may include printing presses, conveyor systems, injection molding machines, extrusion machines, packaging machines, furnaces and/or ovens, compressors and/or pumps, and/or any other type of machinery or equipment used in industry. An exterior wall of a building refers to an outer wall, such as a wall enclosing and insulating an interior of a building from environmental elements. A vent outlet located in an exterior wall of a building refers to an opening in an outer wall of a building for expelling air carrying waste heat from inside the building. In some embodiments, a vent outlet may be associated with a duct and/or channel for directing air as exhaust from inside the building to the vent outlet. For example, a server farm housing a plurality of processors may generate a significant amount of heat, requiring one or more fans to cool an interior of the server farm. The one or more fans may evacuate air carrying waste heat via a vent outlet, causing a flow hot air to exit the server farm from the vent outlet. A server farm may require one or more industrial fans to operate continually for evacuating heat continuously generated by processors housed therein, and may provide a continual flow of wind for harvesting by one or more wind turbines.

In some disclosed embodiments, the industrial housing is part of an HVAC system, and wherein the vent outlet associated with a heat exchanger of the HVAC system. A heating, ventilation, and air conditioning (e.g., HVAC) system may control temperature, humidity, air quality, and/or air movement within an interior space of a building. An HVAC system may include devices, equipment, and/or machinery for heating, ventilating and/or cooling a building. Such devices, equipment, and/or machinery may include, for example, one or more heaters, air conditioners, compressors, pumps, ventilators, fans, filters, humidifiers, dehumidifiers, and/or one or more processors and/or data stores for controlling operation of the HVAC system. A heat exchanger of an HVAC system refers to a device or equipment for enabling transfer of a fluid conveying thermal energy from an interior of a building to an outdoor environment to achieve a desired indoor temperatures. To complete a transfer of thermal energy, an HVAC system may include one or more fans for evacuating hot air from within the industrial housing. A vent outlet associated with a heat exchanger of an HVAC system refers to a vent outlet fluidly coupled to a heat exchanger of an HVAC system to enable hot air to escape the industrial housing via the vent outlet as wind. Absence of a vent outlet may cause a heat cycle associated with an HVAC system to fail, which may lead the HVAC system to malfunction and/or break down, e.g., due to overheating. Thus, a vent outlet may be critical to the operation of an HVAC system. An HVAC system may require one or more industrial fans to operate continually for evacuating continuously generated heat waste, and may provide a continual flow of wind for harvesting by one or more wind turbines.

In some disclosed embodiments, the industrial housing is a frame of a water chiller, and wherein the vent outlet is located in the frame of the water chiller. A water chiller may include a refrigeration system for cooling water used in industrial and/or commercial applications. A water chiller may remove heat from water via a refrigeration process, to produce chilled water for circulating through pipes to cool industrial equipment, processes, and/or spaces. A frame of a water chiller refers to structural framework, casing, and/or chassis for supporting and/or housing components of a water chiller system. For example, a frame of a water chiller may house one or more compressors, condensers, pumps, fans, and/or any other machinery used for a water chiller. A frame of a water chiller may provide structural integrity and/or stability, to protect components of a water chiller, and may facilitate installation, maintenance, and/or transportation. A vent outlet located in a frame of a water chiller refers to an outlet located within a frame of a water chiller for evacuating hot air produced by the water chiller to an outdoor environment. A water chiller may require one or more industrial fans to operate continually for evacuating continuously generated heat waste, and may provide a continual flow of wind for harvesting by one or more wind turbines.

In some disclosed embodiments, the industrial housing is part of an air conditioning system, and wherein the vent outlet is part of the air conditioning system. An air conditioning system refers to equipment or machinery for controlling and/or regulating temperature, humidity, and/or air quality inside an enclosed space (e.g., a building). An air conditioning system may include one or more of a compressor, a condenser, an evaporator coil, one or more fans, filters, controllers, and/or pumps. An air conditioning system may extract heat from an indoor environment and expel the heat to an outdoor environment as hot wind and/or water. An air conditioning system may require one or more industrial fans to operate continually for evacuating continuously generated heat waste. The industrial fan associated with the air conditioning system may provide a continual flow of wind for harvesting by one or more wind turbines.

In some disclosed embodiments, the industrial housing is a parking garage, and wherein the industrial fan is configured to evacuate gases from the parking garage. A parking garage refers to an enclosed facility for housing and/or stationing vehicles. As vehicles enter and exit a parking garage, vehicles may expel toxic exhaust emissions, which may accumulate inside the parking garage. Gases in a parking garage may include any airborne particles and/or molecules accumulating inside a parking garage, e.g., due to emission by a vehicle. Some examples of gases in a parking garage may include carbon monoxide, nitrogen oxide, hydrocarbons, sulfur dioxide, particulate matter, and/or volatile organic compounds. Accumulation of gases in a parking garage may cause a variety of detrimental health effects, such as headaches, dizziness, nausea, respiratory, cardiovascular, and/or eye irritations, damage to vital organs and/or nervous system, and/or death by asphyxiation. An industrial fan configured to evacuate gases from a parking garage refers to an industrial fan associated with a parking garage for pushing gases accumulated therein external to the parking garage, e.g., via a vent outlet. For example, one or more industrial fans may be located inside a parking garage in association with one or more ducts fluidly coupled to a vent outlet. Additionally or alternatively, one or more industrial fans may be embedded in an external wall of a parking garage and associated with a vent outlet on an external side of the external wall. A parking garage may require one or more industrial fans to operate continually for continuous circulation of air and evacuation of heat and/or toxic gasses accumulating therein, and may provide a continual flow of wind for harvesting by one or more wind turbines.

In some disclosed embodiments, the vent outlet is louvered. A vent outlet being louvered refers to a vent outlet including a plurality of angled and/or sloped, slats and/or strips. The plurality of slats may be arranged (e.g., vertically, horizontally, or at any other angle) to partially cover an external opening of the vent outlet. Such slats may permit airflow through a vent outlet, while protecting bodily parts (e.g., hands and/or feet) and/or animals from coming into direct contact with hot wind and/or one or more rotating blades of an associated industrial fan. Slats of a louvered vent outlet may be made of metal (e.g. aluminum), wood, plastic, and/or any other stiff material. In some embodiments, a sloping angle of louvers on a vent outlet may be adjustable to enable controlling a direction of airflow as the airflow exits from the vent. For example, an angle of louvers on a vent outlet may be adjusted to direct wind exiting the vent outlet towards one or more blade portions of one or more wind turbines. In some embodiments, an angle of louvers on a vent outlet may be adjusted to direct a first portion of wind exiting a vent outlet to interface with one or more blade portions of one or more wind turbines and direct a second portion of wind exiting the vent outlet to bypass the one or more blade portions. Adjusting a louvered vent thus may permit a blade portion of a turbine to harvest wind exiting a vent outlet for a fraction of each rotational cycle, and interface with air other than wind exiting the vent outlet for another fraction of each rotational cycle.

Slats of a louvered vent may be vertical, horizontal, /and/or oriented in any other direction. In some embodiments, a turbine may be oriented to align with a direction of an exhaust flow exiting a vent outlet.

Some disclosed embodiments involve at least one industrial fan within the industrial housing and associated with the vent outlet for evacuating exhaust from the industrial housing through the vent outlet and for forming an exhaust flow zone outside the industrial housing opposite the vent outlet, Exhaust refers to air and/or other expelled gases. For example, the flow on the downstream side of an exhaust fan, is consider exhaust. An exhaust flow zone outside an industrial housing opposite the vent outlet refers to a region and/or volume adjacent to a vent outlet of an industrial housing for accommodating air displaced from inside the industrial housing as exhaust. An exhaust flow zone opposite a vent outlet may include wind as air may be continually pushed out of an industrial housing via the vent outlet. A size and/or shape of an exhaust flow zone opposite a vent outlet may correspond to a size and/or shape of the vent outlet and/or characteristics of air flowing through the vent outlet. Such characteristics may include, for example, wind velocity, airflow turbulence, a temperature, humidity, and/or pressure gradient between an interior and exterior of the industrial housing, and/or any other characteristic affecting wind exiting an industrial housing. An exhaust flow zone may include regions directly in front, to the sides, above and/or below a vent outlet. In some embodiments, an exhaust flow zone opposite a vent outlet may be bounded by a shape of the vent outlet. Regions of an exhaust flow zone closer to a vent outlet may be associated with higher wind velocities, and regions of an exhaust flow zone further from a vent outlet may be associated with slower wind velocities, e.g., as air exiting an industrial housing dissipates into an outdoor environment. In some embodiments, wind velocities may drop off outside an exhaust flow zone. In some embodiments, an exhaust flow zone may be associated with a threshold velocity such that air flowing within the exhaust flow zone may exceed the threshold velocity, and air flowing external to the exhaust flow zone may flow below the threshold velocity. In some embodiments, a wind turbine may be positioned at least partially within an exhaust flow zone to capture energy conveyed by wind expelled from a vent outlet as exhaust. An industrial fan for forming an exhaust zone outside an industrial housing refers to an industrial-scaled propeller, vane, and/or airfoil connected to a motor, which may cause rotation of the propeller, vane, and/or airfoil causing evacuation of hot air carrying waste heat generated within an industrial housing to an exhaust flow zone external to the housing. A fan may form an exhaust flow zone by rapidly circulating air in a clockwise or counter-clockwise direction, causing the air inside the fan housing to accelerate. Continuous rotation of the fan blades may propel the accelerated air away from the fan housing and create a continuous stream of air in a direction away from the fan housing.

In some embodiments, an industrial fan may include a plurality of industrial fans for forming an exhaust zone outside an industrial housing. Wind refers to a flow of air from a higher pressure zone to a lower pressure zone. Exhaust refers to a fluid flow (e.g., including gases and/or air such as hot air) expelled as waste. For example, an exhaust flow may include an air flow caused by an industrial fan pushing air carrying waste heat away and/or gasses from an industrial housing via a vent outlet. Evacuating refers to removing, expelling, and/or displacing. An industrial fan within an industrial housing and associated with a vent outlet for evacuating wind from the industrial housing through the vent outlet refers to an industrial fan located inside an industrial housing, the industrial fan being in fluid communication with a vent outlet and operative to push air out of the industrial housing via the vent outlet. An industrial fan may continually displace hot air and/or gasses from inside an industrial housing to an exhaust flow zone external to the industrial housing, causing a continual flow of wind in the exhaust flow zone.

Figure 11:
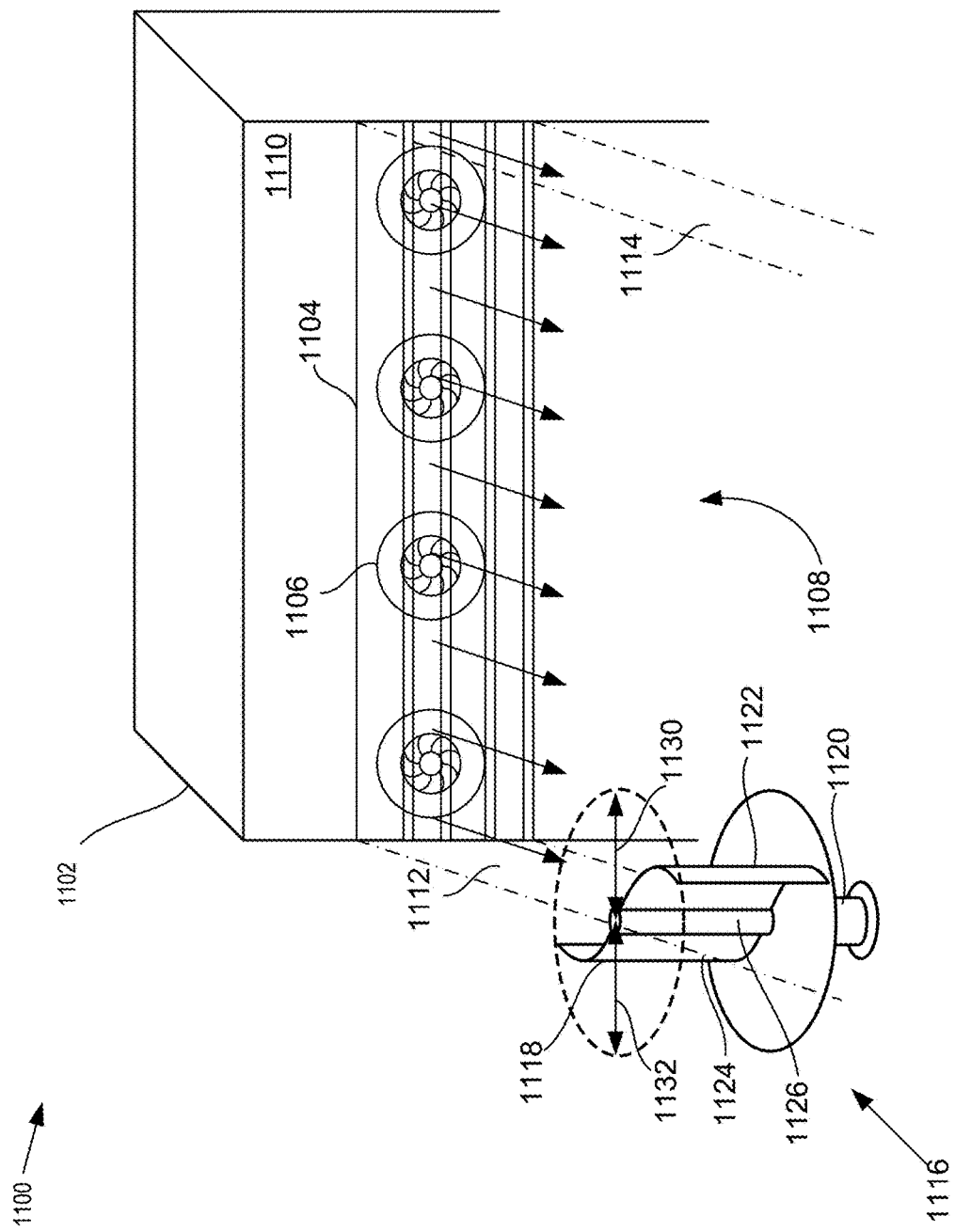
FIG. 11 is a perspective view of an exemplary industrial structure for wind energy harvesting including a single vertical-axis wind turbine, consistent with some embodiments of the present disclosure.

By way of a non-limiting example, reference is made to FIG. 11, which is a perspective view of an exemplary industrial structure 1100 for wind energy harvesting including a single wind turbine, consistent with some embodiments of the present disclosure. Industrial structure 1100 may include an industrial housing 1102 requiring venting, a vent outlet 1104, and at least one industrial fan 1106 within industrial housing 1102. While four fans are illustrated behind a louvered section in FIGS. 11-15, in many applications a single fan may be located behind each section, and a single fan may be associated with a single wind turbine or multiple wind turbines. Industrial structure 1100 may additionally include at least one industrial fan 1106 associated with vent outlet 1104. At least one industrial fan 1106 may evacuate wind from industrial housing 1102 through vent outlet 1104 and form an exhaust flow zone 1108 outside industrial housing 1102, opposite vent outlet 1104. In some embodiments, industrial housing 1102 may be a building containing machinery, and vent outlet 1104 may be located in an exterior wall 1110 of the building. For example, industrial housing 1102 may be a server farm and/or data center housing a plurality of heat-generating processors. In some embodiments, industrial housing 1102 may be part of a heating, ventilation, and air conditioning (HVAC) system, and vent outlet 1104 may be associated with a heat exchanger of the HVAC system. In some embodiments, industrial housing 1102 may be a frame of a water chiller, and wherein vent outlet 1104 may be located in the frame of the water chiller. In some embodiments, industrial housing 1102 may be part of an air conditioning system, and vent outlet 1104 may be part of the air conditioning system. In some embodiments, industrial housing 1102 may be a parking garage, and industrial fan 1104 may be configured to evacuate gases from the parking garage. In some embodiments, vent outlet 1104 may be louvered.

In some disclosed embodiments, the exhaust flow zone is defined by a first boundary extending from the industrial structure on a first side of the vent outlet and a second boundary extending from the industrial structure on a second side of the vent outlet. A boundary extending from an industrial structure on a side of a vent outlet refers to a demarcation and/or border projecting out from a wall of an industrial structure at an end of a vent outlet (e.g., to delineate a region external to the structure). The boundary need not be marked, but rather may delineate an exhaust zone region (where air propelled in an exhaust zone contains sufficient energy to contribute to rotating a turbine) from another region (in which a breeze may be felt from the exhaust fan, but where the breeze contains insufficient energy to meaningfully contribute to rotating an associated turbine). In one embodiment, the boundary may extend orthogonally outward from a vent edge on a side of the vent outlet. The boundary need not represent a precise line but may rather be considered a zone unto itself where fan exhaust, while present or not, drops off to a degree where, if the turbine where fully positioned beyond the boundary or boundary zone, the turbine would not function effectively.

In some embodiments, the boundary locations may be defined by kinetic energy such that kinetic energy of exhaust flow on sides of the first boundary and the second boundary opposite the exhaust flow zone is less than 5%, 10%, 15%, 20% or 25% of the kinetic energy in a center of the exhaust flow zone at a location of the at least one turbine.

The kinetic energy (KE) of the exhaust flow can be calculated using the formula:

$$KE = 1/2 \times m \times v^2$$

where KE=Kinetic Energy (in joules),
m=Mass of the air (in kilograms per cubic meter, typically assumed constant at 1.225 kg at 0 degrees C. and 1 ATM), and
v=Wind speed (in meters per second).

An exhaust flow zone defined by a first boundary extending from an industrial structure on a first side of a vent outlet and a second boundary extending from the industrial structure on a second side of the vent outlet refers to borders and/or limits at one or more edges of a vent outlet delineating an exhaust flow region for receiving a majority of exhaust displaced from inside an industrial housing. In some embodiments, boundaries extending from the sides of a vent outlet of an industrial structure may delineate an exhaust flow zone located substantially in front of the vent outlet, where regions beyond the sides of the vent outlet may be external to the exhaust flow zone. In some embodiments, boundaries defining an exhaust flow zone may extend substantially orthogonally from the industrial structure at the sides of a vent outlet. In some embodiments, boundaries defining an exhaust flow zone may extend at obtuse angles from the sides of a vent outlet of an industrial housing. In some embodiments, a boundary of an exhaust flow zone may be associated with a threshold velocity. In some embodiments, a boundary defining an exhaust flow zone may be associated with a definitive line, such that air flowing on one side of the line may be inside the exhaust flow zone, and air flowing on the other side of the line may be external to the exhaust flow zone. In some embodiments, a boundary defining an exhaust flow zone may include a transition region corresponding to a gradient in airflow velocity. In some embodiments, wind velocities external to an exhaust flow zone may be at least 20%, 30%, 40%, 50%, 60%, 70%, 80%, or 90% slower than maximum exhaust fan velocities inside the exhaust flow zone.

By way of a non-limiting example, in FIG. 11, exhaust flow zone 1108 may be defined by a first boundary 1112 extending from industrial structure 1102 on a first side of vent outlet 1104 and a second boundary 1114 extending from industrial structure 1102 on a second side of vent outlet 1104. For example, exhaust flow zone 1108 may include a three-dimensional volume bounded on one side by vent outlet 1104. First and second boundaries 1112 and 1114 may be two-dimensional planes bounding exhaust flow zone 1108 on either side thereof, and extending from industrial structure 1102 from either side of vent outlet 1104. In some embodiments, first and second boundaries 1112 and 1114 may extend orthogonally from industrial structure 1102. In some embodiments, first and second boundaries 1112 and 1114 may extend at acute angles from industrial structure 1102, spreading out from vent outlet 1104, e.g., as wind exiting vent outlet 1104 disperses into an outdoor environment. In some embodiments, a height of first and second boundaries 1112 and 1114 may correspond to a height of vent outlet 1104.

Some disclosed embodiments involve at least one wind turbine positioned external to the vent outlet and including a turbine blade portion and an electric generator. A wind turbine positioned external to a vent outlet refers to a wind turbine located in proximity to but outside a vent outlet of an industrial housing. Positioning a wind turbine thus may permit blades of the wind turbine to capture exhaust exiting the industrial housing via the vent outlet. A turbine blade portion refers to a part of a wind turbine, as described elsewhere herein, for converting wind to mechanical rotational motion. A turbine blade portion may include at least a section of a turbine blade. In some embodiments, a turbine blade portion may include a single blade of a wind turbine. In some embodiments, a turbine blade portion may include a section and/or piece of a blade, e.g., less than an entire blade. For instance, a blade portion may include a section on a top, bottom, and/or side edge of a blade, and/or in the middle of a blade. In some embodiments, a wind turbine may include a single (e.g., C-shaped) blade, and a blade portion may include a piece of the single blade. In some embodiments, a turbine blade portion may include multiple blades and/or sections thereof. An electric generator refers to a machine for converting mechanical energy contained in rotational motion to electrical energy. A wind turbine including a turbine blade portion and an electric generator refers to a machine including at least one blade for converting an airflow to rotational motion by a rotor, and a generator for converting rotational motion of a rotor to electrical energy. Connecting a turbine blade portion to an electric generator may permit conversion of energy contained in an airflow to mechanical rotational motion via the turbine blade portion, and conversion of mechanical rotational motion to electrical energy via the electric generator.

In some disclosed embodiments, the at least one wind turbine is positioned with respect to the vent outlet such that during each rotational cycle, the blade portion of the at least one wind turbine is partially within the exhaust flow zone and partially outside the exhaust flow zone straddling the first boundary. A wind turbine positioned external to a vent outlet refers to a wind turbine located in proximity to a vent outlet of an industrial housing. Positioning a wind turbine thus may permit a blade portion of the wind turbine to capture wind exiting the industrial housing via the vent outlet as exhaust. A rotational cycle (e.g., of a blade portion) refers to a complete revolution by at least one turbine blade spinning about a turbine shaft. During a complete rotational cycle, a blade portion of a turbine may complete a circular path spanning 360°. During a partial rotational cycle, a blade portion may complete a circular path spanning less than 360° (e.g., a circular arc). A blade portion straddling a boundary refers to a blade portion positioned on alternating side of a demarcating line and/or transition region defining an exhaust flow zone during each rotational cycle. For example, a wind turbine may include a single blade that, during each 360 degree revolution, may be located inside an exhaust flow zone for a fraction of the revolution, and located outside the exhaust flow zone for another fraction of the revolution (e.g., and located partially inside and partially outside the exhaust flow zone for the remainder of the revolution). Alternatively, the blade portion may straddle the boundary so that some of the blade is inside the boundary and some of the blade is outside the boundary at any given time. For example, a vertical axis wind turbine may include a single C-shaped blade spanning more than 180 degrees about a central shaft, such that sections of the single C-shaped blade may be entirely inside the exhaust flow zone for a fraction of each 360 degree revolution, and entirely outside the exhaust flow zone for another fraction of each 360 degree revolution. As a further example, a turbine may include two blades oriented at 180 degrees to each other, such that during each 360 degree revolution, when a first of the two blades is entirely inside an exhaust flow zone, the other of the two blades is entirely outside the exhaust flow zone, and the reverse. Similarly for wind turbines with three, four, or more blades, during each 360 degree revolution, at least one of the blades may be entirely inside the exhaust flow zone and at least a portion of another one of the blades may be outside the exhaust flow. Positioning a turbine to straddle a boundary defining an exhaust flow zone may cause a portion of an associated blade portion to be inside the exhaust flow zone, and another portion of the associated blade portion to be external to the exhaust flow zone at any given point in time. For example, positioning a turbine to straddle a boundary extending from an industrial structure on a first side of a vent outlet may stagger the turbine over to the side of the vent outlet, such that a fraction of a blade portion of the turbine may be in front of the vent outlet (e.g. inside an associated exhaust flow zone) and another fraction of the blade portion may be over to the side of the vent outlet (e.g., external to the exhaust flow zone).

During each rotational cycle, a blade portion of at least one wind turbine being partially within an exhaust flow zone refers to a wind turbine positioned in a manner to cause an associated blade portion to interface with wind inside an exhaust flow zone for only a fraction of each rotational cycle. For example, positioning a turbine to straddle a boundary defining an exhaust flow zone may cause a circular arc swept by an associated blade portion inside the exhaust flow to be less than 360°. In some embodiments, a circular arc swept by an associated blade portion inside an exhaust zone may be less than 270°, 240°, 180°, 120°, 90° or less than any other fraction of a full rotational cycle (e.g., less than three-quarters, two thirds, one half, one third, one quarter, or less than any other fraction of a full rotational cycle). During each rotational cycle, a blade portion of at least one wind turbine being partially outside the exhaust flow zone refers to a wind turbine positioned to cause an associated blade portion to interface with air external to an exhaust flow zone for only a fraction of each rotational cycle. For example, positioning a turbine to straddle a boundary defining an exhaust flow zone may cause a circular arc swept by an associated blade portion outside the exhaust flow to be greater than 0°. In some embodiments, a circular arc swept by an associated blade portion outside an exhaust zone may be greater than 270°, 240°, 180°, 120°, 90° or greater than any other fraction of a full rotational cycle (e.g., greater than three-quarters, two thirds, one half, one third, one quarter, or greater than any other fraction of a full rotational cycle). Consequently, at any given point in time during each rotational cycle, a fraction of a turbine blade portion may be inside an exhaust flow zone defined on one side by the boundary, and a complementary fraction of the turbine blade portion may be outside the exhaust flow zone. Positioning a turbine thus may cause the associated blade portion to push some air in a direction away from the vent outlet during the fraction of each revolutionary cycle that the associated blade portion is located outside the exhaust flow zone, thereby preventing the blade portion from pushing air back into the vent outlet at least partially. Since pushing hot air back into a vent outlet after an industrial fan pushed out the hot air as exhaust may negatively impact operations inside an industrial housing, positioning a turbine to straddle a border defining an exhaust flow zone in proximity to a vent outlet of an industrial housing may allow the turbine to exploit some wind expelled from the vent outlet for conversion to electrical energy while reducing harm to industrial operations caused by a return of hot wind being into the vent outlet.

By way of a non-limiting example, in FIG. 11, industrial structure 1100 may include at least one wind turbine 1116 including a turbine blade portion 1118 and an electrical generator 1120. In the non-limiting example shown, wind turbine 1116 may include at least two blades 1122 and 1124 connected to a turbine shaft 1126, where each of blades 1122 and 1124 may correspond to a blade portion. For brevity, the description that follows relates to blade portion 1118 corresponding to blade 1124, however, the description may equally apply to a blade portion corresponding to blade 1122. At least one wind turbine 1116 may be positioned external to vent outlet 1104 and with respect to vent outlet 1104 such that during each rotational cycle, blade portion 1118 of wind turbine 1104 may be partially within exhaust flow zone 1108 and partially outside exhaust flow zone 1108, straddling first orthogonal boundary 1112. For instance, a fraction 1130 of a diameter of wind turbine 1116 may be inside exhaust flow zone 1108 and a complementary fraction 1132 of the diameter may be outside exhaust flow zone 1108. Thus, some wind capture by wind turbine 1116 may be within exhaust flow zone as wind exiting vent outlet 1104, and some air pushed by wind turbine 1116 may be located external to exhaust flow zone 1108.

In some disclosed embodiments, the at least one wind turbine includes an additional wind turbine positioned with respect to the vent outlet such that during each rotational cycle, a blade portion of the additional wind turbine is partially within the exhaust flow zone and partially outside the exhaust flow zone straddling the second of the boundaries. An additional turbine positioned with respect to the vent outlet refers to a second turbine located in proximity to a vent outlet, alongside (immediately adjacent) a first turbine. An additional wind turbine positioned with respect to the vent outlet such that during each rotational cycle, a blade portion of the additional wind turbine is partially within the exhaust flow zone and partially outside the exhaust flow zone straddling the second of the boundaries may be understood as described earlier for positioning at least one turbine in proximity to a vent outlet to straddle a boundary defining an associated exhaust flow zone. Thus, two turbines may be positioned partially in front of a vent outlet, where a first turbine may straddle a first boundary on a first side of an exhaust flow zone defined by a first side of the vent outlet, and a second turbine may straddle a second boundary on a second side of the exhaust flow zone defined by a second side of the vent outlet. Positioning two turbines in partially in front of a vent outlet may permit greater capture of wind for converting to electrical energy than may be captured by a single turbine positioned in front of a vent outlet. Moreover, positioning two turbines partially in front of a vent outlet, such that each turbine straddles a boundary defining an associated exhaust flow zone may permit each turbine to capture some wind exiting the vent outlet as exhaust during a first portion of each rotational cycle, while reducing an amount of air pushed back toward the vent outlet during a second portion of each rotational cycle.

In some disclosed embodiments, a gap exists between the at least one wind turbine and the additional wind turbine in the exhaust flow zone to thereby enable exhaust from the vent outlet to pass between the at least one wind turbine and the additional wind turbine. A gap refers to a space and/or separation between two object. A gap exists between the at least one wind turbine and the additional wind turbine in the exhaust flow zone refers to a space separating a first wind turbine from a second wind turbine inside the exhaust flow zone. For example, first and second blade wind turbines having a blade diameter of less than half the width of an exhaust flow zone may be positioned toward each edge of the exhaust flow zone, such that a space separating the first and second wind turbines remains in a central region of the exhaust flow zone. Alternatively, first and second wind turbines having a blade diameter of greater than or equal to half the width of an exhaust flow zone may be located at each edge of the exhaust flow zone, straddling a boundary thereof, and leaving a gap therebetween in a central region of the exhaust flow zone. To enable exhaust fluid from a vent outlet to pass between a first turbine blade portion and a second turbine blade portion refers to a gap permitting some exhaust expelled from a vent outlet to flow between first and second turbines and bypass the first and second wind turbine blade portions. A gap permitting some wind to bypass one or more blades and/or portions thereof of a first and second wind turbine may reduce an amount of wind pushed back into the vent outlet by the first and second wind turbines, while permitting the first and second wind turbines to capture of at least some wind entering the exhaust flow zone from the vent outlet on either side of the gap. For fractions of each rotational cycle during which a blade portion of the first and/or second wind turbines are inside an exhaust flow zone, the blade portion may capture wind expelled from the associated vent outlet for conversion to electrical energy. For fractions of each rotational cycle during which a blade portion of the first and/or second wind turbines are outside the exhaust flow zone, the blade portion may push at least some air away from the vent outlet. Thus, throughout each rotational cycle, at least some wind exiting the vent outlet may bypass the first and second wind turbines through a gap located there between.

In some disclosed embodiments, the exhaust flow zone has a width, and wherein the gap spans at least a quarter of the width. An exhaust flow zone having a width refers to a horizontal dimension of an exhaust flow zone. In some embodiments, a width of an exhaust flow zone may be defined by boundaries extending from either side of an associated vent outlet. In some embodiments, a velocity of wind flowing within a width of an exhaust flow zone exceeds a threshold velocity, whereas a velocity of wind flowing beyond a width of the exhaust flow zone may fail to meet the threshold velocity. In some embodiments, a width of an exhaust flow zone may vary in proportion to a distance from an associated vent outlet. For instance, in regions adjacent to a vent outlet, a width of an exhaust flow zone may correspond to a width of the vent outlet, and in regions further from the vent outlet, a width of an exhaust flow zone may be greater than a width of the vent outlet, e.g., due to dispersal of wind exiting the vent outlet. In some embodiments, a width of an exhaust flow zone may be constant at different distances from an associated vent outlet. A gap spanning at least a quarter of the width refers to a space separating the first and second blade portions and extending along one fourth a width of an exhaust flow zone. For example, a first wind turbine (e.g., and/or an associated blade diameter) may occupy approximately three eighths of an exhaust flow zone width on one side thereof, where a complementary fraction of the first wind turbine may be located outside the exhaust flow zone (e.g., straddling a first boundary defining a first side of the exhaust flow zone). Similarly, a second turbine (e.g., and/or an associated blade diameter) may occupy approximately three eighths of an exhaust flow zone width on the other side thereof, where a complementary fraction of the second turbine may be located outside the exhaust flow zone (e.g., straddling a second boundary defining a second side of the exhaust flow zone). Such an arrangement may result in a gap separating the first and second turbines (e.g., in the middle of the exhaust flow zone) corresponds to approximately one quarter the width of the exhaust flow zone, permitting a proportional amount of wind exiting the vent outlet to bypass the first and second blade portions via the gap. Permitting wind to bypass the blades of the first and second wind turbines via the gap may reduce an amount of wind pushed back toward the vent outlet by the first and second wind turbines, while permitting capture of wind flowing inside approximately three quarters of the exhaust flow zone.

In some disclosed embodiments, the exhaust flow zone has a width between the first boundary and the second boundary, and wherein the gap spans at least a third of the width. An exhaust flow zone having a width between a first boundary and a second boundary may be understood as described earlier. A gap spanning at least a third of a width of an exhaust flow zone refers to a space separating the first and second blade portions and extending along one third a width of an exhaust flow zone. For example, a first wind turbine (e.g., and/or an associated blade diameter) may occupy approximately one third of an exhaust flow zone width on one side thereof, where a complementary fraction of the first wind turbine may be located outside the exhaust flow zone (e.g., straddling a first boundary defining a first side of the exhaust flow zone). Similarly, a fraction of a second wind turbine (e.g., and/or an associated blade diameter) may occupy approximately one third of an exhaust flow zone width on the other side thereof, where a complementary fraction of the second wind turbine may be located outside the exhaust flow zone (e.g., straddling a second boundary defining a second side of the exhaust flow zone). Such an arrangement may result in a gap separating the first and second turbines (e.g., in the middle of the exhaust flow zone) corresponds to approximately one third the width of the exhaust flow zone, permitting a proportional amount of wind exiting the vent outlet to bypass the blades of the first and second wind turbines via the gap. In some embodiments, a gap separating first and second turbines positioned at least partially inside an exhaust flow zone straddling boundaries on either sides thereof may be at least one half, one fifth, one sixth, and/or any other fraction of an exhaust flow zone width.

Figure 12:
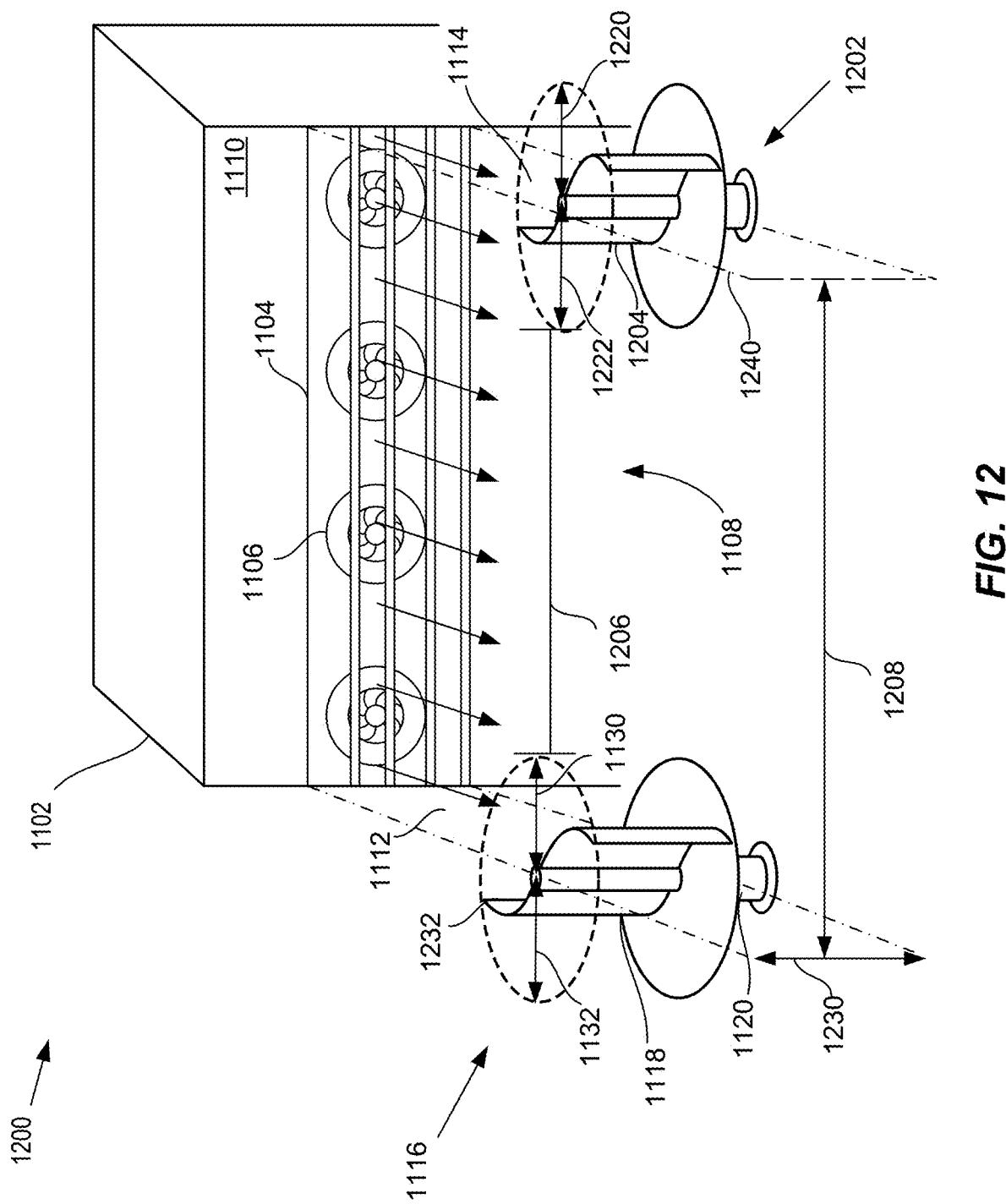
FIG. 12 is a perspective view of an exemplary industrial structure for wind energy harvesting including two vertical-axis wind turbines, consistent with some embodiments of the present disclosure.

By way of a non-limiting example, reference is made to FIG. 12 which is a perspective view of an exemplary industrial structure 1200 for wind energy harvesting include two vertical-axis wind turbines, consistent with some embodiments of the present disclosure. Industrial structure 1200 may be substantially similar to industrial structure 1100 of FIG. 11 with the notable difference of an additional wind turbine 1202 alongside at least one turbine 1116, positioned in front of vent outlet 1104. Additional wind turbine 1202 may be positioned with respect to vent outlet 1104 such that during each rotational cycle, a blade portion 1204 of additional wind turbine 1202 may be partially within exhaust flow zone 1108 and partially outside exhaust flow zone 1108, straddling second boundary 1114. For example, a first fraction 1220 of a turbine diameter of additional wind turbine 1202 may be inside exhaust flow zone 1108 and a complementary fraction 1222 of the turbine diameter may be outside exhaust flow zone 1108. In some embodiments, a gap 1206 may exist between first wind turbine 1116 and second wind turbine 1202 in exhaust flow zone 1108 to thereby enable wind from vent outlet 1104 to pass between the blades of first wind turbine 1116 and the blades of second turbine 1202. In some embodiments, exhaust flow zone 1108 has a width 1208, (e.g., between first boundary 1112 and second boundary 1114). In some embodiments, gap 1206 may span at least a quarter of width 1208. In some embodiments, gap 1206 may span at least a third of width 1208. Maintaining gap 1206 between first and second turbine blade portions 1118 and 1204 may permit some wind to pass through gap 1206 and bypass first and second wind turbines 1116 and 1202 (e.g., and associated blade portions 1118 and 1204), which may reduce an amount of wind from being pushed back towards vent outlet 1104 by any of wind turbines 1116 and 1202 after the wind exited vent outlet 1104.

In some disclosed embodiments, the first wind turbine is a vertical axis wind turbine and the second wind turbine is a horizontal axis wind turbine. A vertical axis wind turbine and a horizontal axis wind turbine may be understood as described elsewhere herein. For example, a horizontal axis turbine may be positioned to straddle a first boundary defining a first side of an exhaust flow zone and a vertical axis turbine may be positioned to straddle a second boundary defining a second side of the exhaust flow zone. In some embodiments, a horizontal axis wind turbine may be positioned at a similar distance from a vent outlet than a vertical axis wind turbine. In some embodiments, a horizontal axis wind turbine may be located closer or further from the vent outlet than a vertical axis wind turbine. For example, horizontal and vertical axes wind turbines may be positioned such a distance between blade tips of each turbine and a vent outlet are substantially similar, such that a shaft of the horizontal axis turbine to be further from the vent outlet than the vertical axis wind turbine.

In some disclosed embodiments, the first wind turbine is a vertical axis wind turbine and the second wind turbine is a vertical axis wind turbine. The first and second wind turbines are vertical axis turbines refers to positioning a first vertical axis wind turbine to straddle a first boundary defining a first side of an exhaust flow zone and positioning a second vertical axis turbine may be positioned to straddle a second boundary defining a second side of the exhaust flow zone. In some embodiments, the first vertical axis turbine is a drag-type turbine and the second vertical axis turbine is a lift-type turbine. A drag-type wind turbine may include one or more vertically or helically aligned blades having a curved or scoop shape for creating drag force as the blades rotate. A lift-type turbine may have airfoil shaped blades configured to generate an upwards lift force as the blades rotate. In some embodiments, the first and second vertical axis turbines are lift-type turbines. In some embodiments, the first and second vertical axis turbines are drag-type type turbines. In some embodiments, first and second blade portions of first and second vertical axis turbine may be oblong shaped, and the first and second blade portions may be positioned to substantially align a longer axis of each oblong shape with the boundaries extending from an associated vent outlet and defining the exhaust flow zone, (e.g., such that the longer axis may be substantially perpendicular to a wall of the industrial housing containing the vent outlet). In some embodiments, first and second blade portions of first and second vertical axis turbine may be oblong shaped, and the first and second turbines may be oriented at 90 to each other, with the first turbine positioned with a longer axis aligned substantially parallel with a wall containing an associated vent outlet, and the second turbine positioned with the longer axis substantially aligned with a boundary defining the exhaust flow zone and extending from the vent outlet. In some embodiments, the first and second blade portions may be oblong shaped and longer axes of each oblong shaped blade portions may be aligned with a boundary extending from an associated vent outlet at obtuse angles from the sides of the vent outlet.

Figure 13:
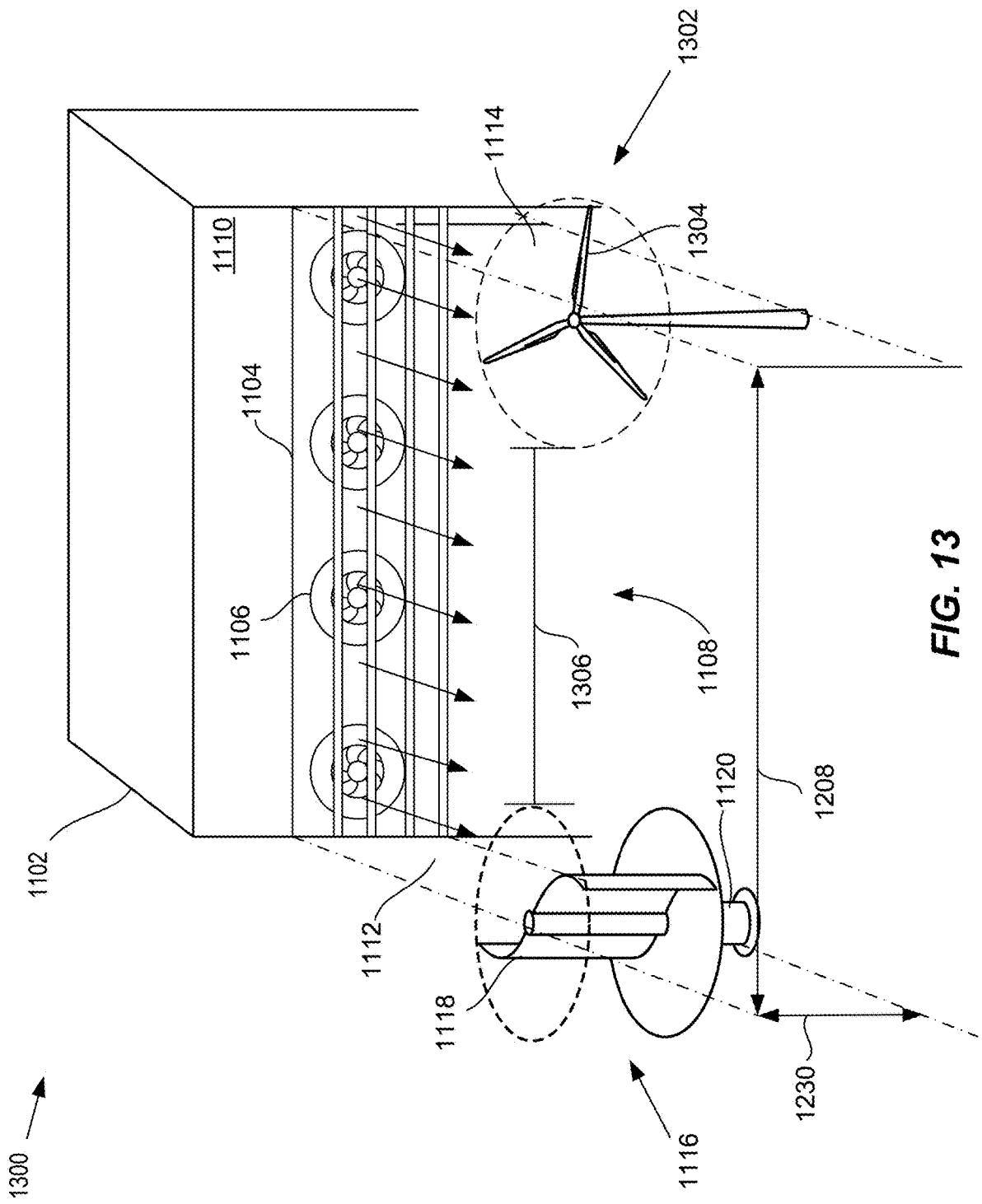
FIG. 13 is a perspective view of an exemplary industrial structure for wind energy harvesting including a vertical-axis wind turbine and a horizontal-axis wind turbine, consistent with some embodiments of the present disclosure.

By way of a non-limiting example, reference is made to FIG. 13 which is a perspective view of an exemplary industrial structure 1300 for wind energy harvesting including a vertical-axis wind turbine and a horizontal-axis wind turbine, consistent with some embodiments of the present disclosure. Industrial structure 1300 may be substantially similar to industrial structure 1200 of FIG. 12 with the notable difference of a horizontal axis wind turbine 1302 located alongside at least one turbine 1116 (e.g., a vertical axis wind turbine) in front of vent outlet 1104. Horizontal axis wind turbine 1302 may be positioned with respect vent outlet 1104 such that during each rotational cycle, a horizontal blade portion 1304 of horizontal axis wind turbine 1302 may be partially within exhaust flow zone 1108 and partially outside exhaust flow zone 1108 straddling second boundary 1114. During each rotational cycle, a gap 1306 may separate a tip of blade portion 1304 of horizontal axis wind turbine 1304 from a tip or edge of blade portion 1118 of vertical wind turbine 1116, permitting some wind exiting vent outlet 1104 to flow through gap 1306, bypassing (e.g., vertical) wind turbines 1116 and 1302. Maintaining gap 1306 between first and second turbine blade portions 1118 and 1304 may permit some wind to pass through gap 1306 and bypass first and second turbine blade portions 1118 and 1304, which may reduce an amount of wind from being pushed back towards vent outlet 1104 by any of wind turbines 1116 and 1302 after the wind exited vent outlet 1104. By way of another non-limiting example, in FIG. 12, wind turbines 1116 and 1202 (e.g., positioned in front of vent outlet 1104 to straddle boundaries 1112 and 1114 of exhaust flow zone 1108) may be vertical axis wind turbines.

Figure 15:
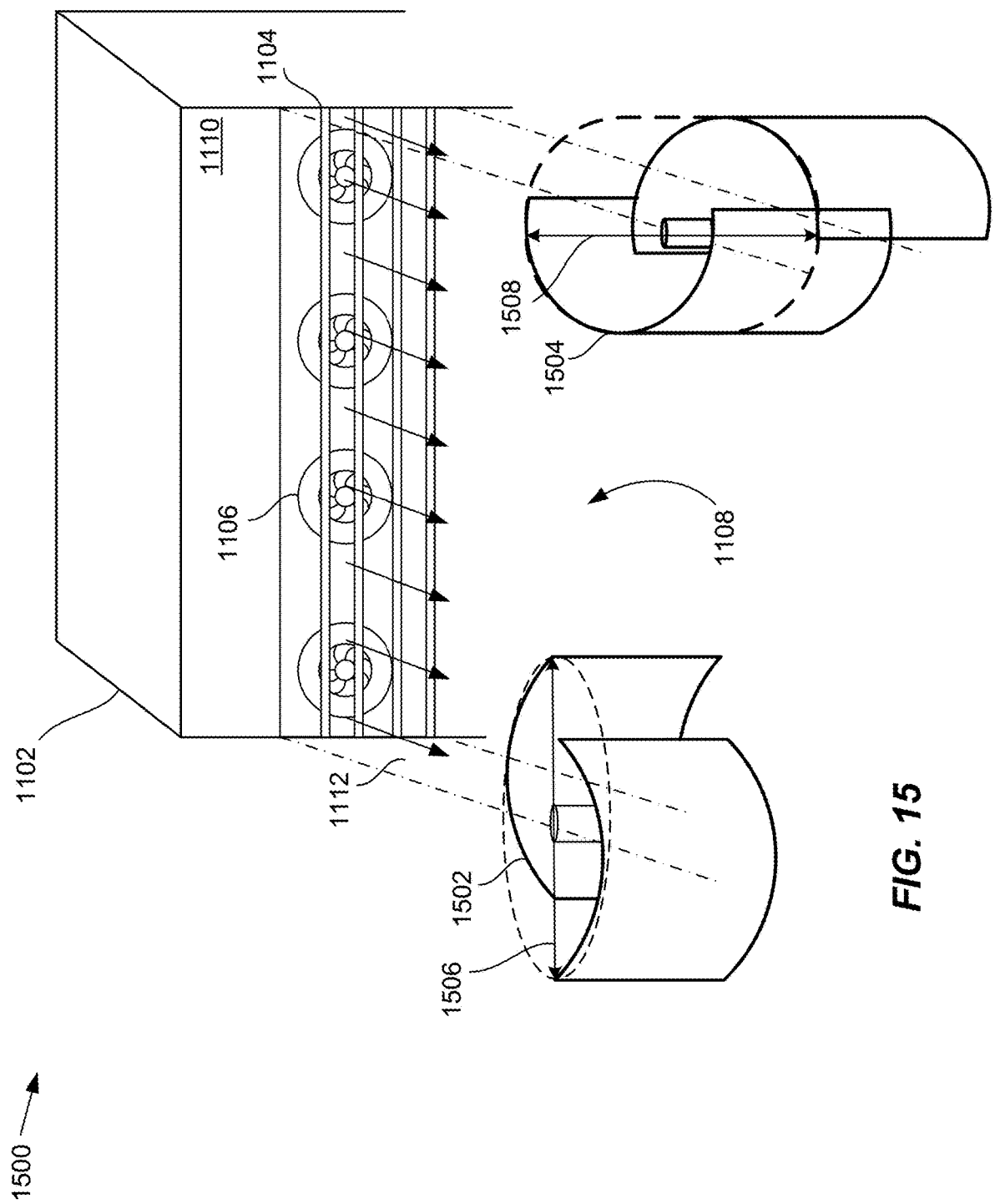
FIG. 15 is a perspective view of an exemplary industrial structure for wind energy harvesting including differently oriented vertical-axis wind turbines, consistent with some embodiments of the present disclosure.

By way of another non-limiting example, reference is made to FIG. 15 which is a perspective view of an exemplary industrial structure 1500 for wind energy harvesting including two differently oriented vertical-axis wind turbines, consistent with some embodiments of the present disclosure. Industrial structure 1500 is substantially similar to industrial structure 1200 of FIG. 12 with the noted difference that first and second wind turbines 1502 and 1504 may have an oblong blade diameter. First and second wind turbines 1502 and 1504 may be oriented at 90 degrees relative to each other. For example, first wind turbine 1502 may have a longer axis 1506 aligned parallel relative to vent outlet 1104 of industrial housing 1102 and second wind turbine 1504 may have a may have a longer axis 1508 aligned perpendicular relative to vent outlet 1104 of industrial housing 1102. In some embodiments, half of a turbine diameter of first wind turbine 1502 and second wind turbine 1504 may be inside exhaust flow zone 1108 and half of the turbine diameters may be outside exhaust flow zone 1108.

In some disclosed embodiments, during each rotational cycle, for no greater than one half of the rotational cycle, the turbine blade portion is within the exhaust flow zone. During each rotational cycle, for no greater than one half of the rotational cycle, the turbine blade portion is within the exhaust flow zone refers to positioning a turbine to straddle a boundary defining an exhaust flow zone, such that as a piece of an associated blade completes a revolution, for at least half of the revolution the associated blade portion is outside the exhaust flow zone. In other words, for at least 180 degrees of each complete 360 degree cycle, an associated blade portion is outside the exhaust flow zone, and for at most 180 degrees of each complete 360 degree cycle, the associated blade portion is inside the exhaust flow zone. For example, a fraction of a rotational cycle for which a blade portion may spin inside an exhaust flow zone may be no greater than a half, a third, a quarter, or any other fraction of the rotational cycle. In some embodiments, a turbine positioned such that a turbine blade portion is within an exhaust flow zone for no greater than half of each rotational cycle may include at least two cupped blades, such that a first one of the cupped blades directs wind into a cup of another one of the cupped blades.

In some disclosed embodiments, the turbine includes no more than two blades. A turbine including no more than two blades refers to a turbine including one or two blades. For example, a turbine may include a single C-shaped blade that may be inside an exhaust flow zone during a first fraction of a rotational cycle, and may be external to the exhaust flow zone during a complementary fraction of a rotational cycle. As another example, a turbine may include two blades, such that during a first part of a rotational cycle, a first one of the two blades may be inside an exhaust flow zone and a second one of the two blades may be outside the exhaust flow zone, and during a second part of the rotational cycle, the second blade may be inside the exhaust flow zone and the first blade may be inside the exhaust flow zone.

By way of a non-limiting example, in FIG. 11, during each rotational cycle, for no greater than one half of the rotational cycle, a turbine portion 1118 may be within exhaust flow zone 1108. For example, at most of a first half 1130 of a diameter of turbine 1116 may be inside exhaust flow zone 1108 and at least a second half 1132 of the diameter of turbine 1116 may be outside exhaust flow zone 1108 defined by first boundary 1112. Consequently, for each 360 degree revolution, turbine portion 1118 may be inside exhaust flow zone 1108 for at most 180 degrees of the revolution, and may be outside exhaust flow zone 1108 for the remaining at least 180 degrees of the revolution. Positioning at least half of turbine 1116 to be outside exhaust flow zone 1108 may reduce an amount of wind exiting vent outlet 1104 from being pushed back towards vent outlet 1104 by turbine blade portion 1118. In some embodiments, turbine 1116 may include no more than two blades 1122 and 1124.

The following table may illustrate exemplary power levels generated by positioning a wind turbine such that during each rotational cycle, approximately one half of the turbine blade portion is within the exhaust flow zone. The numerical values shown in the table below are exemplary and nonlimiting. The arrangements discussed in this disclosure may result in numerical values that may be different from those provided in the table below. This table uses an exemplary turbine with a diameter of 1.63 meters. The distance shown in the table extends from the vent outlet to the center of the turbine. In other words, the closest edge of a blade in the 1 meter distance column is 1 minus 1.63/2 meters distance from the vent outlet. In order to determine a placement of a turbine, one may calculate the potential power generation at any point and subtract the effect of the turbine as a barrier to flow at that point. Therefore the net power generation at lower exhaust speeds (6-14 m/s in this example) when the turbine blades are closer to the outlet. There is a general correlation between increasing the wind speed and the ideal distance for obtaining the greatest net power generation. Higher wind speeds require greater distance from the outlet. For the wind speeds between 4 m/s to 18 m/s, distance of the blades from the outlet may be greater than 0.05, 0.1, 0.15, and 0.20 meters. The expected net power generation may be obtained by finding the power generation potential in the first table, where the upper left cell is 67.7 watts, and subtracting the velocity reduction power cost in watts (e.g., the resistance to flow caused by the turbine may cause the outlet fan to work harder), which here is 0.9 watts, and the resultant expected power output is 67.6 watts. In summary, among factors influencing energy production by a turbine placed near a vent outlet may include the shape of the turbine, its ideal rpm at a certain wind speed, a distance of the blades from the outlet, a degree of overlap of the turbine over the vent outlet, the wind speed, the electrical load, and/or the resistance to flow created by the turbine.

TABLE 1 illustrating power generated for different distances from an associated vent outlet when one half of a blade portion is inside an exhaust flow zone.

| Wind speed | Distance from vent outlet | | | | | | |
|---|---|---|---|---|---|---|---|
| | 1.00 m | 1.25 m | 1.5 m | 1.75 m | 2.00 m | 2.25 m | 2.50 m |
| | Power Generation (W) ½D | | | | | | |
| 6 m/s | 67.7 | 33.8 | 15.9 | 4.6 | | | |
| 8 m/s | 299.4 | 255.2 | 180.1 | 75.9 | 25.4 | | |
| 10 m/s | 614.3 | 459.4 | 314.4 | 170.0 | 29.4 | | |
| 12 m/s | 971.3 | 781.8 | 501.7 | 306.1 | 89.1 | | |
| 14 m/s | 1173.1 | 978.6 | 654.0 | 413.6 | 184.8 | | |

TABLE 1-continued illustrating power generated for different distances from an associated vent outlet when one half of a blade portion is inside an exhaust flow zone.

| | Distance from vent outlet | | | | | | |
|---|---|---|---|---|---|---|---|
| Wind speed | 1.00 m | 1.25 m | 1.5 m | 1.75 m | 2.00 m | 2.25 m | 2.50 m |
| 16 m/s | 1207.7 | 992.7 | 729.8 | 431.0 | 236.6 | 200.3 | 198.7 |
| 18 m/s | 1262.5 | 999.9 | 760.2 | 443.6 | 335.7 | 311.3 | 273.2 |
| Velocity Reduction (%) ½D | | | | | | | |
| 6 m/s | 4.8% | 3.0% | 1.8% | 1.1% | 0.6% | | |
| 8 m/s | 10.1% | 3.9% | 2.7% | 2.1% | 1.7% | | |
| 10 m/s | 12.8% | 5.6% | 2.8% | 2.2% | 1.8% | | |
| 12 m/s | 17.6% | 7.7% | 3.3% | 1.8% | 0.9% | | |
| 14 m/s | 22.2% | 12.9% | 3.9% | 3.8% | 3.1% | | |
| 16 m/s | 25.9% | 15.8% | 8.7% | 4.9% | 2.7% | 1.2% | 1.0% |
| 18 m/s | 33.6% | 17.4% | 10.9% | 5.1% | 2.1% | 1.7% | 1.3% |
| Velocity Reduction Power Cost (W) ½D | | | | | | | |
| 6 m/s | 0.09 | 0.02 | 0.01 | 0.00 | 0.00 | | |
| 8 m/s | 2.07 | 0.12 | 0.04 | 0.02 | 0.01 | | |
| 10 m/s | 8.36 | 0.69 | 0.09 | 0.04 | 0.02 | | |
| 12 m/s | 32.79 | 2.25 | 0.11 | 0.04 | 0.01 | | |
| 14 m/s | 118.28 | 23.23 | 0.65 | 0.59 | 0.32 | | |
| 16 m/s | 282.71 | 64.30 | 10.73 | 1.92 | 0.31 | 0.03 | 0.02 |
| 18 m/s | 878.48 | 120.76 | 30.05 | 3.12 | 0.22 | 0.12 | 0.05 |
| Net Power Generation ½D | | | | | | | |
| 6 m/s | 67.6 | 33.8 | 15.9 | 4.6 | −1.6 | | |
| 8 m/s | 297.3 | 255.1 | 180.1 | 75.9 | 25.4 | | |
| 10 m/s | 605.9 | 458.7 | 314.3 | 170.0 | 29.4 | | |
| 12 m/s | 938.5 | 779.6 | 501.6 | 306.1 | 89.1 | | |
| 14 m/s | 1054.8 | 955.4 | 653.4 | 413.0 | 184.5 | | |
| 16 m/s | 925.0 | 928.4 | 719.1 | 429.1 | 236.3 | 200.3 | 198.6 |
| 18 m/s | 384.0 | 879.1 | 730.2 | 440.5 | 335.5 | 311.2 | 273.1 |

In some disclosed embodiments, during each rotational cycle, for no greater than three quarters of the rotational cycle, the turbine blade portion is within the exhaust zone. During each rotational cycle, for no greater than three quarters of the rotational cycle, a turbine blade portion is within an exhaust flow zone refers to positioning a turbine to straddle a boundary defining an exhaust flow zone, such that as a part of an associated blade completes a revolution, for at least a quarter of the revolution, the blade part is outside the exhaust flow zone. In other words, for at least 90 degrees of each complete 360 degree cycle, an associated blade portion is outside the exhaust flow zone, and for at most 270 degrees of each complete 360 degree cycle, the associated blade portion is inside the exhaust flow zone. In some embodiments, a turbine positioned such that no greater than three quarters of the turbine is within an exhaust flow zone may include a drag-type turbine.

In some disclosed embodiments, the at least one wind turbine includes a first blade and a second blade, the first blade being at least partially nested within a space defined by the second blade. A turbine including a first blade and a second blade refers to a turbine having two blades. A first blade being at least partially nested within a space defined by a second blade refers to two blades partially overlapping at a region proximal to a turbine shaft. For example, an end of a first blade may be partially inside a cup formed by the second blade, and vice versa, e.g., to form a spiral-shape. Turbines having partially nested blades may be associate with a narrower turbine diameter than turbines having similarly size, but non-nested blades. In some embodiments, an exhaust flow zone may be wide enough to accommodate two turbines having partially nested blades but may not be able to accommodate two turbines having similarly size, non-nested blades.

Figure 14:
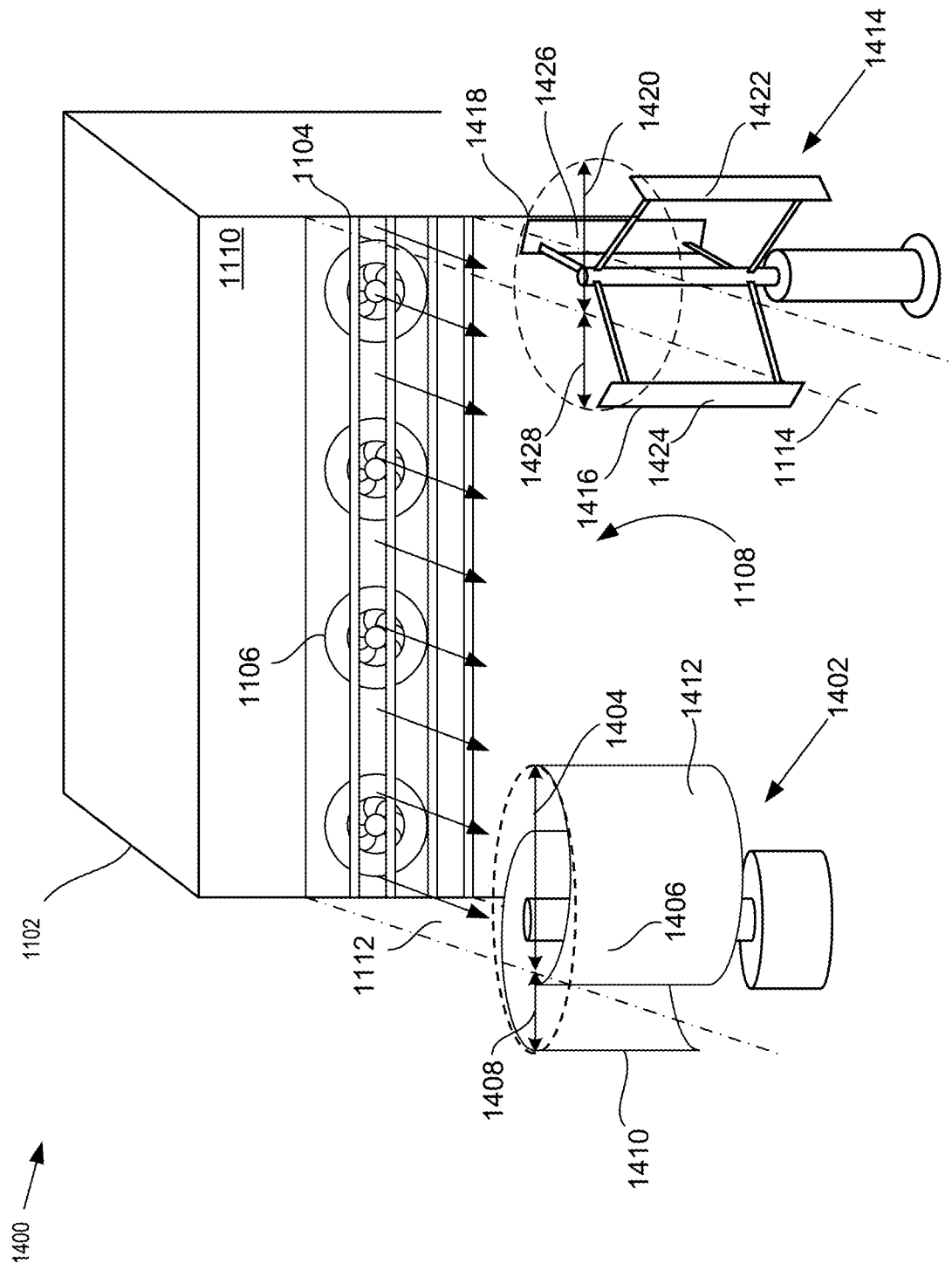
FIG. 14 is a perspective view of an exemplary industrial structure for wind energy harvesting including two different vertical-axis wind turbines, consistent with some embodiments of the present disclosure.

By way of a non-limiting example, reference is made to FIG. 14 which is a perspective view of an exemplary industrial structure 1400 for wind energy harvesting including two different vertical-axis wind turbines, consistent with some embodiments of the present disclosure. Industrial structure 1400 is substantially similar to industrial structure 1100 shown in FIG. 11 with the noted difference that wind turbine 1402 may be positioned in front of vent outlet 1104, straddling first boundary 1112. Wind turbine 1402 may be positioned such that during each rotational cycle, for no greater than three quarters of each rotational cycle, a turbine portion 1406 may be within exhaust flow zone 1108, defined by first boundary 1112. For example, approximately three quarters 1404 of a diameter of wind turbine 1402 may be inside exhaust flow zone 1108 defined by first boundary 1112, and the remaining approximately one quarter 1408 of the diameter of wind turbine 1402 may be outside exhaust flow zone 1108. Consequently, for each 360 degree revolution, turbine blade portion 1406 may be inside exhaust flow zone 1108 for at most 270 degrees of the revolution, and may be outside exhaust flow zone 1108 for the remaining at least 90 degrees of the revolution. Positioning at least one quarter of wind turbine 1402 to be outside exhaust flow zone 1108 may reduce an amount of wind exiting vent outlet 1104 from being pushed back towards vent outlet 1104 by turbine blade portion 1406. In some embodiments, wind turbine 1402 may include a first blade 1410 and a second blade 1412. First blade 1410 may be at least partially nested within a space defined by second blade 1412.

The following table may illustrate exemplary power levels generated by positioning a wind turbine such that during each rotational cycle, approximately one three quarters of the turbine blade portion is within the exhaust flow zone. The numerical values shown in the table below are exemplary and nonlimiting. The arrangements discussed in this disclosure may result in numerical values that may be different from those provided in the table below.

TABLE 2 illustrating power generated for different distances from an associated vent outlet when three-quarters of a blade portion is inside an exhaust flow zone.

| | Distance from vent outlet | | |
|---|---|---|---|
| Wind speed | 1.5 m | 1.75 m | 2.00 m |
| Power Generation (W) ¾D | | | |
| 8 | 238.6 | 89 | 60.9 |
| 10 | 414.8 | 196.3 | 65.7 |
| 12 | 639.3 | 374.9 | 98.2 |
| 14 | 796.6 | 451.1 | 112.9 |
| Velocity Reduction (%) ¾D | | | |
| 8 | 8 | 8 | 8 |
| 10 | 10 | 10 | 10 |
| 12 | 12 | 12 | 12 |
| 14 | 14 | 14 | 14 |
| Velocity Reduction Power Cost (W) ¾D | | | |
| 8 | 0.28 | 0.08 | 0.04 |
| 10 | 0.76 | 0.21 | 0.08 |
| 12 | 1.76 | 0.15 | 0.02 |
| 14 | 10.81 | 3.17 | 1.24 |
| Net Power Generation ¾D | | | |
| 8 | 238.3 | 88.9 | 60.9 |
| 10 | 414.0 | 196.1 | 65.6 |
| 12 | 637.5 | 374.7 | 98.2 |
| 14 | 785.8 | 447.9 | 111.7 |

The efficiency of the turbine in extracting energy from the exhaust may be related to the rotational velocity of the turbine. For example, a ½ overlap of the blade over a vent outlet with a diameter of 1.63 meters, a wind speed of 6 m/s, and a distance of 1.5 meters from the vent outlet to an associated turbine shaft may produce more watts at 60 rpm than at 80 rpm. In general, an overlap condition of ¾ may be beneficial. For a Savonius drag-type turbine including two C-shaped blades, a ¾ overlap configuration may result in greater power output because half of a blade cup facing away from an exhaust flow may direct at least some of the exhaust flow into the other blade cup. Therefore, with sufficient space available, it may be desirable to place one turbine at ¾ configuration at each end of an outlet.

In some disclosed embodiments, during each rotational cycle, for no greater than one quarter of the rotational cycle, the turbine blade portion is within the exhaust zone. During each rotational cycle, for no greater than one quarter of the rotational cycle, the turbine blade portion is within the exhaust zone refers to positioning a turbine to straddle a boundary defining an exhaust flow zone such that as a part of an associated blade complete a revolution, for at most a quarter of the revolution, the blade part is inside the exhaust flow zone. In other words, for at most 90 degrees of each complete 360 degree cycle, an associated blade portion is inside the exhaust flow zone, and for at least 270 degrees of each complete 360 degree cycle, the associated blade portion is outside the exhaust flow zone. In some disclosed embodiments, the at least one wind turbine includes at least three blades. A turbine including at least three blades refers to a turbine including three, four, or more than four blades.

By way of a non-limiting example, in FIG. 14, a second wind turbine 1414 may be positioned straddling second boundary 1114 defining exhaust flow zone 1108. Second wind turbine 1414 positioned such that during each rotational cycle, for no greater than one quarter of the rotational cycle, a turbine blade portion 1416 may be within exhaust flow zone 1108 defined by second boundary 1114, and for the remaining three quarters of the rotational cycle, turbine blade portion 1416 may be outside exhaust flow zone 1108. For example, approximately three quarters 1420 of the diameter of turbine 1414 may be outside exhaust flow zone 1108 and the remaining approximately one quarter 1428 of the diameter of wind turbine 1414 may be inside exhaust flow zone 1108. Consequently, for each 360 degree revolution, turbine blade portion 1416 may be inside exhaust flow zone 1108 for at most 90 degrees of the revolution, and may be outside exhaust flow zone 1108 for the remaining at least 270 degrees of the revolution. Positioning at least three quarters 1420 of the diameter of turbine 1414 to be outside exhaust flow zone 1108 may reduce an amount of wind exiting vent outlet 1104 from being pushed back towards vent outlet 1104 by turbine blade portion 1416. In some embodiments, turbine 1414 may include at least three blades 1422, 1424, and 1426.

In some embodiments, a first turbine may be positioned such that for each complete 360 degree revolution, an associated first blade portion may be inside an exhaust flow zone for no greater than three quarters, or one half, or one quarter, or two thirds, or one third of the complete revolution. Similarly, a second turbine may be positioned such that for each complete 360 degree revolution, an associated second blade portion may be inside an exhaust flow zone for no greater than three quarters, or one half, or one quarter, or two thirds, or one third of the complete revolution. In some embodiments, a first turbine may be positioned such that at least than three quarters, or one half, or one quarter, or two thirds, or one third of the diameter of the first turbine may be outside an exhaust zone, and a second turbine may be positioned such that at least three quarters, or one half, or one quarter, or two thirds, or one third of a diameter of the second turbine may be outside the exhaust zone.

In some disclosed embodiments, the exhaust flow zone is defined by a height and a width, and wherein an upper edge of the exhaust flow zone corresponds to upper edge location of the turbine blade portion. An exhaust flow zone defined by a height and a width refers to horizontal and vertical dimensions of an exhaust flow zone. In some embodiments, a width and a height of an exhaust flow zone may be defined by boundaries extending from either side and a top and bottom of an associated vent outlet. In some embodiments, a velocity of wind flowing within a width and height of an exhaust flow zone may exceed a threshold velocity, whereas a velocity of wind flowing beyond a width and height of the exhaust flow zone may fail to meet the threshold velocity. In some embodiments, a width and height of an exhaust flow zone may vary in proportion to a distance from an associated vent outlet. For instance, in regions adjacent to a vent outlet, a width and height of an exhaust flow zone may correspond to a width and height of the vent outlet, and in regions further from the vent outlet, a width and height of an exhaust flow zone may be greater than a width and height of the vent outlet, e.g., due to dispersal of wind exiting the vent outlet. In some embodiments, a width and height of an exhaust flow zone may be constant at different distances from an associated vent outlet. An upper edge location of a turbine blade refers to a maximal height reached by a turbine blade while spinning. For example, an upper edge location of a turbine blade may correspond to a sum of a length of a turbine blade and a distance of a bottom of a turbine blade from the ground. An upper edge of an exhaust flow zone corresponding to an upper edge location of a turbine blade refers to a turbine sized such that a height of a turbine blade while spinning reaches a height of an exhaust flow zone defined by a vent outlet. For example, an upper edge location of a turbine blade may correspond to an upper edge of a vent outlet. Positioning a turbine such that an upper edge of an exhaust flow zone corresponds to an upper edge location of a turbine blade may allow the turbine to capture wind along the (e.g., full) height of the exhaust zone.

In some embodiments, the exhaust flow zone is defined by a height and a width, and wherein a lower edge of the exhaust flow zone corresponds to a lower edge location of the turbine blade portion. A lower edge location of a turbine blade refers to a minimal height reached by a turbine blade while spinning. For example, a lower edge location of a turbine blade may correspond to a distance of a bottom of a turbine blade from the ground. A lower edge of an exhaust flow zone corresponding to a lower edge location of a turbine blade refers to a turbine positioned such that a lower edge of a turbine blade while spinning reaches the bottom of an exhaust flow zone defined by a vent outlet. For example, a lower edge location of a turbine blade may correspond to a lower edge of a vent outlet. Positioning a turbine such that a lower edge of an exhaust flow zone corresponds to a lower edge location of a turbine blade may allow the turbine to capture wind along the (e.g., full) height of the exhaust zone. The term "upper edge" can also refer to a lower edge; it is just a difference in perspective. In some embodiments, the upper and lower edges of turbine blades correspond to upper and lower edges of a vent outlet.

In some disclosed embodiments, the exhaust flow zone is defined by a height and a width, and wherein upper edge locations of the turbine blade portion is below the exhaust flow zone height. Upper edge locations of a turbine blade portion being below an exhaust flow zone height refers to a turbine sized such that a height of a turbine blade portion while spinning fails to reach a height of an exhaust flow zone defined by a vent outlet, such that some wind expelled via the vent outlet may bypass the turbine blade portion.

In some disclosed embodiments, the exhaust flow zone is defined by a height and a width, and wherein upper edge locations of the turbine blade portion extends beyond the height by no more than 10% of the height. An upper edge location of at least one blade extends beyond the height by no more than 10% of the height refers to a turbine sized such that a height of a turbine blade portion while spinning exceeds a height of an exhaust flow zone by at most 10% of the height of the exhaust flow zone. For example, upper locations of a spinning turbine blade portion may extend above a boundary extending from an upper edge of an associated vent outlet by at most 10% the height of the upper edge. Consequently, the upper locations may interface with air other than wind exiting the vent outlet. Limiting how much of a turbine blade portion may extend beyond a height of an exhaust flow zone by no more than 10% may permit the turbine blade portion to be primarily powered by wind exiting the vent outlet, while reducing interference on blade rotation due to other wind arriving from a direction other than the vent outlet.

By way of a non-limiting example, in FIG. 12, exhaust flow zone 1108 may be defined by a height 1230 and width 1208. An upper edge of exhaust flow zone 1108 (e.g., corresponding to upper edge 1240 of boundary 1114) may correspond to an upper edge location 1232 of turbine blade portion 1204. In some embodiments, upper edge location 1232 turbine blade portion 1118 may be below height 1230 of exhaust flow zone 1108. By way of another non-limiting example, in FIG. 13, exhaust flow zone 1108 may be defined by height 1230 and width 1208. An upper edge location of turbine blade portion 1304 may extend beyond height 1230 by no more than 10% of height 1230.

In some embodiments, structures such as panels may be placed outside the vents to concentrate or diffuse the wind to make a more efficient wind speed and space. For example, if an exhaust flow exits a vent outlet at 4 m/s, the vent outlet height is 2 meters, and the vent outlet width is 10 meters, panels may be placed along the sides of the vent outlet to concentrate the exhaust flow to a width of 5 meters so that the fluid speed may be raised, for example, to 8 m/s and one turbine on each side of the panels may extract a greater amount of power at improved efficiency.

Embodiments consistent with the present disclosure provide devices and systems for placing one or more wind turbines to a flat roof of a building. Additionally, embodiments consistent with the present disclosure provide methods of attachment of the wind turbines without the need for drilling holes in the flat roof or inserting fasteners into the flat roof. Embodiments consistent with the present disclosure provide devices and systems of attachment of the wind turbines to flat roofs using weighted ballasts that also support other energy generation devices like solar panels in combination with the wind turbines.

Some disclosed embodiments propose solutions for flat-roof installations of one or more green energy generators that do not involve drilling into the flat roof of a building. Such solutions may eliminate a problem of leakage of water or air into the building. In some disclosed embodiments, the wind turbines may be attached to a structure adjacent to the roof and or building, such that the wind turbines may appear as though they are attached to the roof but may be actually attached to a different structure. Doing so may require setting up beams or poles and a tower to hold the turbines just above roof level. In some embodiments, a structure for installing wind turbines on flat roof may include one or more adjustable joints to facilitate alignment of one or more wind turbines relative to a vertical axis.

Some disclosed embodiments involve an apparatus for mounting a plurality of green energy sources on a flat roof. Mounting refers to securing, attaching and/or affixing an object to a structure. Mounting does not necessarily require a physical interconnection with fasteners. For example, mounting may occur if a weighted object is located on another object such that the force of gravity holds the apparatus in place. A green energy source refers to a device configured to convert energy that is naturally replenishable and/or environmentally sustainable into electrical energy. Examples of energy that is naturally replenishable and/or environmentally sustainable may include solar energy, wind energy, or kinetic energy in any other type of fluid flow. Some examples of green energy sources may include vertical-axis and/or horizontal-axis wind turbines, water turbines, solar panels, and/or any other generator for converting naturally replenishable and environmentally sustainable energy to electrical energy. A roof refers to an upper exterior surface or covering on top of a building and may include some and/all materials and/or structures to support the roof on the walls of the building to provide protection against environmental factors such as rain, snow, sunlight, and/or extremes of temperature and air flow or wind. A flat roof refers to a roof including a surface substantially parallel to and/or level with the ground. In some embodiments, a flat roof may include one or more sloping regions, e.g., having a pitch of up to 10 degrees. For example, a flat roof may include at least some regions having a non-zero pitch (e.g., a slight slope) for drainage, and/or due to warping caused by erosion. In some embodiments, a flat roof may generally include any roof with a pitch of 1-10 degrees (e.g., a minimum slope of ¼ inch per foot).

Some disclosed embodiments involve a plurality of triangular external roof trusses configured for mounting atop the flat roof. A triangular external roof truss refers to a structural framework having three longitudinally extending members (e.g., beams and/or bars which may or may not be straight) connected at joints to form a triangle (e.g., a three-sided polygon) for outdoor installation. A triangular shape of a truss may distribute one or more loads and/or stresses along the connected members, thereby spreading out such loads and/or stresses for providing stability and strength. A triangular truss may be made from steel, wood, aluminum, and/or any other durable material. The members of a truss may be connected at joints using, for example, one or more bolts, rivets, pins, brackets, welding, adhesive bonding, and/or any other type of connection. In some embodiments, one or more members of a triangular external roof truss may include two or more pieces that may be connected to form a single or unitary member. In some embodiments, each truss may align substantially along a plane, e.g., oriented vertically relative to a flat roof. A plurality of triangular external roof trusses for mounting atop a flat roof refers to at least two triangular external roof trusses for installing and/or affixing onto to a substantially level surface of a roof. In some embodiments, a plurality of triangular external roof trusses for mounting atop a flat roof may include three, four, or more than four triangular external roof trusses.

In some disclosed embodiments each triangular external roof truss includes a pair of upper chords. A pair of upper chords (e.g., of a triangular external roof truss) refers to two diagonally-oriented members for forming a peak of a triangle above a triangle base. A pair of upper chords may include diagonal braces for distributing one or more loads. For example, a roof truss may include three members. A first member may be oriented substantially horizontally (e.g., generally parallel to the ground or flat roof) and may serve as a base of a triangle, and the second and third members may serve as upper chords extending from either end of the substantially horizontal member, at least one of which is at an acute angle to meet at an apex above the first member, for forming a triangular structure.

In some disclosed embodiments each upper chord has a proximal end configured to meet another of the pair of upper chords at a peak, and each upper chord has a distal end. A proximal end refers to a tip of an elongated object located closer to a reference point. A distal end refers to a tip of an elongated object opposite a proximal end thereof, and located further from a reference point. For example, such a reference point may correspond to a meeting point between two elongated objects, such that the two elongated objects may meet at their proximal ends. An upper chord having a proximal end configured to meet another of the pair of upper chords at a peak refers to a first tip and/or extremity of an upper chord closer to a reference point for connecting to a first tip and/or extremity of another upper chord such that joining the two upper chords at the respective first tips forms an apex and/or upper vertex of an associated triangular roof truss. Each upper chord having a distal end refers to each upper chord having a second tip and/or extremity, opposite a first tip and further from a reference point than the first tip. For example, each upper chord may be a pole or rod having two ends, a first end of which may be a proximal end for connection to a proximal end of another upper chord to form a peak, and a second end of which may be a distal end, separated from the proximal end by the length of the upper chord.

Figure 16:
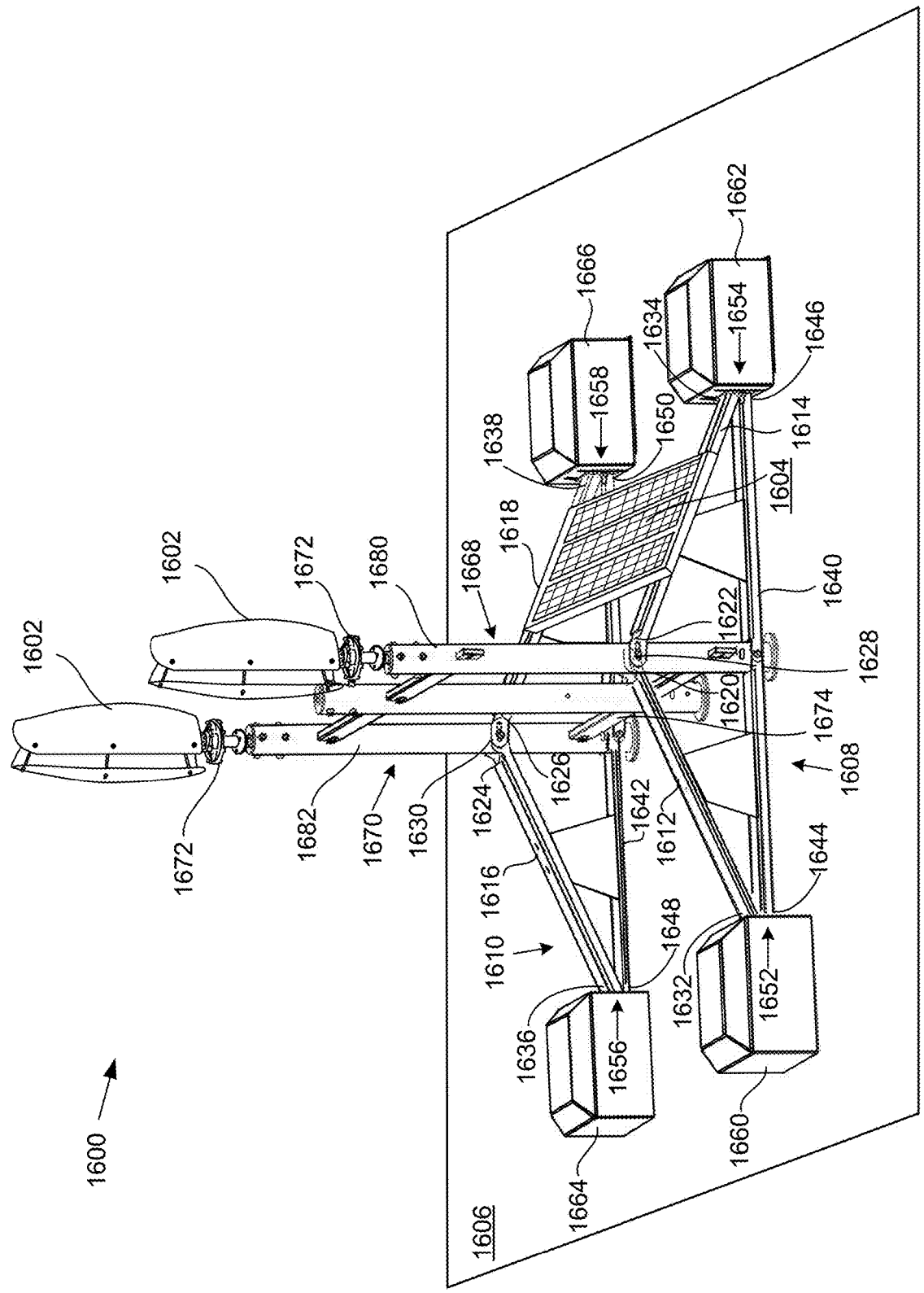
FIG. 16 is a perspective side view of an exemplary apparatus for a flat roof green energy support structure, consistent with some embodiments of the present disclosure.

By way of a non-limiting example, reference is made to FIG. 16, which is a perspective view of an apparatus 1600 for a flat roof green energy support structure, consistent with some embodiments of the present disclosure. Apparatus 1600 may support a plurality of green energy sources 1602 and 1604 on a flat roof 1606. For example, green energy source 1602 may be a wind turbine, and green energy source 1604 may be a solar panel. Apparatus 1600 may include a plurality of triangular external roof trusses 1608 and 1610 for mounting atop flat roof 1606. Triangular external roof truss 1608 may include a pair of upper chords 1612, 1614, and triangular external roof truss 1610 may include a pair of upper chords 1616, and 1618. Upper chords 1612 and 1614 may have proximal ends 1620 and 1622, respectively, connected to each other at peak 1628. Similarly, upper chords 1616 and 1618 may have proximal ends 1624 and 1626, respectively, connected to each other at peak 1630. For instance, triangular external roof truss 1608 may include upper chords 1612 and 1614, each having proximal ends 1620 and 1622 meeting at peak 1628, and triangular external roof truss 1610 may include upper chords 1616 and 1618, each having proximal end 1624 and 1626 meeting at peak 1630. Upper chords 1612, 1614, 1616, and 1618 may have distal ends 1632, 1634, 1636, and 1638, respectively.

In some disclosed embodiments each triangular external roof truss further includes a transversely extending support beam having opposing ends, each opposing end being configured to meet an associated one of the distal ends of the upper chords at a heel location, such that each triangular external roof truss has a pair of heel locations associated therewith. A transversely extending support beam having opposing ends refers to a pole, plank, beam, bar, and/or post configured to be oriented horizontally (e.g., parallel to a flat roof surface) and having a tip at either extremity thereof. For example, a transversely extending support beam may lie on and/or adjacent to a flat roof surface and may be connected to two upper chords at opposite ends of the support beam. The upper chords may meet at a peak above the transversely extending support beam as an upper vertex, thereby forming a triangular external roof truss, oriented vertically relative to the flat roof surface. A heel location refers to a section at the base of a structure for providing support and/or stability. A heel location may correspond to an intersection of a chord with a transversely extending support beam. A heel location of a triangular truss may distribute a weight and/or load imposed on a triangular truss to one or more additional structures, such as a flat roof. Each opposing end (of a transversely extending support beam) being configured to meet an associated one of the distal ends of the upper chords at a heel location refers to each tip of a transversely extending support beam configured for connection to an end of an upper chord at a heel location, the end of the upper chord being opposite to a proximal end thereof meeting a proximal end of another upper chord at a peak. Each triangular external roof truss having a pair of heel locations associated therewith refers to each triangular roof truss including two heel locations, each corresponding to a connection between an end of a transversely extending support beam to a distal end of an upper chord. Thus, a triangular external roof truss may include three members connected at three vertices. A first vertex (e.g., an upper vertex) may correspond to a peak formed by two upper chords (e.g., first and second members) connected at proximal ends thereof, above a transversely extending support beam (e.g., the third member). The second and third vertices (e.g., a pair of lower vertices) may correspond to two heel locations, each heel location connecting a distal end of one of the two upper chords to an end of a transversely extending support beam, thereby forming a triangle. Each heel location at each of the two lower vertices of a triangular external roof truss may anchor and/or secure the triangular truss to a supporting structure, and/or distribute a load imposed thereon to a supporting structure, such as a flat roof.

By way of a non-limiting example, in FIG. 16, each triangular external roof truss 1608 and 1610 may include a transversely extending support beam 1640 and 1642. Beam 1640 may have opposing ends 1644 and 1646, whereas beam 1642 may have opposing ends 1648 and 1650. Each of opposing ends 1644 and 1646 of support beam 1640 may meet an associated one of distal ends 1632, 1634 of upper chords 1612, 1614, respectively, at heel locations 1652, 1654, respectively. Similarly each of opposing ends 1648 and 1650 of support beam 1642 may meet an associated one of distal ends 1636, 1638 of upper chords 1616, 1618, respectively, at heel locations 1656, 1658, respectively. Thus, each triangular external roof truss 1608 and 1610 may have a pair of heel locations (1652, 1654) and (1656, 1658), respectively, associated therewith. In other words, end 1644 of transversely extending support beam 1640 may meet distal end 1632 of upper chord 1612 at heel location 1652, and opposing end 1646 of transversely extending support beam 1640 may meet distal end 1634 of upper chord 1614 at heel location 1654. Similarly, end 1648 of transversely extending support beam 1642 may meet distal end 1636 of upper chord 1616 at heel location 1656, and end 1650 of transversely extending support beam 1642 may meet distal end 1638 of upper chord 1618 at heel location 1658. Thus, triangular external roof truss 1608 may be associated with heel locations 1652, 1654, and triangular external roof truss 1610 may be associated with heel locations 1656, 1658.

Some disclosed embodiments involve a plurality of heel weight bases, each heel weight base being connectable to an associated one of the plurality of triangular external roof trusses at an associated heel location, and each heel weight base being configured to lie on the flat roof for securing the associated heel location of the associated triangular external roof truss to the flat roof. A heel weight base refers to a relatively heavy foundation, support, and/or cornerstone associated with a heel location. For example, a force exerted by a mass of a heel weight base may secure and/or stabilize a heel location of a triangular external roof truss to a flat roof. Connectable refers to capable of being attached, affixed, and/or linked. Each heel weight base being connectable to an associated one of the plurality of triangular external roof trusses at an associated heel location refers to a heel weight base being attachable to each triangular external roof truss at each associated heel location, such that each triangular external roof truss may be connected to two heel weight bases at either end of an associated transversely extending support beam. Thus, the two lower vertices of each triangular external roof truss may rest on a flat roof and may be weighted down using two associated heel weight bases to prevent each of the triangular external roof truss from moving. To lie flat refers to rest and/or to be in a prone orientation on a planar surface. Each heel weight base being configured to lie on the flat roof for securing the associated heel location of the associated triangular external roof truss to the flat roof refers to each heel weight base being configured to rest on a flat roof surface for maintaining an associated triangular external roof truss on the flat roof at the respective heel locations. Weight alone may maintain a triangle on the flat roof. Additionally, fasteners (e.g., screws) may be used in some embodiments to mechanically secure one or more heel weight bases to the roof. Thus, in some embodiments, securing may refer to being attached and/or connected, e.g., to a surface, while in other embodiments securing may refer to weight resting on a surface in manner without being attached and/or connected to the surface, e.g., without using one or more screws, bolts, nails, and/or rivets. Thus, according to some embodiments, each triangular roof truss may be secured to a flat roof using two heel weight bases on either side thereof, without the need for drilling holes in the roof or inserting fasteners into the roof. The heel weight bases may hold a triangular roof truss by virtue of the heaviness of the heel weight bases, and may anchor the triangular roof truss using gravity. In some embodiments, one or more heel weight bases may be attached to a flat roof using an adhesive, and/or using one or more brackets that may be attached to the flat roof.

By way of a non-limiting example, in FIG. 16, apparatus 1600 may include a plurality of heel weight bases 1660, 1662, 1664, and 1666. Each of heel weight bases 1660, 1662, 1664, and 1666 may connect to an associated one of the plurality of triangular external roof trusses 1608 and 1610 at an associated heel location 1652, 1654, 1656, and 1658. Thus, heel weight base 1660 may connect to triangular external roof truss 1608 at heel location 1652, heel weight base 1662 may connect to triangular external roof truss 1608 at heel location 1654, heel weight base 1664 may connect to triangular external roof truss 1610 at heel location 1656, and heel weight base 1666 may connect to triangular external roof truss 1610 at heel location 1658. Each of heel weight bases 1660, 1662, 1664, and 1666 may lie on flat roof 1606 for securing the associated heel locations 1652, 1654, 1656, and 1658 of the associated triangular external roof trusses 1608 and 1610 to flat roof 1606.

In some disclosed embodiments, each of the plurality of heel weight bases includes a container configured to hold weights therein. A weight may refer to an element, structure, device, or object with a mass that, either alone or in combination with other weights, provides a holding force sufficient to prevent movement of the weight over a surface when subjected to a predetermined translational force (e.g., in expected working conditions). A weight may include heavy and/or dense material as a load, mass, and/or ballast for providing stability to a structure or for using the weight to situate another structure in a particular position. Some examples of heavy and/or dense materials for use in weights may include metal (e.g., iron, lead, brass), ceramics, sand, gravel, concrete, water, and/or any other heavy and/or dense material. A weight may increase a gravitational force on an object to help prevent movement of the weight over a surface when subjected to a different (e.g., destabilizing) force, such as wind and/or vibrations that may otherwise be capable of moving the object. A container configured to hold weights refers to a box and/or receptacle for storing and/or housing weights. In some embodiments, the container may be a pallet or base upon which one or more weights (e.g., a stack of weights) rest. In other embodiments, the container may be a substantially closed structure. In other embodiments the container may be fully or partially opened on a top-end thereof. A weighted container may thus counter one or more forces due to wind, rain, and/or vibrations that may otherwise destabilize a triangular external roof truss installed on a flat roof, causing the roof truss to wobble, shift, twist, slip, and/or fall. For example, a container holding one or more weights at each heel weight base may function as a weighted ballast for maintaining structures (e.g., a triangular external roof truss supporting one or more wind turbines) attached to the weighted ballast in a particular position or orientation relative to a flat roof. The weight and the accompanying frictional force may prevent movement of the container relative to the flat roof even when the container is subjected to horizontal forces due to wind and/or vibrations. Thus each heel location of each triangular external roof truss may include a container holding weights to thereby secure each triangular external roof truss to the flat roof by its own mass due to gravity. For instance, a container holding weights may affix an object to a flat roof through sheer heaviness. In some embodiments, such containers holding weights may provide sufficient force for securing each triangular external roof truss in place to permit installing the triangular external roof truss on a flat roof without the need for drilling holes in the roof or inserting fasteners into the roof.

In some disclosed embodiments, each of the containers includes a cover for mitigating environmental degradation of weights within the container. A cover refers to a lid, overlay, outer layer, or a structural member that is placed over an object to protect, shelter, conceal, or guard the object or contents in the object. Environmental degradation of weights refers to wear, breakage, dislodgement, shifting, and/or loss of one or more weights due to environmental factors such as wind, rain, snow, structural vibrations, UV radiation, and/or any other potentially harmful environmental factor that may damage a weight. A cover for mitigating environmental degradation of weights within the container refers to a protective lid, overlay, outer layer, or a structural member for preventing and/or reducing damage to one or more weights held inside a container. For example, wind and/or vibrations may cause a weight to dislodge from a container of a heel weight base, leading to breakage and/or loss. Similarly, rain, ice, and/or snow may collect inside an open container which may displace one or more weights stored therein, and or freeze causing damage to the weights. A cover may prevent degradation of weights within a container by preventing wind, water, and/or ice from interacting with the weights.

In some disclosed embodiments, each container is sized to hold a plurality of roof tiles therein. A roof tile refers to a shingle, plate, and/or piece of, for example, clay, slate, and/or concrete for covering a roof. Roof tiles may overlap to cover a roof top to insulate a structure from rain or snow. Roof tiles for a structure may thus conform to a standard and/or uniform size (e.g., within a tolerance) for a given structure. A container sized to hold a plurality of roof tiles therein refers to a receptacle having dimensions for accommodating at least two roof tiles. In some embodiments, each heel weight base of a triangular roof truss may store two or more roof tiles therein as weights to secure the triangular roof truss to a flat roof, without the need for drilling holes in the roof or inserting fasteners into the roof.

In some disclosed embodiments, the container includes an adjustable cover for enabling a volume of the container to be adjustable. An adjustable cover refers to a lid and/or top that may fit on a container in a plurality of configurations and/or levels. Enabling a volume of the container to be adjustable refers to providing flexibility to modify a storage capacity and/or available space inside a container. For example, an adjustable cover may fit on a container at a plurality of different heights, where a smaller height may correspond to a smaller volume contained therein, and a larger height may correspond to a larger volume contained therein. Triangular roof trusses and associated heel weight bases may be manufactured according to a standard size. However, different geographic locations and/or elevations may be associated with differing environment elements that may differently affect a triangular external roof truss secured onto a flat roof. For instance, a higher elevation associated with faster wind velocities may require more weights, and thus a larger container volume, and a lower elevation associated with slower wind velocities may suffice with fewer weights, and thus a smaller container volume. However, storing fewer weights in a large volume of a container of a heel weight base may result in wobbling and/or dislodgement of one or more weights, and/or accumulation of rainwater, snowmelt, and/or environmental debris. An adjustable cover for a container of a heel weight base for a triangular roof truss may permit adjusting a volume of the container to accommodate a suitable amount of weights, e.g., corresponding to an amount of weights needed for a specific geographic location and/or elevation.

In some disclosed embodiments, the adjustable cover includes at least one slot therein and the container includes at least one adjustable fastener therein such that the adjustable cover is enabled to be adjusted to a volume of container contents and secured in place with the at least one adjustable fastener. A slot refers to a slit, narrow aperture, narrow opening, groove, and/or elongated hole. An adjustable cover including at least one slot refers to a cover for a container include a slit, narrow aperture, narrow opening, groove, and/or elongated hole permitting the cover to fit on the container at a plurality of positions. An adjustable fastener refers to a modifiable and/or adaptable clasp, lock, pin, hook, and/or bolt for connecting and/or attaching two articles. For example, an adjustable fastener may include a pin, clasp, or hook configured for association with a plurality of notches, pegs, pins, and/or holes, each located at a different position to enable adjusting a position for an associated connecting point. An adjustable cover enabled to be adjusted to a volume of container contents refers to a lid for a container that may be fitted thereon at differing heights or levels to thereby accommodate different quantities of weights therein. For example, each slot of an adjustable cover that may include a plurality of notches, pins, and/or hooks may be associated with a different height for fitting the adjustable cover on a container, resulting in different volumes of weights that may be stored inside the container. Changing a position along a slot of a cover placed on a container may cause a corresponding change in a volume enclosed by the container. For instance, raising a height or level of a cover relative to a base of the container may increase a volume of the container available to accommodate a larger number of weights. Conversely and lowering the level or reducing the height of the cover relative to the base of the container may decrease a volume contained therein for storing fewer weights. Secured in place with the at least one adjustable fastener refers to using an adjustable fastener (screw, bolt, adhesive, clamp, nail, etc.,) to lock, affix, and/or anchor, an adjustable cover on a container to enclose a particular volume.

Figure 22:
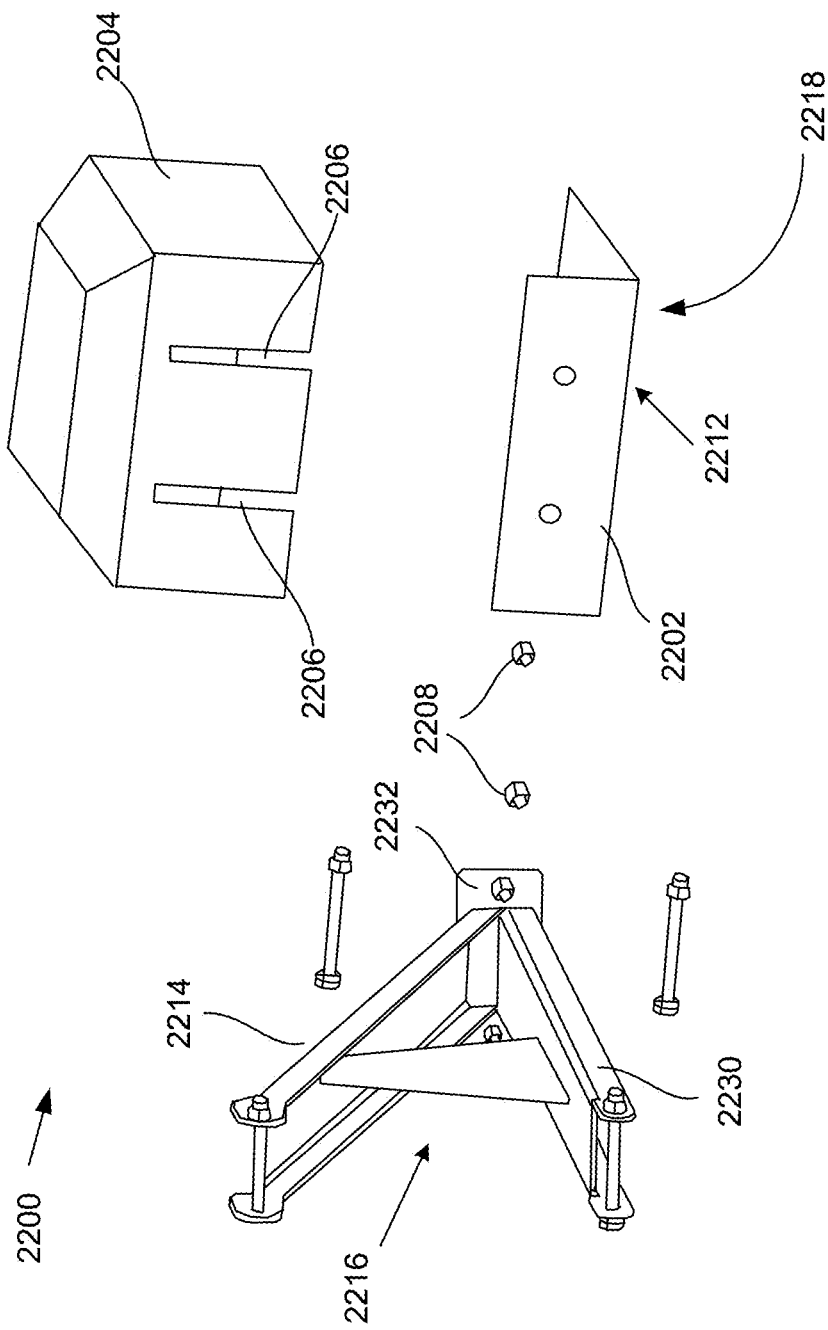
FIG. 22 is exploded perspective view of an exemplary heel weight base assembly consistent with some embodiments of the present disclosure.

By way of a non-limiting example, reference is made to FIG. 22 which illustrates an exploded view of an exemplary heel weight base 2200, consistent with some embodiments of the present disclosure. Heel weight base 2200 may correspond to any of heel weight bases 1660, 1662, 1664, and 1666 of FIG. 16. Heel weight base 2200 may include a container for holding weights therein. For example, the container may made of a bottom portion 2202 enclosed by a cover 2204. Container 2202 may include cover 2204 for mitigating environmental degradation of weights within container 2202. In some embodiments, container 2202 may be sized to hold a plurality of roof tiles therein. In some embodiments, cover 2204 of container 2202 may be adjustable for enabling a volume of container 2202 to be adjusted. In some embodiments, adjustable cover 2204 may include at least one slot 2206 therein. In the non-limiting example shown, adjustable cover 2204 includes two slots 2206 on either side of an upper chord 2214 (e.g., corresponding to any of upper chords 1612, 1614, 1616, and 1618). Container 2202 may include at least one adjustable fastener 2208 therein such that adjustable cover 2204 may be adjusted to a volume of container contents and secured in place with at least one adjustable fastener 2208. In the example shown, container 2202 may include two adjustable fasteners 2208 corresponding to two slots 2206 on either side of upper chord 2214. For example, slots 2206 may be elongated, and fastener 2208 may include a nut enabled for adjustably tightening along a length of elongated slot 2206 to thereby adjusting a height of cover 2204 relative to container 2202. Upon achieving a desired volume for container 2202, cover 2204 may be locked into place over container 2202 by tightening fasteners 2210 at associated locations along elongated slots 2206. And end of a transversely extending support beam 2230 may connect to container 2202 via a plate 2232 and at least one adjustable fastener 2208 (e.g., screws and/or bolts each tightened with a nut).

In some disclosed embodiments, the at least one adjustable fastener is further arranged to secure an associated container to an associated one of the plurality of triangular external roof trusses. Arranged refers to positioned, disposed, adapted, and/or designed. To secure (in this context) may refer to attaching, fastening, and/or locking. Arranged to secure an associated container to an associated one of the plurality of triangular external roof truss refers to located and/or positioned to connect a container of a heel weight base to a triangular external roof truss, e.g., at an associated heel location. Thus, a container holding weights may be included with each heel weight base located at each heel location and may be fastened to a joint that connects a distal end of an upper chord to one end of a transversely extending support beam. For example, an upper chord of a triangular roof truss may attach to a cover of a container of a heel weight base at a distal end thereof, and an associated transversely extending support beam may attach to a base of the container of the heel weight base at an end thereof, such that securing the cover of the container to the base of the container secures the upper chord and the associated transversely extending support beam to the heel weight base (e.g., via the cover and the base). In some embodiments, each upper chord may include two rods for insertion into a different slot in a cover of a container of a heel weight base, permitting to adjust a position of the rods along the length of each slot. Securing the cover on the container at a selected height may thereby secure an upper chord to the heel weight base at a selected angle. In addition, Consequently, each triangular external roof truss may include two containers holding weights at heel locations positioned at either end thereof of an associated transversely extending support beam to thereby support and/or stabilize the triangular external roof truss in a substantially vertical alignment on a flat roof. In some embodiments, a joint connecting an end of a transversely extending support beam with a distal end of an upper chord may include a flat surface for connecting and/or securing to a container of a heel weight base, e.g., using one or more bolts, pins, and/or screws.

In some disclosed embodiments, the plurality of weight bases each include a slip-reducing material on an undersurface thereof. A slip-reducing material refers to a substance and/or coating for increasing traction and/or friction, e.g., to prevent sliding and/or dislodgment. In some embodiments, a slip-reducing material may grip a surface. Some examples of slip-reducing materials may include a gritted surface, textured rubber and/or plastic, grated metal, coarse sand and/or aggregate, and/or textured concrete and/or asphalt. An undersurface refers to a downwards facing side of an object. An undersurface of an object resting on a flat roof may be in contact with the flat roof. A slip-reducing material on an undersurface of a weight base refers to a coating and/or layer of rough and/or textured material on the underside of each weight base interfacing a flat roof for preventing slippage of the weight base on the roof. Providing a slip-reducing material on an underside of each weight base may increase friction between each triangular external roof truss and a flat roof, to thereby prevent the triangular external roof truss from moving, sliding, and/or slipping on the roof. In some embodiments, the undersurface of a weight base may include a vibration-dampening material.

By way of a non-limiting example, in FIG. 22, at least one adjustable fastener 2208 may secure associated container 2202 to an associated triangular external roof truss (e.g., portion 2216 of a triangular roof truss corresponding to either of triangular external roof trusses 1608 or 1610) at a first lower vertex thereof. For example, rods 2218 of upper chord 2214 may be inserted into slots 2206 and secured with adjustable fasteners 2208 at a selected height along slots 2206. In addition, at least one adjustable fastener 2208 may secure a similar container to a second lower vertex of triangular external roof truss 2216, thereby securing a heel weight base to a lower vertex of each triangular external roof truss 2216. In some embodiments, heel weight base 2200 may include a slip reducing material 2212 on an undersurface 2218 thereof. For example, the slip reducing material may include coarse aggregate.

Some disclosed embodiments involve a plurality of vertical support beams, each vertical support beam being configured to project from an associated one of the transversely extending support beams through and beyond the peak. A vertical support beam refers to a structural member, pole, bar, rod, and/or stick configured for substantially orientation relative to the ground and configured to hold, carry, and/or prop up an object. A vertical support beam may be made of metal (e.g., aluminum or steel), wood, plastic, and/or any other sturdy material. In some embodiments, a vertical support beam may be aligned with gravity, e.g., to balance a wind turbine supported thereon and prevent wobbling when the wind turbine spins due to wind. To project refers to protrude, jut out, and/or extend. To project through and beyond a peak refers to passing vertically beyond an apex (e.g., corresponding to a location where two upper chords approach each other) and extending in an upwards direction, past the apex. For instance, an upper tip of a vertical support beam extending through and beyond a peak may be above (e.g., higher than) the peak relative to the support beam connecting the distal ends of the chords.

In some disclosed embodiments, a portion of each vertical support beam beyond the peak is configured to support a wind turbine. A portion refers to a section, a fraction, and/or a part, e.g., of a whole. Beyond a peak refers to protruding and/or extending above an apex associated with a meeting point and/or location of two upper chords. A portion of a vertical support beam beyond a peak configured to support a wind turbine refers to a section or part of the vertical support beam, extending beyond an apex of a triangular external roof truss, and capable of holding and/or bearing a wind turbine (as described elsewhere herein). For example, a wind turbine may be connected to a portion of a vertical support beam using one or more bolts, screws, rivets, brackets, clamps, and/or by welding or brazing. In some embodiments, a wind turbine may include an associated generator for converting rotational motion of one or more turbine blades to electrical energy. In such a case, a vertical support beam may support a wind turbine and an associated generator, e.g., using one or more screws, bolts, rivets, brackets, clamps, and/or by welding or brazing.

By way of a non-limiting example, in FIG. 16, apparatus 1600 may include a plurality of vertical support beams 1668 and 1670. Each of vertical support beams 1668 and 1670 may project from an associated one of the transversely extending support beams 1640 and 1642 through and beyond peaks 1628 and 1630. Thus, vertical support beams 1668 may project from transversely extending support beam 1640 through and beyond peak 1628, and vertical support beams 1670 may project from transversely extending support beam 1642 through and beyond peak 1630. A portion 1680 and 1682 of each of vertical support beams 1668 and 1670 extending beyond peaks 1628 and 1630, respectively, may support wind turbine 1602. In some embodiments, portions 1680 and 1682 of each of vertical support beams 1668 and 1670 extending beyond peaks 1628 and 1630, respectively may support a generator 1672 associated with wind turbine 1602. For ease of illustration, two wind turbines are illustrated in FIG. 16. A third wind turbine may also be included within the scope of this disclosure, atop support beam 1671, between support beams 1668 and 1670.

In some disclosed embodiments, each transversely extending support beam is constructed of multiple bars. Multiple bars refers to two or more bars. For example, a transversely extending support beam may include two smaller transversely extending support beams connected together. Connecting two shorter beams to form a longer transversely extending support beam may provide one or more advantages. For example, two or more shorter beams may facilitate transportation and/or storage, and/or may be less expensive than a single, longer support beam. Additionally, using two or more bars may permit height adjustability. Depending upon roof configuration, in some installations it may be beneficial to space wind turbines further from the roof surface than in others. This may be facilitated by support beams constructed of multiple segments.

In some disclosed embodiments, the multiple bars are pivotably connectable to each other to enable the transversely extending support beam to assume a non-linear configuration. Multiple bars pivotably connectable to each other refers to fastening two or more bars in an adjustable manner permitting one of the bars to rotate relative to another one of the bars. A non-linear configuration refers to a bent and/or curved shape and/or form. In some instances, a substantially flat roof may include one or more non-flat surfaces due to slopes for drainage, and/or warping from stresses and/or strains caused by environmental elements and/or mechanical loads, and thus may not be perfectly flat. Installing a triangular roof truss on such a roof may thus result in an unstable and/or unbalanced installation, which may lead to strain and/or breakage. For example, a peak of a triangular roof truss installed on a non-perfectly flat roof may be skewed relative to a direction of gravity, which in turn may impose a torque on the structure. However, constructing a transversely extending support beam for a triangular roof truss by pivotably connecting multiple shorter beams may permit introduction of one or more bends to account for and/or correct for one or more non-flat surfaces of a non-perfectly flat roof. Installing such a triangular roof truss on a non-perfectly flat roof may result in improved stability, balance, and/or safety.

Figure 17:
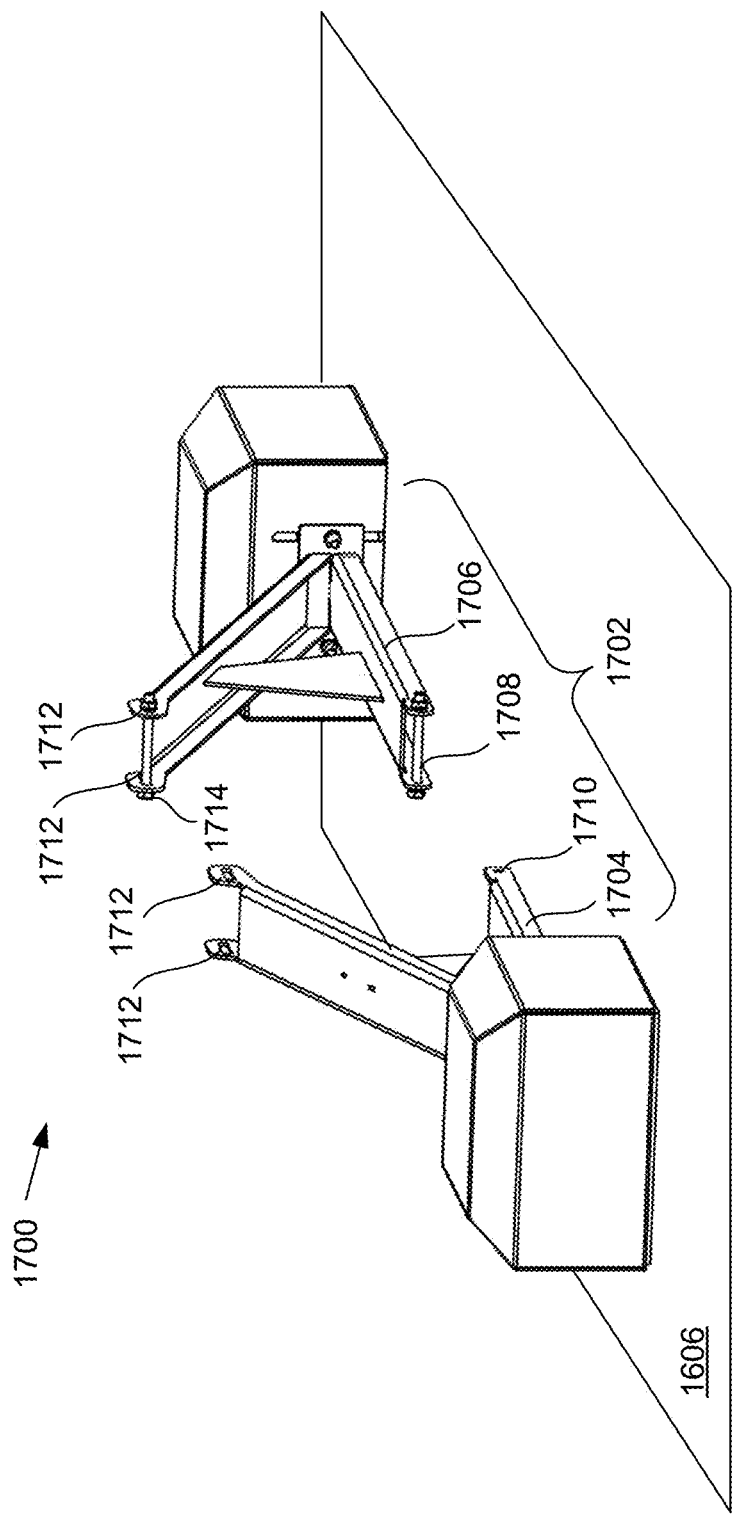
FIG. 17 is a perspective view of portions of another exemplary apparatus for a flat roof green energy support structure, consistent with some embodiments of the present disclosure.

By way of a non-limiting example, reference is made to FIG. 17 which is a schematic diagram of a portion of an apparatus 1700 for a flat roof green energy support structure, consistent with some embodiments of the present disclosure. Apparatus 1700 is substantially similar to apparatus 1600 of FIG. 16 with the notable difference of a transversely extending support beam 1702 constructed of multiple bars 1704 and 1706. Multiple bars 1704 and 1706 may be pivotably connectable to each other to enable transversely extending support beam 1702 to assume a non-linear configuration. For example, bars 1704 and 1706 may connect to each other via a pin 1708, allowing bars 1704 and 1706 to rotate relative to each other. Such a non-linear configuration may permit introducing a bend into transversely extending support beam 1702 to thereby correct for an incline on flat roof 1606 for drainage. For example, one of bars 1704 and 1706 may be at a slightly higher elevation than the other one of bars 1704 and 1706. Bending allowed by pivoting bars 1704 and 1706 about pin 1708 may help to account for the difference in elevation while stably aligning transversely extending support beam 1702 on the roof 1606.

Figure 23:
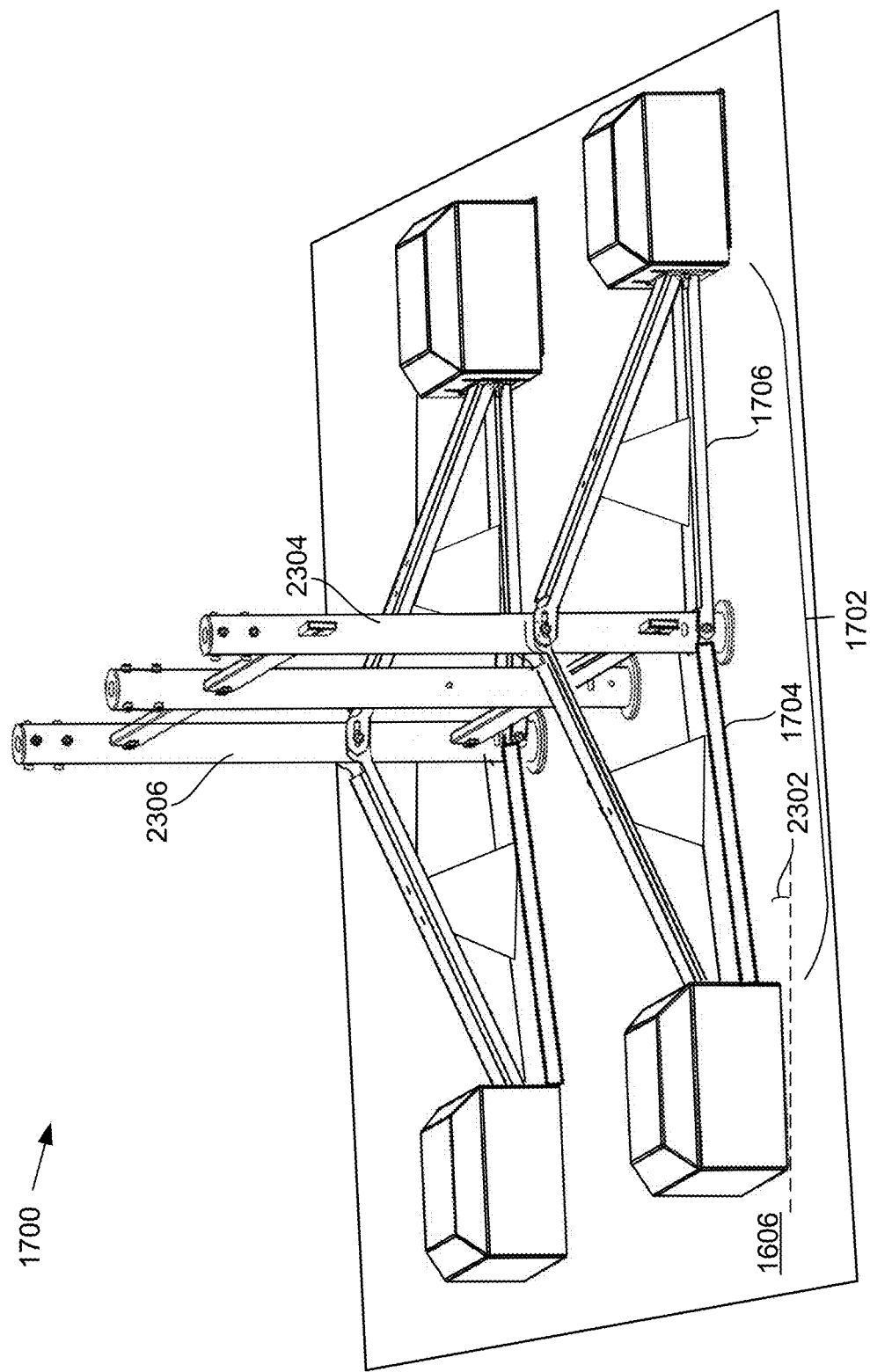
FIG. 23 is a perspective view illustrating adjustability of the apparatus of FIG. 16, consistent with some embodiments of the present disclosure.

By way of another non-limiting example, reference is made to FIG. 23 illustrating another schematic diagram of apparatus 1700 for a flat roof green energy structure, consistent with some embodiments of the present disclosure. In FIG. 23, multiple bars 1704 and 1706 may be pivotably connectable to each other to enable transversely extending support beam 1702 to assume a non-linear configuration. For example, the non-linear configuration of transversely extending support beam 1702 may correct for a non-zero pitch 2302 of flat roof to thereby ensure a vertical orientation for vertical support beams 2304 and 2306 so that vertical support beams 2304 and 2306 are generally parallel to a gravitational direction.

In some disclosed embodiments, each pair of upper chords is configured to be adjustably connected to an associated one of the plurality of vertical support beams, to thereby permit an angle of the associated vertical support beam to be adjusted relative to a pitch of the flat roof, thereby enabling vertical support of an associated wind turbine. Adjustably connected refers to attached and/or joined in a modifiable and/or adaptable manner. For example, adjustably connecting two or more members together may permit accommodating different angles of the two or more members at a connecting joint therebetween. This can occur, for example, using a pivotable or slidable connection between the components. A pair of upper chords configured to be adjustably connected to an associated vertical support beam refers to two upper chords being attachable to an associated vertical support beam in a manner to accommodate different orientations and/or alignments therebetween. For example, adjustably connecting a pair of upper chords to an associated vertical support beam may permit compensating for an incline of a flat roof for maintaining the associated vertical support beam at a vertical orientation relative to gravity. A pitch of a flat roof refers to a gradient, incline, and/or angle of a substantially flat roof, e.g., relative to gravity. For instance, a flat roof may include one or more inclined surfaces for drainage and/or due to warping, as described earlier. However, connecting a vertical support beam to a triangular roof truss resting on an inclined surface may cause a support beam oriented vertically relative to an associated transversely extending support beam to be aligned at a corresponding incline relative to gravity. Such an incline may cause gravity to impose a torque on the vertical support beam and on any object supported thereon, leading to instability and/or imbalance. To permit an angle of an associated vertical support beam to be adjusted relative to a pitch of a flat roof refers to enabling modification of an alignment of a vertical support beam compared to an incline of a substantially flat roof. Enabling vertical support of an associated wind turbine refers to causing a wind turbine installed on the vertical support beam to be aligned substantially vertically relative to a direction of a gravity vector. For example, absent an adjustable connection, connecting a vertical support beam to a pair of chords of a triangular support beam resting on a surface having a pitch of 10 degrees may cause an alignment of the vertical support relative to gravity to be skewed by 10 degrees as well. Such a skew may impose a torque on the vertical support beam and on a wind turbine installed thereon, leading to imbalance, instability, and/or safety hazards. However, adjustably connecting a vertical support beam to the pair of chords may allow correcting for a pitch of a flat roof to permit alignment of the vertical support beam and an associated wind turbine with gravity, which may improve balance and stability, and may reduce risk of safety hazards.

In some disclosed embodiments, the pivotable connection and the adjustable connection are achieved with a tightenable fastener to thereby enable the adjusted angle of the associated vertical support beam to be fixed. A tightenable fastener refers to a locking mechanism for reinforcing and/or securing a joint connecting two or more members. Some examples of a tightenable fastener may include a bolt, a screw, a hook, a nut, an adjustable ring, and/or a lock. A tightenable fastener may be loosened (e.g., by turning counter-clockwise) to enable adjusting a joint connecting two members, and tightened (e.g., by turning clockwise) to secure the joint in a particular alignment and/or orientation. Achieved refers to implemented and/or obtained. A pivotable connection and an adjustable connection achieved with a tightenable fastener refers to using one or more tightenable fasteners to enable a connection of multiple bars of a transversely extending support beam to be pivotable, and to enable a connection of a vertical support beam to a pair of upper chords to be adjustable. Enabling an adjusted angle of an associated vertical support beam to be fixed refers to using a tightenable fastener to secure and/or lock an orientation of a vertical support beam to conform to a selected orientation. For example, upon adjusting a pivotable connection of multiple bars of a transversely extending support beam and/or adjusting an adjustable connection of a vertical support beam to a pair of upper chords to cause the vertical support beam to align with gravity, the pivotable connection and the adjustable connection may be secured and/or locked using one or more tightenable fasteners.

In some embodiments, the each of the plurality of upper chords includes a plurality of connection locations at proximal ends thereof for connection to an associated one of the plurality of vertical support beams, such that each of the plurality of connection locations corresponds to a differing angle of the associated vertical support beam relative to the flat roof pitch. A plurality of connection locations refers to a plurality of points, sites, and/or spots for fastening, coupling, and/or attaching two objects together. For example, each connection location may be associated with a hole and/or threaded bore for pairing with a pin, hook, screw, and/or bolt. Each upper chord including a plurality of connection locations at proximal ends thereof for connection to an associated one of the plurality of vertical support beams refers to each proximal end of each upper chord including more than one connection point thereby permitting selection of a specific connection point for attaching the proximal end of each upper chord to one of the vertical support beams. A differing angle refers to a distinct orientation and/or alignment relative to a reference, e.g., the ground, and/or gravity. Each connection location corresponding to a differing angle of an associated vertical support beam relative to a flat roof pitch refers to each connection location on a proximal end of an upper chord being configured to cause a vertical support beam connected thereto to be aligned at a different angle compared to an incline of a substantially flat roof. Adaptability to differing angles can be beneficial for installations on pitched flat roofs, because without angle adaptability, wind turbines might otherwise be non-vertical in orientation. Adjustability permits the support to be vertical, even when the roof is pitched. For example, connecting a vertical support beam to an upper chord at a first connection location thereof may cause an angle between the vertical support beam and a substantially flat roof to be smaller (or larger) than connecting the vertical support beam to the upper chord at a second connection location thereof. Selection of a particular connection location for connecting a vertical support beam to a proximal end of an upper chord may permit selection of an angle of the vertical support beam relative to a flat roof. For instance, an angle may be selected for correcting and/or compensating for a pitch and/or warped surface on the flat roof to thereby maintain a substantially vertical alignment of the vertical support beam relative to gravity. Thus, a plurality of different connection locations on a proximal end of an upper chord may permit correcting for one or more inclined sections of a flat roof, to thereby align an associated vertical support beam connected thereto with gravity and improve stability and/or balance of an object supported thereon.

In some disclosed embodiments, each connection location is associated with a hole. A hole refers to an opening and/or aperture. In some embodiments, a hole may be an elongated slot. A connection location associated with a hole refers to an aperture and/or slot positioned for attaching two or more members. For example, each connection location may correspond to a different point along an elongated slot permitting to account for non-flat aberrations of a flat root. A first member may connect to a second member by inserting an end of the first member into a hole in the second member, thereby joining the two members together. In some embodiments, the hole may be larger than a diameter of the end of the second member to allow adjusting a relative angle therebetween, for example, to correct for and/or accommodate an incline of a flat roof.

Figure 18:
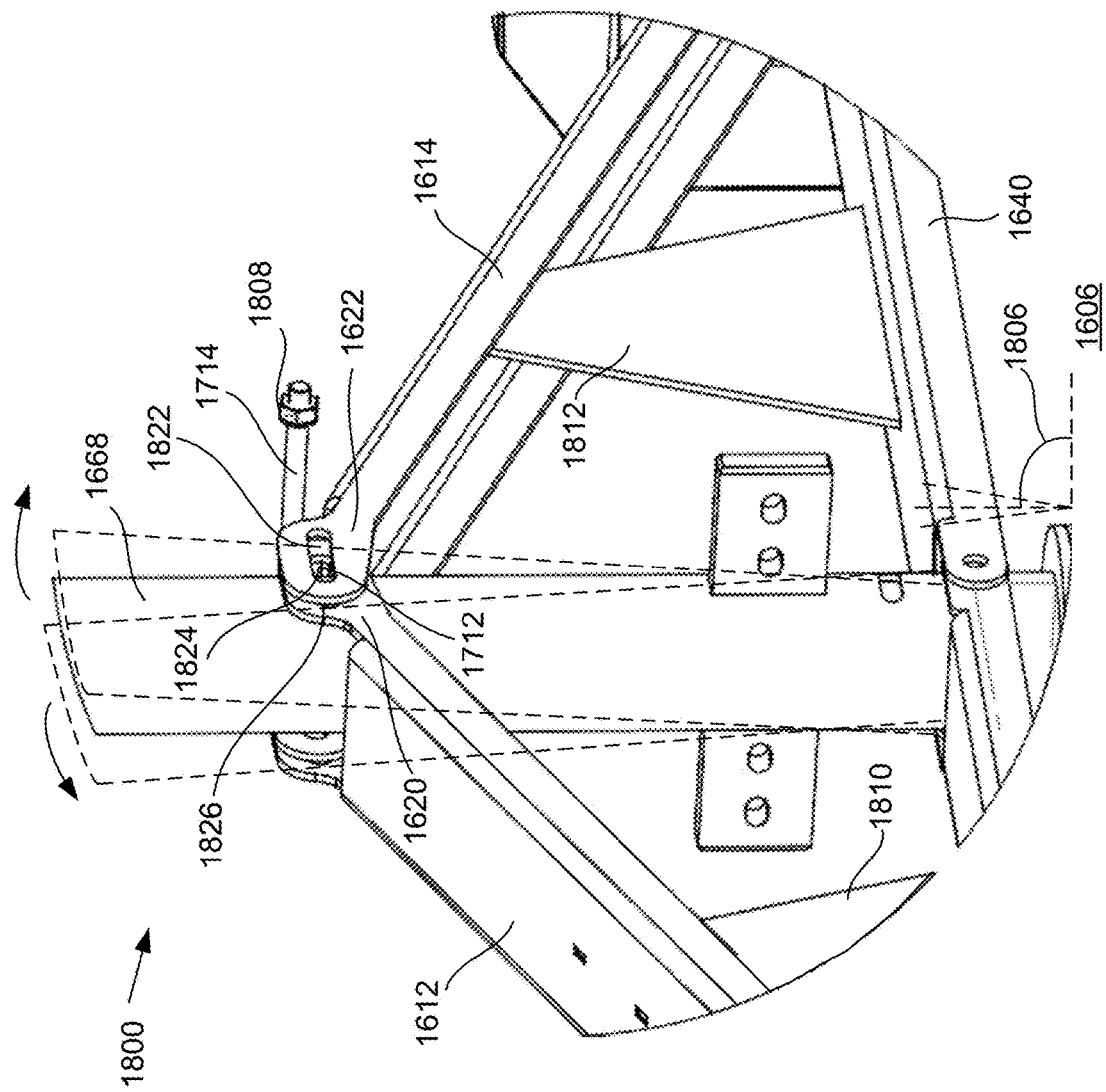
FIG. 18 is a detailed perspective view of the apparatus for a flat roof green energy support structure of FIG. 16, consistent with some embodiments of the present disclosure.

By way of a non-limiting example, reference is made to FIG. 18, which is a detailed view 1800 of apparatus 1600 of FIG. 16, consistent with some embodiments of the present disclosure. Detailed view 1800 shows pair of upper chords 1612 and 1614 adjustably connected to vertical support beam 1668 to thereby permit an angle 1806 of vertical support beam 1668 to be adjusted relative to a pitch of flat roof (e.g., see pitch 2302 in FIG. 23), thereby enabling vertical support of an associated wind turbine (e.g., wind turbine 1602 of FIG. 16). In some embodiments, the pivotable connection of FIG. 17 between bars 1704 and 1706 and the adjustable connection in FIG. 18 between upper chords 1612 and 1614 may be achieved with one or more tightenable fasteners 1808, respectively, to thereby enable the adjusted angle 1806 of vertical support beam 1668 to be fixed. For example, the one or more tightenable fasteners 1808 may be threaded nuts. In some embodiments, upper chords 1612, 1614, 1616, and 1618 may include a plurality of connection locations 1822, 1824, and 1826 at proximal ends 1620, 1622, 1624, and 1626, respectively. Each of the plurality of connection locations, for connection to vertical support beams 1668 and 1670, respectively, such that each of the plurality of connection locations 1802, 1804, and 1806 corresponds to a differing angle of the associated vertical support beam relative to the flat roof pitch. In some embodiments, each of connection locations 1822, 1824, and 1826 is associated with slot 1712 (e.g., a hole). For instance, each of connection locations 1822, 1824, and 1826 may correspond to a different position along slot 1712.

For example, in FIGS. 17-18, connection locations 1822, 1824, and 1826 at proximal ends 1620 and 1622 of upper chords 1612 and 1614 may be associated with an elongated slot on either side thereof (e.g., slot 1712). Upper chords 1612 and 1614 may connect to vertical support beam 1668 by inserting a pin 1714 through each slot 1712 and through vertical support beam 1668 at one of connection locations 1822, 1824, and 1826. The length of elongated slots 1712 may be larger than a diameter of pin 1714, such that pin 1714 may engage with slots 1712 in a plurality of connection locations 1822, 1824, and 1826 within slots 1712, each connection location 1822, 1824, and 1826 corresponding to a different angle between one of upper chords 1612 and 1614 and vertical support beam 1668. Adjusting a location for engaging pin 1714 through elongated slots 1712 may thus permit adjusting a relative angle between vertical support beam 1668 and upper chords 1612 and 1614 connected to transversely extending support beam lying on flat roof 1606. Thus, adjusting a location for engaging pin 1714 through elongated slots 1712 may permit adjustment of an angle 1806 between vertical support beam 1668 and flat roof 1606. For example, if a pitch of flat roof 1606 is 5 degrees, a location for engaging pin 1714 through elongated slots 1712 may be adjusted to correct for a 5 degree pitch to align vertical support beam 1668 with gravity, thereby enabling vertical support of associated wind turbine 1602. Upon achieving vertical alignment for vertical support beam 1668, pin 1714 may be locked on either side of vertical support beam 1668 using tightenable threaded nut 1808.

In some disclosed embodiments, the transversely extending support beam is constructed of a single bar having a central adjustment slot therein for connection to an associated one of the plurality of vertical support beams. A single bar refers to an integrally whole beam and/or pole, e.g., not made from a plurality of fragments and/or pieces (although in other embodiments, the adjustment slot may be employed with a support beam constructed of multiple segments). A central adjustment slot refers to an elongated hole and/or aperture located in a middle region of an object. A transversely extending support beam constructed of a single bar having a central adjustment slot therein for connection to an associated vertical support beam refers to an integrally whole transversely extending support beam including an adjustment slot disposed at a middle region thereof for attachment to a vertical support beam. For example, a central adjustment slot of a transversely extending support beam may be wider than a diameter of a lower end of a vertical support beam, such that inserting the end of the vertical support beam into the central adjustment slot may allow orienting the vertical support beam in a range of angles relative to a flat roof (e.g., the central adjustment slot may accommodate wiggle room). For example, the angles may range between 5 and 10 degrees, 5 and 15 degrees, 10 and 15 degrees, 5 and 20 degrees, or any other range of angles. In some embodiments, a central adjustment slot may accommodate a range of angles corresponding to a typical range of inclines on a flat roof. A vertical support beam inserted into a central adjustment slot of a transversely extending support beam resting on an incline may thus be adjusted until the vertical support beam is aligned with gravity. Fastening and/or locking the vertical support beam connected thus to the transversely extending support beam may secure the vertical support beam in a vertical orientation relative to gravity, thereby providing balance and/or stability to an objected supported thereon.

For example, installing a wind turbine on a non-vertically aligned support beam projecting from a triangular external roof truss may cause the wind turbine to be imbalanced. When the turbine spins, the imbalance may cause the triangular external roof truss to wobble and/or shake, which may cause the triangular external roof truss to move and/or break, causing the wind turbine to fall, leading to safety hazards and breakage. Ensuring that a vertical support beam supporting a wind turbine is aligned with gravity may thus ensure that the wind turbine is balanced while spinning.

Figure 19:
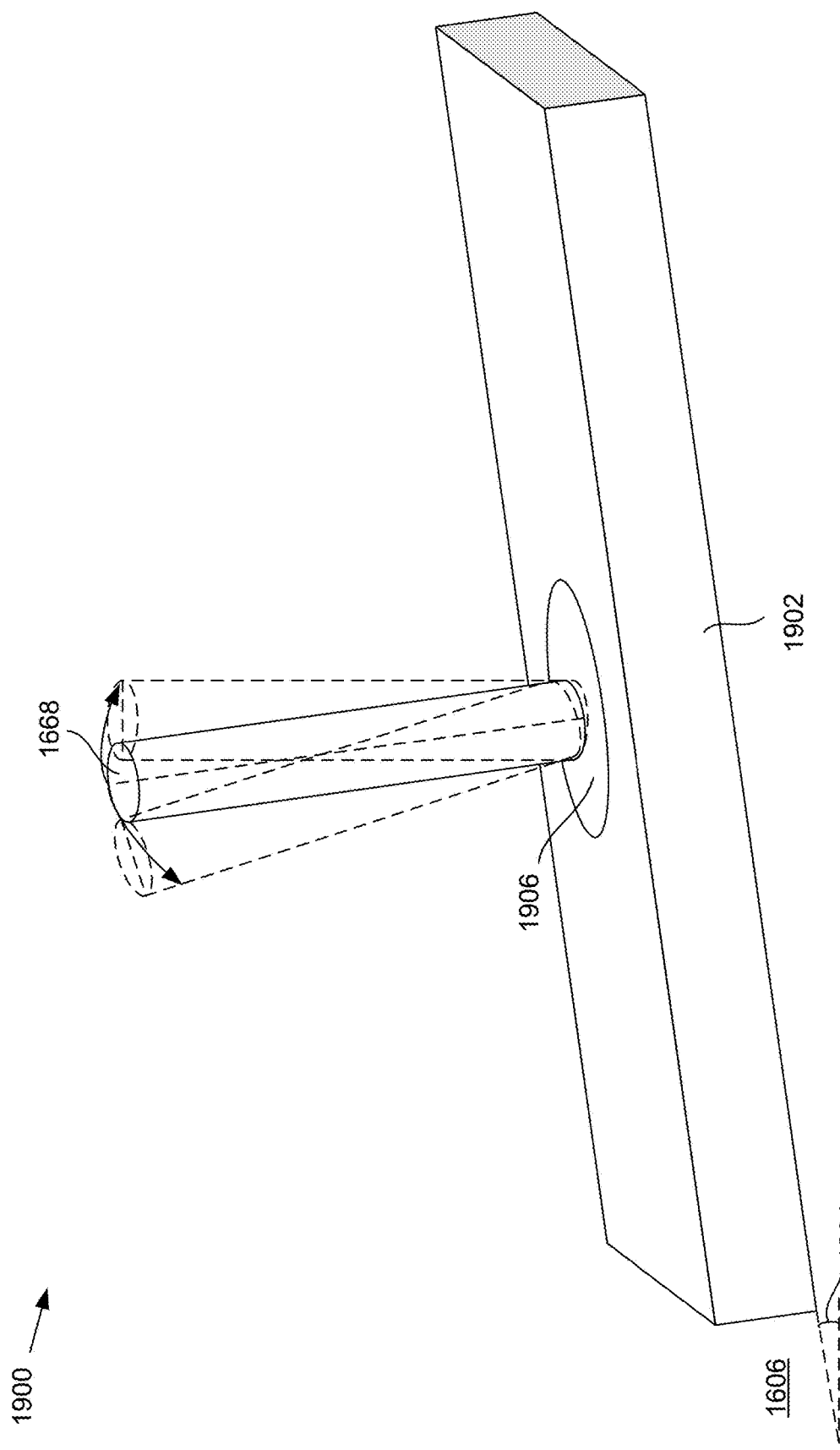
FIG. 19 is detailed perspective view illustrating adjustability of the support beams of FIG. 16, consistent with some embodiments of the present disclosure.

By way of a non-limiting example, in FIG. 19 which is a schematic diagram of an apparatus 1900 for a flat roof green energy support structure, consistent with some embodiments of the present disclosure. Apparatus 1900 is substantially similar to apparatus 1600 of FIG. 16 with the notable difference that a transversely extending support beam 1902 (e.g., corresponding to transversely extending support beam 1640) is constructed of a single bar having a central adjustment slot 1906 therein for connection to vertical support beam 1668. Central adjustment slot 1906 may have a larger opening than a diameter of vertical support beam 1668 permitting adjustment of a relative angle between vertical support beam 1668 and transversely extending support beam 1902 to correct for a non-zero pitch 1904 of flat roof.

Some disclosed embodiments involve a scaffold structure for maintaining the plurality of triangular external roof trusses at a spaced distance from each other. A scaffold refers to stabilizing supports. For example, a scaffold structure may include a series of stabilizing elements cooperating to provide stability. An example is a frame made of one or more poles, rods, and/or beams for supporting and/or stabilizing one or more objects. A spaced distance refers to a gap and/or length separating two objects. A scaffold structure for maintaining a plurality of triangular external roof trusses at a spaced distance from each refers to one or more bars, rods, and/or beams for positioning and/or securing a plurality of triangular external roof trusses at spacings or gaps relative to each other. For example, a scaffold structure may maintain adjacent triangular external roof trusses at spaced distances ranging between 1 and 1.5 meters, between 1 and 2 meters, between 2 and 2.5 meters, between 2 and 3 meters, or at any other distance. In some embodiments, a scaffold structure may maintain a spaced distance between two adjacent triangular external roof trusses to accommodate one or more green energy sources supported thereon.

In some disclosed embodiments, the spaced distance is selected such that adjacent ones of the plurality of upper chords are enabled to support at least one solar panel thereon at an acute angle relative to the flat roof. A solar panel refers to an electronic device that may include an assembly of photovoltaic solar cells configured to receive solar energy (e.g., sunlight) and convert the received solar energy into electricity. In some embodiments, a solar panel may have a generally rectangular or square shape and may include an outer frame. The photovoltaic solar cells may be disposed on a substrate which may be attached to the frame. One or more of the frame and/or the substrate may include one or more fastening mechanisms (e.g., clamps, brackets, bots, nuts, screws) that may allow the solar panel to be attached to other structures (e.g., the roof of a building or support system on the roof of the building). The frame of the solar panel may be made of metal, wood, plastic, composite, or any other rigid material. Similarly, although rectangular and square shapes have been discussed above, it is contemplated that the frame of the solar panel may have any other shape. Supporting a solar panel on a structure may include providing for one or more fastening means such as brackets, clamps, hooks, and/or any other type of attachment means that may allow attachment of the solar panel to the supporting structure. Supporting a solar panel on a structure may also include ensuring that the supporting structure is capable of withstanding the weight of the solar panel without being damaged. An acute angle refers to an angle of less than 90 degrees. To support a solar panel thereon at an acute angle relative to a flat roof refers to hold, prop, and/or steady a solar panel at an incline of less than 90 degrees relative to a flat roof. Supporting a solar panel at an acute angle relative to a flat surface may permit aligning the solar panel to receive solar energy for conversion to electrical energy.

For example, the spaced distance between adjacent upper chords may correspond to a dimension of a solar panel, to thereby accommodate a solar panel in between adjacent upper chords. In addition, each pair of upper chords may extend diagonally from two heel locations on either side of a transversely extending support beam resting on a flat roof to an upper peak above the flat roof, such that the pair of upper chords may be inclined at an acute angle relative to the flat roof (e.g., independent of the spaced distance therebetween). The incline may facilitate distribution of loads, stresses, and/or strains among the different members of each triangular external roof truss. In addition, the incline may define an inclined plane for supporting a solar panel to collect sunlight for conversion to electrical energy. In some implementations, the incline of the upper chords may be adjusted to correspond to a latitude of an installation site of green energy sources, such that the inclined plane for supporting a solar panel thereon corresponds to the latitude. For example, if an apparatus for mounting green energy sources is located at a latitude of 30 degrees above the equator, the angle of the upper chords relative to the flat roof may be approximately 30 degrees. Thus, the spaced between adjacent upper chords may accommodate a size of a solar panel, and an acute angle of adjacent upper chords relative to a flat roof may support the solar panel at the acute angle.

By way of a non-limiting example, in FIG. 16, apparatus 1600 may include a scaffold structure 1674 for maintaining triangular external roof trusses 1608 and 1610 at a spaced distance (e.g., see spaced distance 2104 in FIG. 21) from each other. The spaced distance may be selected such that adjacent upper chords 1614 and 1618 may accommodate a width of solar panel 1604, permitting to support solar panel 1604 on adjacent upper chords 1614 and 1618. An acute angle of adjacent upper chords 1614 and 1618 relative to flat roof 1606 may cause solar panel 1604 supported by adjacent upper chords 1614 and 1618 to be at an acute angle relative to flat roof 1606.

In some disclosed embodiments, each triangular external roof truss further includes a plurality of web members, each web member configured for extending between and interconnecting at least one of the plurality of upper chords with the transversely extending support beam. A web member refers to a strut, brace, tie, and/or cross member for transferring a load. A web member may extend between two members of a roof truss for distributing a load therebetween. A web member may connect to two members of a triangular external roof truss using one or more screws, bolts, nails, rivets, and/or by welding or brazing, thereby interconnecting the two members. A web member configured for extending between and interconnecting an upper chord with a transversely extending support beam refers to a diagonal member linking and/or connecting an upper chord with a transversely extending support beam of a triangular external roof truss. A web member may include a single web member, or a plurality of web members connecting an upper chord to a transversely extending support.

By way of a non-limiting example, in FIG. 18, triangular roof truss 1608 may include web members 1810 and 1812 extending between and interconnecting upper chords 1612 and 1614 with transversely extending support beam 1640. In a similar manner, triangular roof truss 1610 in FIG. 16 may include web members extending between and interconnecting upper chords 1616 and 1618 with transversely extending support beam 1642. For example, web members 1810 and 1812 may distribute loads between upper chords 1612 and 1614 and transversely extending support beam 1640. Similarly, web members extending and interconnecting upper chords 1616 and 1618 with transversely extending support beam 1642 may distribute loads between upper chords 1616 and 1618 and transversely extending support beam 1642.

In some disclosed embodiments, the scaffold structure includes a plurality of cross-bars for interconnecting the plurality of vertical support beams. A bar may refer to a generally elongated rigid piece of solid material used as a support, or structural or mechanical member. The bar may have a circular, square, rectangular, polygonal, or any other type of cross-section. In some embodiments, the bar may have an I-shaped or C-shaped cross-section. Although the bar may be made of metal, it is contemplated that the bar may be made of other materials such as wood, plastic, composite, or any other material that can provide structural support. A cross-bar refers to a structure that extends across or between two elements, e.g., to space the two elements apart by a distance corresponding to a length of the cross-bar and/or for providing stability to a structure including the two elements. The cross bars may extend horizontally or at non-horizontal angles. A plurality of cross-bars for interconnecting the plurality of vertical support beams refers to more than one bar linking the vertical support beams together. A cross-bar may connect to two adjacent vertical support beams using one or more screws, bolts, rivets, nails, and/or by welding or brazing. In some embodiments, a cross-bar may interconnect pairs of adjacent vertical support beams. In some embodiments, multiple cross-bars may interconnect pairs of adjacent vertical support beams, e.g., at different locations along the length of the vertical support beams. In some embodiments, a single cross-bar may interconnect more than two vertical support beams. In some embodiments, multiple cross-bar may interconnect more than two vertical support beams, e.g., at different locations along the length of the vertical support beams. In some embodiments, a cross-bar may interconnect two adjacent support beams using one or more brackets and/or connecting pieces. For example, a connecting piece may pass through a vertical support beam and protrude from either side thereof, to provide a flat surface for connecting to a cross-bar using one or more screws and/or bolts.

Some disclosed embodiments involve at least one additional vertical support beam disassociated with the plurality of triangular external roof trusses, for supporting an additional wind turbine. An additional vertical support beam refers to an extra and/or supplementary vertical support beam. Disassociated refers to unconnected (e.g., directly) and/or detached. For example, an object indirectly connected to another object may be disassociated from the other object. An additional vertical support beam disassociated with (e.g., from) the plurality of triangular external roof trusses refers to another vertical support beam that is not directly connected to one of the plurality of roof trusses. For example, an extra support beam may be located between two triangular roof trusses. The extra support beam may connect to two vertical support beams projecting through each peak of the two triangular external roof trusses on either side thereof using one or more cross-bars. For supporting an additional wind turbine refers to for holding and/or bearing another wind turbine. For instance, an apparatus for mounting green energy sources on a flat roof may include three vertical support beams for supporting three wind turbines. Two of the three vertical support beams may each extend from a different triangular external roof truss, and the third vertical support beam may be located therebetween, disassociated from the two triangular external roof trusses located on either side thereof. One or more cross-bars may interconnect the three vertical support beams, e.g., to interconnect the three vertical support beam to the apparatus.

Figure 20:
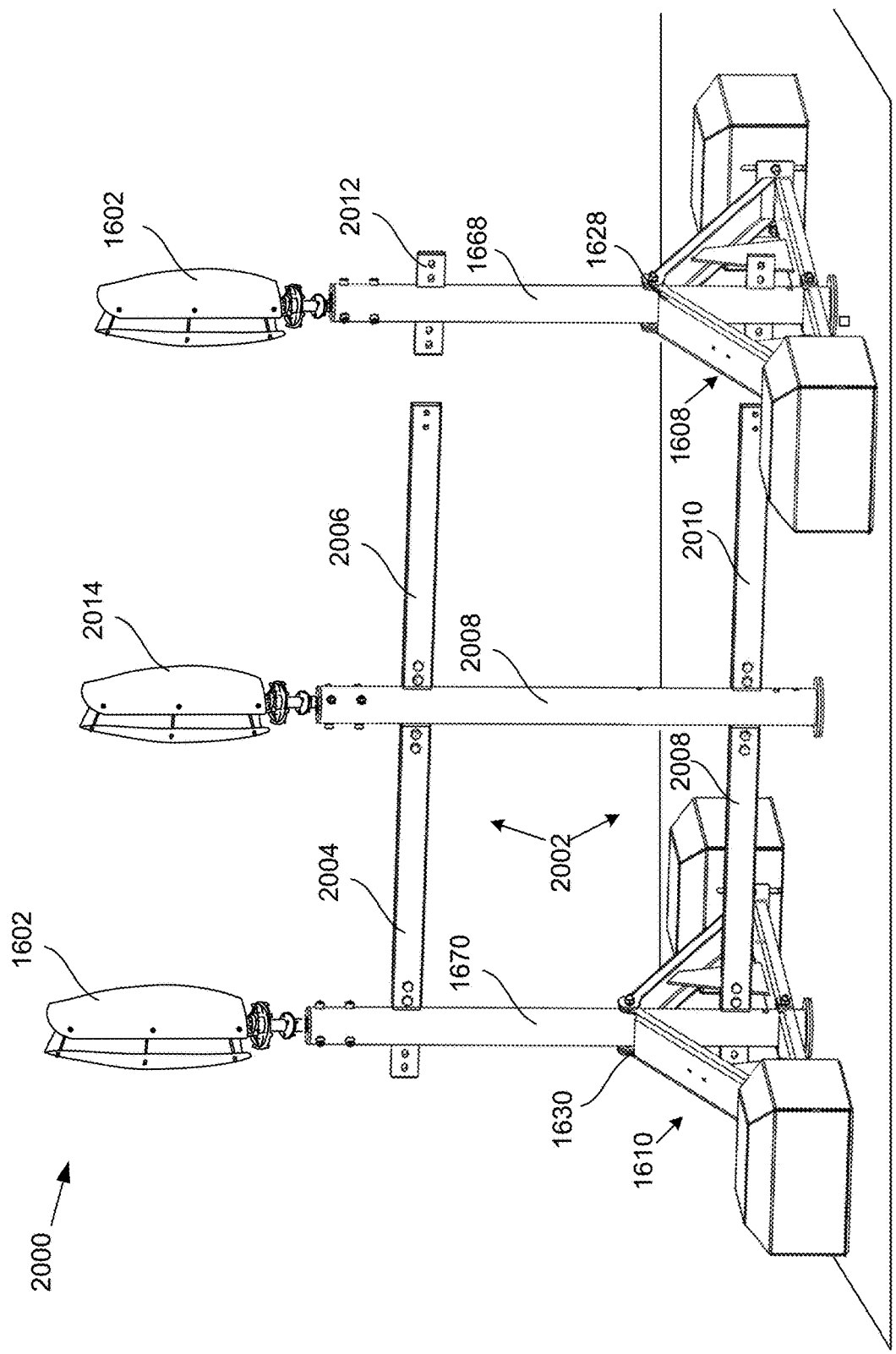
FIG. 20 is a partial perspective front view of portions of the apparatus of FIG. 16, consistent with some embodiments of the present disclosure.

By way of a non-limiting example, reference is made to FIG. 20, which is another schematic diagram of an apparatus for a flat roof green energy support structure 2000, consistent with some embodiments of the present disclosure. Apparatus 2000 is substantially similar to apparatus 1600 of FIG. 16 with the notable difference that a scaffold structure 2002 may include a plurality of cross-bars 2004, 2006, 2008, and 2010 for interconnecting vertical support beams 1668, 1670 and an additional vertical support beam 2008. For example, cross-bars 2004, 2006 may interconnect vertical support beams 1668, 1670, and 2008 above peaks 1628 and 1630, and cross-bars 2008, 2010 may interconnect vertical support beams 1668, 1670, and 2008 below peaks 1628 and 1630. In some embodiments, cross-bars 2004, 2006 may interconnect vertical support beams 1668, 1670, and 2008 using one or more connecting pieces 2012 attached and/or passing through vertical support beams 1668, 1670, and 2008 using one or more screws and/or bolts. In some embodiments, apparatus 2000 may include additional vertical support beam 2008 disassociated with (e.g., not directly connected to) triangular external roof trusses 1610 and 1608, for supporting an additional wind turbine 2014.

Some disclosed embodiments involve a plurality of wind turbines, each wind turbine being connectable to an associated one of the plurality of vertical support beams. A plurality of wind turbines, each wind turbine being connectable to an associated one of the plurality of vertical support beams refers to at least two wind turbines (as described elsewhere herein), each attached to a different vertical support beam of an apparatus for mounting green energy sources on a flat roof. In some embodiments, a wind turbine connectible to a vertical support beam refers to a generator associated with a wind turbine being connectible to a vertical support beam. In some disclosed embodiments, each wind turbine is a vertical axis wind turbine. A vertical axis wind turbine, as described elsewhere herein, may include a rotatable shaft parallel to a vertical support beam. In some embodiments, connecting a vertical-axis wind turbine to a vertical support beam may align a rotatable shaft of the vertical-axis wind turbine with the vertical support beam. Ensuring that a vertical support beam is aligned with gravity may ensure that a vertical axis turbine supported thereon is balanced while spinning. In some embodiments, the triangular roof trusses may be spaced apart, such that supporting a plurality of wind turbines on associated vertical support beams causes at least one of the wind turbines to positively influence the power output of at least another one of the wind turbines. For example, supporting a plurality of wind turbines using the disclosed apparatus may cause fluid coupling there between, permitting wind associated with one of the wind turbines to positively affect the rotation of another one of the wind turbines. In some embodiments, rotational velocities of one or more the wind turbines may be adjusted (e.g., using at least one processor) to cause fluid coupling to positively influence an aggregate power output of the wind turbines.

By way of a non-limiting example, in FIG. 16, apparatus 1600 may include a plurality of wind turbines 1602, each of wind turbines 1602 may be connected to an associated vertical support beam 1668 and 1670. In some embodiments, wind turbines 1602 may connect to vertical support beam 1668 and 1670 via an associated generator 1672. In some embodiments, wind turbines 1602 may be vertical axis wind turbines.

Some disclosed embodiments involve a plurality of solar panels, each of the plurality of solar panels being mountable on adjacent upper chords. A plurality of solar panels being mountable on adjacent upper chords refers to multiple solar panels connected to neighboring upper chords of neighboring triangular external roof trusses. The solar panels may be connected to the upper chords using one or more screws, bolts, rivets, clamps, and/or brackets. For example, one or more solar panels may be mounted on an inclined plane defined by each upper chord extending from an associated heel location adjacent a flat roof to a peak, located above the flat roof. In some embodiments, the incline may correspond to a latitude of a geographical location of the flat roof where the apparatus is installed.

Figure 21:
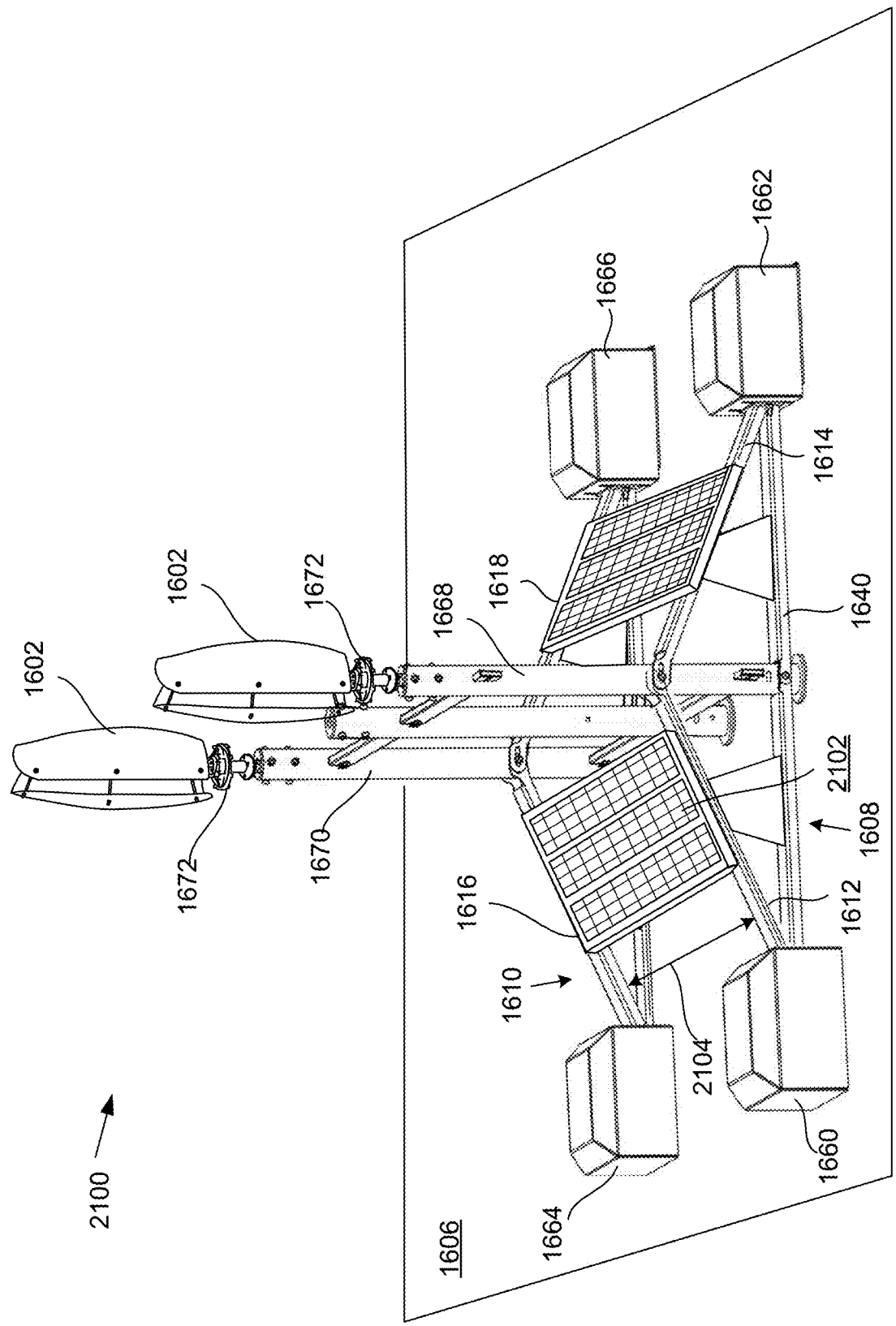
FIG. 21 illustrates the apparatus of FIG. 16, supporting opposing solar panels, consistent with some embodiments of the present disclosure.

By way of a non-limiting example, reference is made to FIG. 21 illustrating another schematic diagram of an apparatus for a flat roof green energy support structure 2100, consistent with some embodiments of the present disclosure. Apparatus 2100 is substantially similar to apparatus 1600 of FIG. 16 with the notable difference that apparatus 2100 may include a plurality of solar panels 1604 and 2102. Each of solar panels 1604 and 2102 may be mounted on adjacent upper chords. For example, solar panel 1604 is mounted on adjacent upper chords 1614 and 1618, whereas solar panel 2102 is mounted on adjacent upper chords 1612 and 1616.

Figure 24:
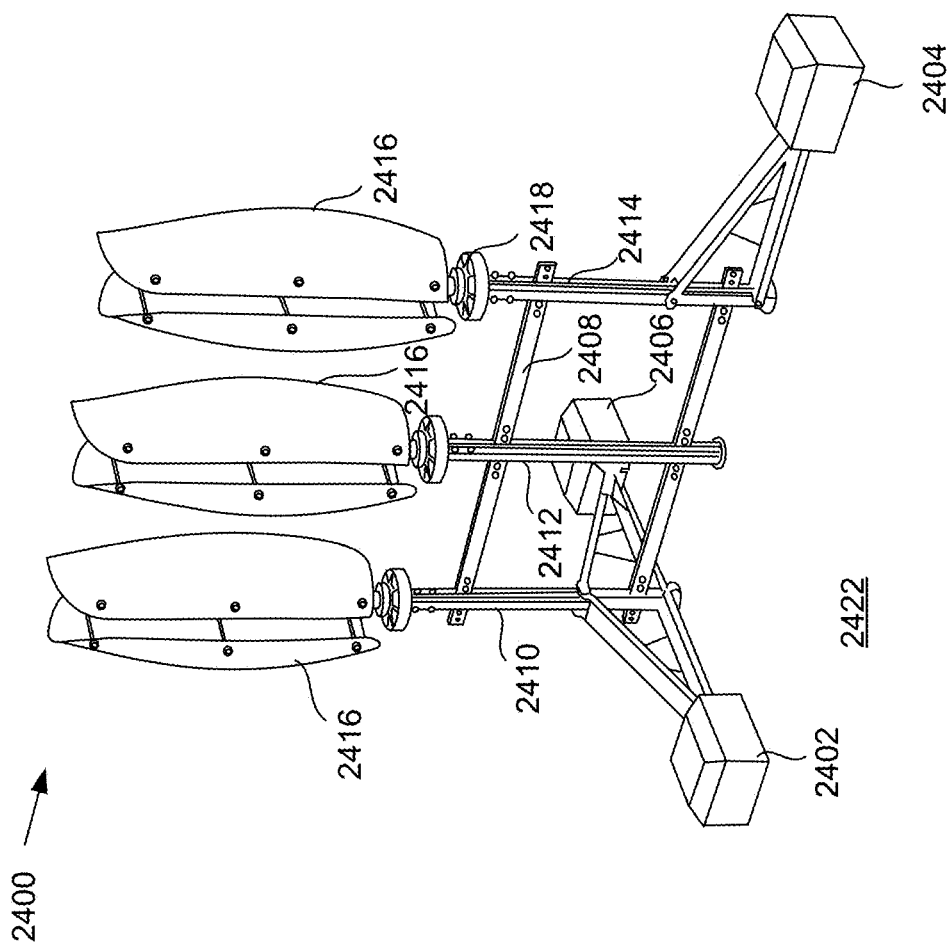
FIG. 24 is a perspective view of a tripod apparatus for mounting a plurality of green energy sources on a flat roof, consistent with some embodiments of the present disclosure.

In some embodiments, an apparatus for mounting a plurality of green energy sources on a flat roof may include a tripod structure for supporting a plurality of wind turbines. Such a tripod structure may be substantially similar to the embodiments disclosed herein with the noted difference of including three heel weight bases distributed around and supported a scaffolding structure for a plurality of wind turbines. By way of a non-limiting example, reference is made to FIG. 24 illustrating a tripod apparatus 2400 for mounting a plurality of green energy sources on a flat roof 2422, consistent with some embodiments of the present disclosure. Tripod apparatus 2400 may include three heel weight bases 2402, 2404, and 2406 supporting a scaffold structure 2408. Scaffold structure 2408 may support a plurality of vertical support beams 2410, 2412, and 2414 each supporting a wind turbine 2416 and an associated generator 2418. Tripod apparatus 2400 may include one or more adjustable connections as described herein to ensure a vertical alignment for wind turbines 2416 when flat roof 2422 includes one or more non-flat aberrations, such as a pitch for drainage.

As use of electronic devices and vehicles proliferate, public spaces may benefit from green energy charging stations. Moreover, demand for shaded regions has increased as temperatures rise across the globe. Embodiments are disclosed for a green energy charging station for harnessing sun and wind energy for charging one or more electronic devices and/or vehicles, while providing a shaded resting area for users of the electronic devices and/or vehicles during the charging process.

Some disclosed embodiments involve a green energy electrical charging station. Green energy refers to energy that is naturally replenishable and/or environmentally sustainable. Examples of green energy may include solar energy, wind energy, or kinetic energy in any other type of fluid flow. An electrical charging station refers to infrastructure for providing electrical energy to charge one or more electrical devices and/or vehicles. An electrical charging station may be installed in an outdoor location accessible to users of electrical vehicles and/or devices, such as by an intersection, in a park, in a parking lot, on a beach, by a boardwalk, and/or any other location accessed by users of electrical vehicles and/or devices. In some embodiments, an electrical charging station may provide electrical energy as a DC signal for charging a battery of one or more electronic devices and/or vehicles. Some examples of electronic devices and/or vehicles that may receive electrical energy from an electrical energy charging station may include an electric bicycle and/or scooter, an electric wheelchair, an electric or hybrid car, a mobile communication device, a wearable device (e.g., a smart watch and/or smart glasses), and/or any other electronic device and/or vehicle powered using one or more rechargeable batteries. In some embodiments, an electrical charging station may provide electrical energy as an AC signal. In some embodiments, an electrical charging station may deliver electrical energy produced by one or more associated green energy sources (as described elsewhere herein). Additionally or alternatively, an electrical charging station may deliver electrical energy from an electrical grid.

Some disclosed embodiments involve a support pole. A support pole refers to a structural member, beam, column, rod, and/or post configured for orientation relative to the ground and configured to hold, carry, and/or prop up an object. In some embodiments, a support pole may be oriented vertically relative to the ground. A support pole may have a round, square, rectangular, and/or any other shaped cross-section. A support pole may be made of metal, such as aluminum and/or steel (e.g., galvanized 1020 carbon steel), wood, plastic, resin, fiberglass, carbon fiber, bamboo, and/or any other material for withstanding one or more stresses, strains, and/or torques. In some embodiments, a support pole may include sheet metal having a thickness of approximately 6 mm, or approximately 8 mm. In some embodiments, a support pole may enclose a volume for housing electronic components for a green energy electrical charging station. Such electronic components may include, for example, one or more batteries, charge controllers, inverters, rectifiers, converters, adapters, transformers, capacitors, switches, processors, controllers, and/or any other electronic component for conveying energy generated by a green energy source to a battery and/or to one or more electric outlets.

Some disclosed embodiments involve a bench configured for connecting to and extending from the support pole. A bench refers to an elongated seat for accommodating one or more people in a seated position. A bench may include one or more seats, a backrest, one or more legs, a small computer table or desk, and/or arm rests. A bench may be supported independently using a plurality of legs, and/or by connecting the bench to a supporting structure (e.g., a wall and/or beam) on at least one side thereof. A bench may be made of wood, metal, plastic, resin, fiberglass, concrete, and/or any other sturdy material suitable to support one or more individuals in a seated position. Extending refers to projecting, protruding, and/or jutting out. Connecting refers to attaching, joining, and/or affixing. A bench may be connected to a support pole using one or more screws, bolts, nails, brackets, rivets, clamps, and/or by welding, and/or brazing. In some embodiments, a bench may be integrally formed with a support pole, e.g., as a solid piece of molded metal, plastic, resin, fiberglass, or any other moldable material. In some embodiments, a connection connecting a bench to a support pole of a charging station may include one or more wires for electrically connecting one or more outlets located on the bench to one or more batteries associated with the support pole. A bench for connecting to and extending from a support pole refers to a bench attached to a support pole in a manner to cause the bench to jut out and/or protrude from the support pole. In some embodiments, a support pole connected to a bench may at least partially support the bench on one side thereof. For example, a bench may be supported on one side thereof by one or more legs and/or pedestals, and supported on the other side thereof by a support pole (e.g., replacing a second pair of legs and/or a second pedestal).

Some disclosed embodiments involve a canopy configured for connecting to the support pole for shading at least a portion of the bench. A canopy refers to a cover, awning, roof, sunshade, and/or shelter for protecting a region below the canopy from environmental elements, such as rain, wind, and/or sun. A canopy may include a frame made of stiff material, such as metal and/or wood for supporting a covering material, such as fabric (e.g. canvas), plastic, vinyl, fiberglass, bamboo, wood, and/or resin. In some embodiments, a canopy may be made of sheet metal approximately 8 mm thick or approximately 6 mm thick. A canopy for shading at least a portion of a bench refers to an awning and/or cover located above at least a portion of a bench for blocking the portion of the bench from exposure to sunlight. A portion of a bench shaded by a canopy may change throughout the day as an angle of the sun relative to the bench changes. A canopy configured for connecting to a support pole for shading at least a portion of a bench refers to a canopy attached to a support pole associated with a bench in a manner to cast a shadow over at least part of the bench during at least a part of the day. In some embodiments, a canopy may be connected to an upper portion of a support pole and a bench may be connected to a lower portion of the support pole at similar orientations relative to the support pole, such that the canopy may spread and/or extend over at least a portion of the bench, thereby shading at least a portion of the bench. In some embodiments, a canopy may connect to a support pole at a height for accommodating an individual in a standing pose beneath the canopy. A canopy may be connected to a support pole using one or more screws, bolts, nails, brackets, rivets, clamps, and/or by welding, and/or brazing. Additionally or alternately, a canopy or a frame thereof may be integrally formed with a support pole, e.g., as a solid piece of molded material. In some embodiments, a canopy may include a plurality of brackets for supporting one or more solar collectors thereon. In some embodiments, a canopy may surround a support pole on all sides thereof. In some embodiments, a canopy may be connected to a support pole at a pitch and/or incline to enable drainage of water, ice, and/or snow.

Figure 25:
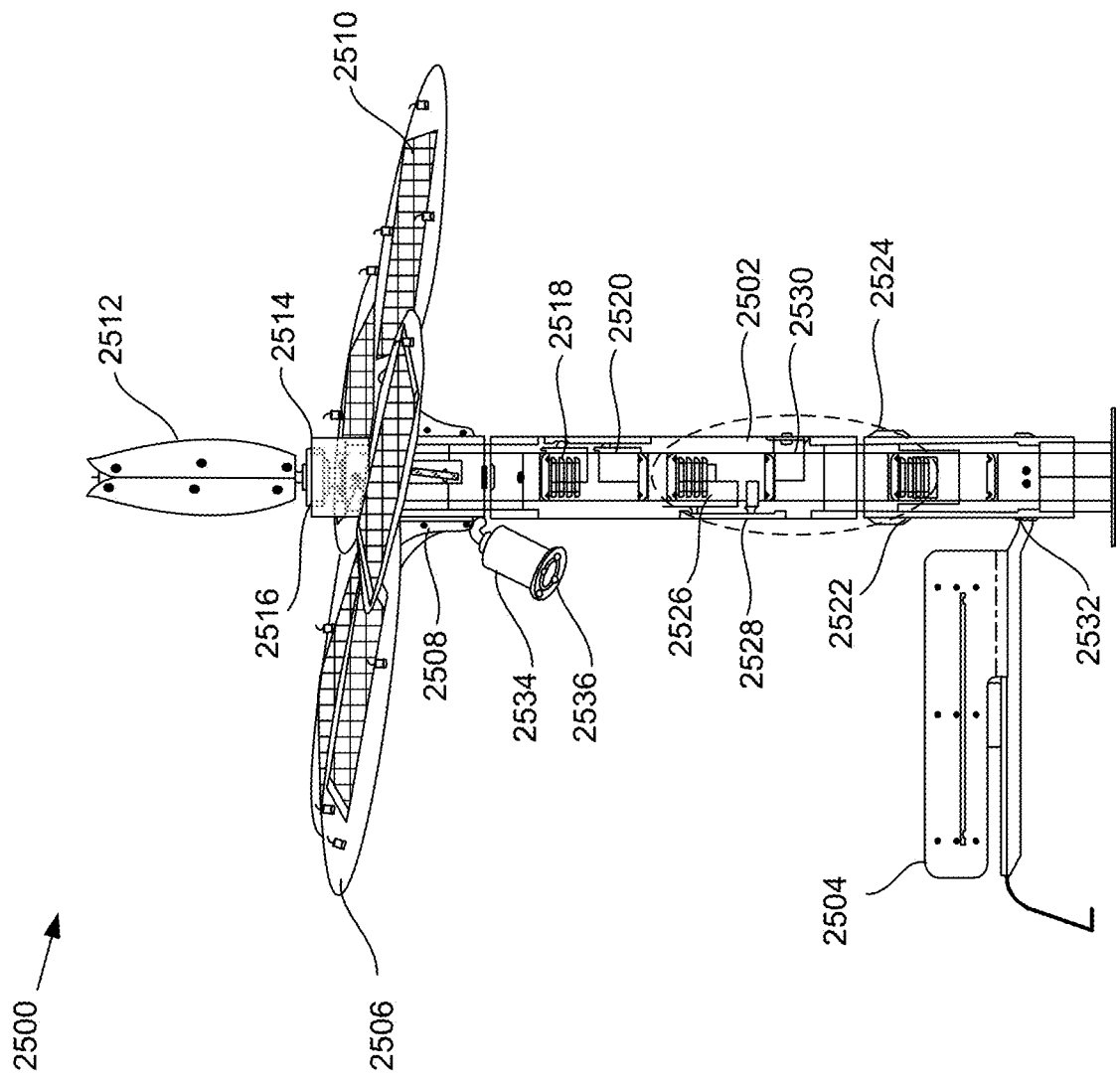
FIG. 25 is an exemplary illustration of a green energy electrical charging station including a bench, consistent with some embodiments of the present disclosure.

By way of a non-limiting example, reference is made to FIG. 25, which is an exemplary illustration of a green energy electrical charging station 2500 including a bench, consistent with some embodiments of the present disclosure. Green energy electrical charging station 2500 may include a support pole 2502, a (e.g., single) bench 2504 connected to and extending from support pole 2502, and a canopy 2506 connected to support pole 2502 for shading at least a portion of bench 2504. Canopy 2506 may be connected to support pole 2502 via one or more brackets 2508 in conjunction with one or more screws, bolts, rivets, and/or any other mechanical connector.

Figure 26:
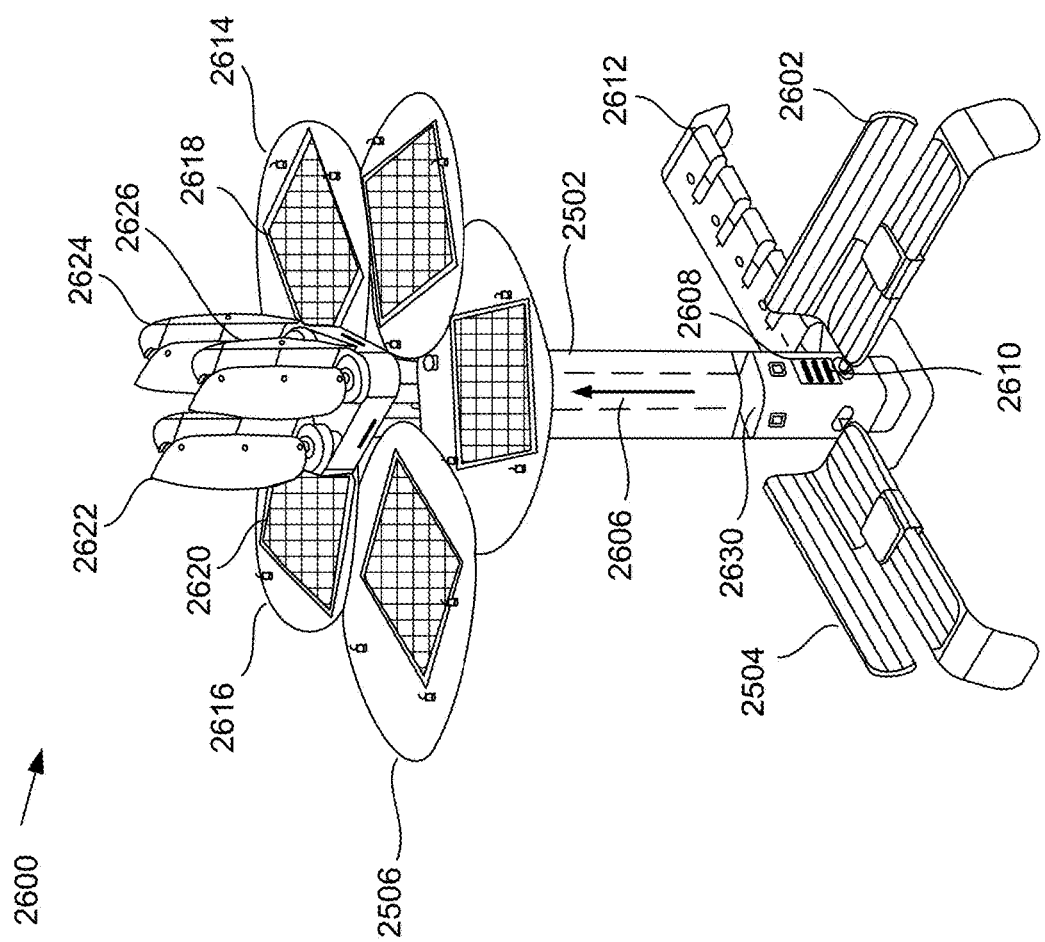
FIG. 26 is an exemplary illustration of a green energy electrical charging station including two benches and a bike rack, consistent with some embodiments of the present disclosure.

By way of another non-limiting example, reference is made to FIG. 26, which is an exemplary illustration of a green energy electrical charging station 2600 including two benches, consistent with some embodiments of the present disclosure. Green energy electrical charging station 2600 may include support pole 2502 connected to bench 2504 on one side thereof. Support pole 2502 may be connected on another side thereof to an additional bench 2602. Benches 2504 and/or 2602 may be connected to support pole 2502 via one or more brackets 2532 (see FIG. 25) in conjunction with one or more screws, bolts, and/or rivets, and/or any other mechanical connector.

Some disclosed embodiments involve at least one solar collector configured for location on at least a portion of the canopy. A solar collector refers to a device for converting solar energy into electrical energy. It may include an assembly of photovoltaic solar cells configured to receive solar energy (e.g., sunlight) and convert the received solar energy into electricity. A solar collector may be arranged on a panel for installing on a surface exposed to sunlight. At least one solar collector for location on at least a portion of a canopy refers to a solar collector configured to be installed and/or affixed on at least part of an awning and/or shade. Locating a solar collector on an upper surface of a canopy may expose the solar collector to sunlight while shading a region beneath the canopy from sunlight. A solar collector may be installed and/or mounted on at least a portion of a canopy using one or more screws, bolts, nails, brackets, rivets, clamps, adhesives, and/or by welding, and/or brazing. In some embodiments, a canopy connected to an upper portion of a support pole may include one or more features (e.g., notches, ridges, holes, slots, grooves, and/or brackets) for mounting one or more solar collectors thereon. In some embodiments, a green energy electric charging station may include at least one processor for applying an MPPT protocol to at least one solar collector to improve energy harvesting efficiency.

Some disclosed embodiments involve at least one wind turbine configured to be supported by the support pole above the canopy. At least one wind turbine (as described elsewhere herein) configured to be supported by a support pole above a canopy refers to a wind turbine mounted on an upper region of a support pole extending above a canopy connected thereto. For example, a bottom end of a support pole may be mounted on the ground. A bench may be connected to the support pole in proximity to the bottom end of the support pole. A canopy may be connected to the support pole at a region above the bench, beneath the upper end of the support pole. At least one wind turbine may be connected to the upper end of the support pole, such that the at least one wind turbine may be located above the canopy, and the canopy may be located above the bench in a manner to cast a shadow over the bench. In some embodiments, a green energy electric charging station may include at least one processor for applying an MPPT protocol to at least one wind turbine to improve energy harvesting efficiency.

By way of a non-limiting example, in FIG. 25, green energy electrical charging station 2500 may include at least one solar collector 2510 located on at least a portion of canopy 2506. At least one solar collector 2510 may be affixed to canopy 2506 using one or more screws, bolts, brackets, clamps, adhesives, and/or any other mechanical connector. Solar collector 2510 may convert solar energy to (e.g., green) electrical energy. Green energy electrical charging station 2500 may additionally include at least one wind turbine 2512 supported by support pole 2502 above canopy 2506. For example, canopy 2506 may connect to support pole 2502 in proximity to, but below an upper end 2514 of support pole 2502, and at least one wind turbine 2512 may connect to upper end 2514 of support pole 2502 using one or more brackets, screws, bolts, rivets, and/or any other mechanical connector. In some embodiments, at least one wind turbine 2512 may connect to upper end 2514 of support pole 2502 via an associated generator 2516. Generator 2516 may convert mechanical motion by wind turbine 2512 to (e.g., green) electrical energy. In some embodiments, green energy electrical charging station 2500 may include at least one processor (e.g., processor 428 of FIG. 4) for implementing an MPPT protocol on at least one wind turbine 2512 and/or at least one solar collector 2510.

Some disclosed embodiments involve at least one battery for electrical association with the at least one solar collector and the at least one wind turbine. Electrical association refers to a direct or indirect connection permitting a flow of electricity therethrough. An electrical association may include one or more wires, contacts, terminals, switches, fuses, relays, circuit breakers, terminal blocks, and/or junction boxes. An electrical associated may additionally include a wireless electrical connection permitting transfer of electricity without wires. A battery (as described elsewhere herein) for electrical association with at least one solar collector and a wind turbine refers to one or more batteries electrically connected to at least one solar collector and at least one wind turbine. Such a battery may store electrical energy generated by the at least one solar collector and the at least one wind turbine. In some embodiments, at least one first battery may be connected to one or more solar collectors for storing electrical energy generated by the one or more solar collectors, and at least one second battery may be connected to one or more wind turbines for DC electrical energy generated by the one or more wind turbines. For example, at least one first battery may be connected to the one or more solar collectors using a first charge controller. The first charge controller may regulate a flow of electrical current generated by the one or more solar collectors to the at least one battery. A first such charge controller may include a first DC-DC converter for adapting a DC signal produced by the one or more solar collectors to a voltage compatible for storage in the at least one first battery, prevent overcharging of the at least one first battery, and/or improve battery charging efficiency. Similarly, at least one second battery may be connected to the one or more wind turbines using a second charge controller. A second such charge controller may include an AC-DC converter for converting an AC signal generated by the one or more wind turbines to a DC signal, and a second DC-DC converter for adapting a DC output of the AC-DC converter to a voltage compatible for storage in the at least one second battery. The second charge controller may prevent overcharging of the at least one second battery, and/or improve battery charging efficiency. In some embodiments, a common battery may be electrically associated with one or more solar collectors and one or more wind turbines.

By way of a non-limiting example, in FIG. 25, green energy electrical charging station 2500 may include at least one battery 2518 electrically associated with at least one solar collector 2510 and/or wind turbine 2512. In some embodiments, green energy electrical charging station 2500 may include at least one (e.g., first) battery 2518 for storing electrical energy generated by at least one wind turbine 2512 and at least one second battery 2520 for storing electrical energy generated by at least one solar collector 2510.

Some disclosed embodiments involve at least one first electrical circuit for delivering electrical power from the at least one wind turbine and the at least one solar collector to the at least one battery. An electrical circuit refers to components forming a closed loop and/or pathway permitting electric current to flow therethrough and transfer electrical energy from one location to another. An electrical circuit may include one or more of a power source, a conductor, a load, a switch, a connector and/or terminal, a protection device, a control device, and/or any other electrical component. Some examples of a power source may include a battery, a solar panel, a wind, water, and/or gas turbine, and/or an electrical grid. Some examples of a conductor may include a wire, a cable, and/or a metal trace on a circuit board. A load may include a battery of an electric vehicle and/or or electronic device. A switch may control a flow of electricity from an energy source to an energy sink, and may include one or more diodes, relays, and/or transistors. A connector and/or terminal may join two or more conductors, and may include a screw and/or spring terminal, a plug connector, and/or a soldered joint. A protection device may include one or more fuses and/or circuit breakers. A control device may include one or more resistors, capacitors, diodes, transistors, controllers, and/or at least one processor for regulating a flow of current in a circuit. Delivering electrical power refers to transferring electrical power, for example, by applying a voltage and/or allowing a flow of current. A first electrical circuit for delivering electrical power from a wind turbine and a solar collector to a battery refers to a first set of electrical components for transferring electrical energy generated by a wind turbine and a solar collector to a battery. Electrical components included in such a first circuit may include, for example, at least one AC-DC converter for converting an AC signal generated by a wind turbine to a DC current for storage in the battery, and one or more DC-DC converters for adapting a DC current produced by a solar collector and/or a wind turbine for storage in a battery. A battery may connect to one or more solar collectors and/or one or more wind turbines via one or more conducting wires, permitting electrical energy generated by the one or more solar collectors and/or wind turbines to flow to the battery for storage. In some embodiments, such an electrical circuit may include one or more switches and/or capacitors to alternately control power delivery from the wind turbine and solar collector to the battery.

By way of a non-limiting example, in FIG. 6, circuit 600 may deliver electrical power from at least one of fluid turbines 404 (e.g., corresponding to wind turbine 2512 in FIG. 25) to battery bank 620 (e.g., corresponding to at least one of batteries 2518 and/or 2520). One or more of circuits 600, 700, and/or 800 of FIGS. 6, 7, and 8, respectively, and/or portions thereof may be included in any of green energy electrical charging stations 2500 and/or 2600.

Figure 27:
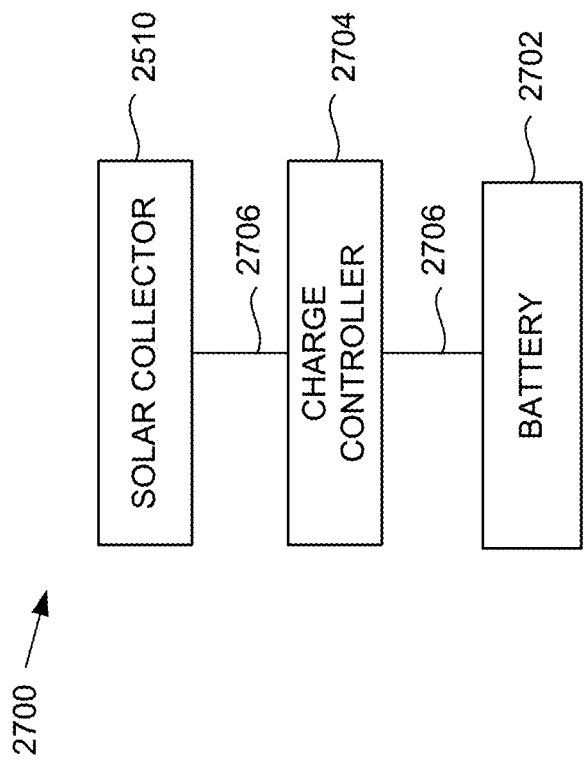
FIG. 27 is a block diagram of the components of an exemplary circuit for delivering electrical power from at least one solar collector to at least one battery, consistent with some embodiments of the present disclosure.

By way of another non-limiting example, reference is made to FIG. 27 which is a schematic diagram of an exemplary circuit 2700 for delivering electrical power from at least one solar collector 2510 to at least one battery 2702, consistent with some embodiments of the present disclosure. At least one battery 2702 may include battery 2518 and/or 2520 of FIG. 25. In some embodiments, circuit 2700 may include a charge controller 2704 for regulating a flow of electric charge from at least one solar collector 2510 to at least one battery 2708. Charge controller 2702 may connect solar collector 2510 to at least one battery 2702 using one or more wires 2706. Thus, electrical energy generated by solar collector 2510 may flow to battery 2708 via charge controller 2702.

Some disclosed embodiments involve at least one electrical outlet for location in proximity to the bench. An electrical outlet refers to a power outlet, wall-type outlet, and/or socket permitting electrical appliances and/or devices to connect to an electrical power source. An electrical outlet may accommodate one or more plugs associated with an electrical appliance and/or device, such that inserting a plug into the electrical outlet causes current to flow from an electrical power source to the electrical appliance and/or device, or a voltage to be applied across the terminals of the electrical appliance and/or device. For example, an electrical outlet may include one or more of a two-pronged plug, a three-pronged plug, a Universal Serial Bus (USB) outlet, an Eaton's Arc Fault Circuit Interrupter (AFCI) outlet, a Ground Fault Circuit Interrupter (GFCI) outlet, and/or any other type of electrical outlet. An electrical outlet located in proximity to a bench refers to an electrical outlet positioned sufficiently close to a bench to permit an individual resting on the bench to plug an appliance and/or device into the electrical outlet. For example, a distance separating an electrical outlet from a bench may be less than a length of a typical cable for charging an electrical appliance and/or device, e.g., less than a meter, less than three quarters of a meter, and/or less than half a meter.

Some disclosed embodiments involve at least one second electrical circuit for delivering electrical power from the at least one battery to the at least one electrical outlet. An electrical circuit for delivering electrical power from a battery to an electrical outlet refers to a second set of electrical components for transferring electricity stored in a battery to an electrical outlet, such that plugging an appliance and/or device into the electrical outlet completes a circuit, permitting electricity to flow to the appliance and/or device. For example, an electrical outlet may connect to one or more batteries via one or more conducting wires, permitting electrical energy stored in the one or more batteries to flow towards the electrical outlet upon connection of a load thereto. Plugging in an appliance and/or device (e.g., a load) into the electrical outlet may connect the load, thereby closing the second circuit and permitting electricity to flow from the battery to the appliance and/or device. In some embodiments, an electrical circuit for delivering power from a battery to an electrical outlet may include one or more DC-DC converters for modifying a voltage stored in the battery to a voltage in compliance with one or more electrical appliances and/or devices. In some embodiments, the at least one battery may include a plurality of batteries, and an electric circuit delivering electric power from the plurality of batteries to one or more electrical outlets may include a switch and an associated controller. The controller may selectively channel current from a specific battery, e.g., based on an amount of charge stored in each battery. In some instances, a controller may prevent drawing current from a battery when a level of charge stored in the battery is below a threshold value.

By way of a non-limiting example, in FIG. 25, green energy electrical charging station 2500 may include at least one electrical outlet 2522 located in proximity to bench 2504. At least one electrical outlet 2522 may be located on an outer face of a lower portion of support pole 2502 in proximity to bench 2504. In some embodiments, a distance between at least one electrical outlet 2522 and bench 2504 may be less than a length of a standard charging cable (e.g., less than 1 meter, or less than 0.5 meters). In some embodiments, electrical outlet 2522 may include a USB outlet for charging a mobile communications device using a USB cable. Green energy electrical charging station 2500 may additionally include at least one second electrical circuit 2524 for delivering electrical power from the at least one of batteries 2518 and/or 2520 to at least one electrical outlet 2522. Second circuit 2524 may include, for example, an electric panel 2526, an inverter 2528, and/or a voltage regulator 2530 for regulating a voltage outputted by at least one battery 2518 and/or 2520 to electrical outlet 2522.

In some disclosed embodiments, the support pole is foldable. Foldable refers to being bendable and/or hinged. A foldable pole may include one or more hinges, pivots, and/or joints at specific points along a length thereof, permitting the pole to be alternately collapsed into a more compact form for easier storage and/or adjustment, and extended for use. In some embodiments, a foldable pole may include one or more locks to secure the foldable pole in a folded and/or extended form.

Figure 28:
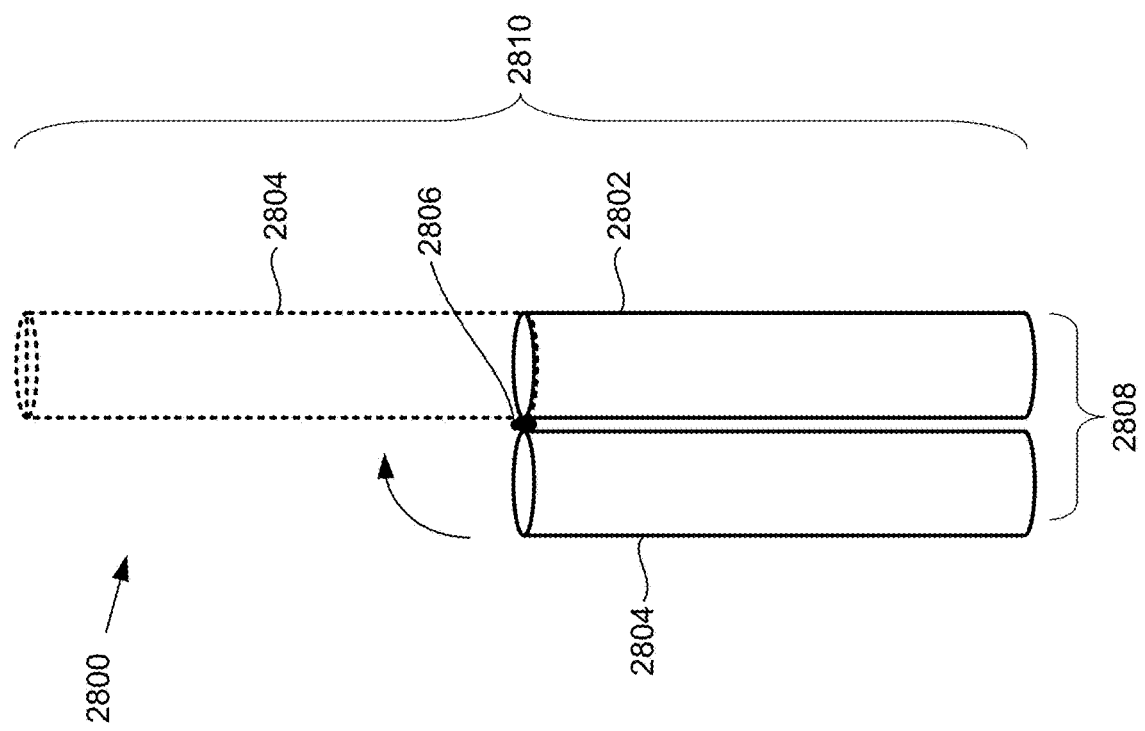
FIG. 28 illustrates an exemplary foldable support pole, consistent with some embodiments of the present disclosure.

Reference is made to FIG. 28 which illustrates an exemplary foldable support pole 2800, consistent with some embodiments of the present disclosure. Foldable support pole 2800 may include a first pole section 2802 and a second pole section 2804 connected with a hinge 2806. Hinge 2806 may permit second pole section 2804 to pivot upwards relative to first pole section 2802 from a folded configuration 2802, thereby stacking second pole section 2804 on top of first pole section 2802 in an upright configuration 2810 (as shown in phantom lines in FIG. 28). In addition, hinge 2806 may permit second pole section to pivot downwards relative to first pole section 2802 from an upright configuration 2810, thereby aligning second pole section 2804 adjacent to first pole section 2802 in folded configuration 2808.

In some disclosed embodiments, the support pole is extendable. Extendable refers to being expandable and/or modular. An extendable pole may include a plurality of sections permitting a length of the pole to be increased or decreased pole by adding and/or removing one or more of the sections. In some embodiments, adjacent sections of an extendable pole may have different diameters at end points thereof, permitting insertion of an end of one pole section into an end of another pole section. In some embodiments, a support pole may include multiple telescopic sections that may slide into one another to extend or retract the length of the pole. The sections may be concentrically nested, with smaller sections fitting inside larger sections. An extendable pole may include one or more connections, such as pins, screws, bolts, springs, and/or any other type of connection for attaching multiple sections together to form a longer support pole. Additionally or alternatively, an extendable pole may include one or more locking mechanisms to secure multiple sections together, such as a twist lock, a push-button lock, and/or a spring-loaded pin.

Figure 29:
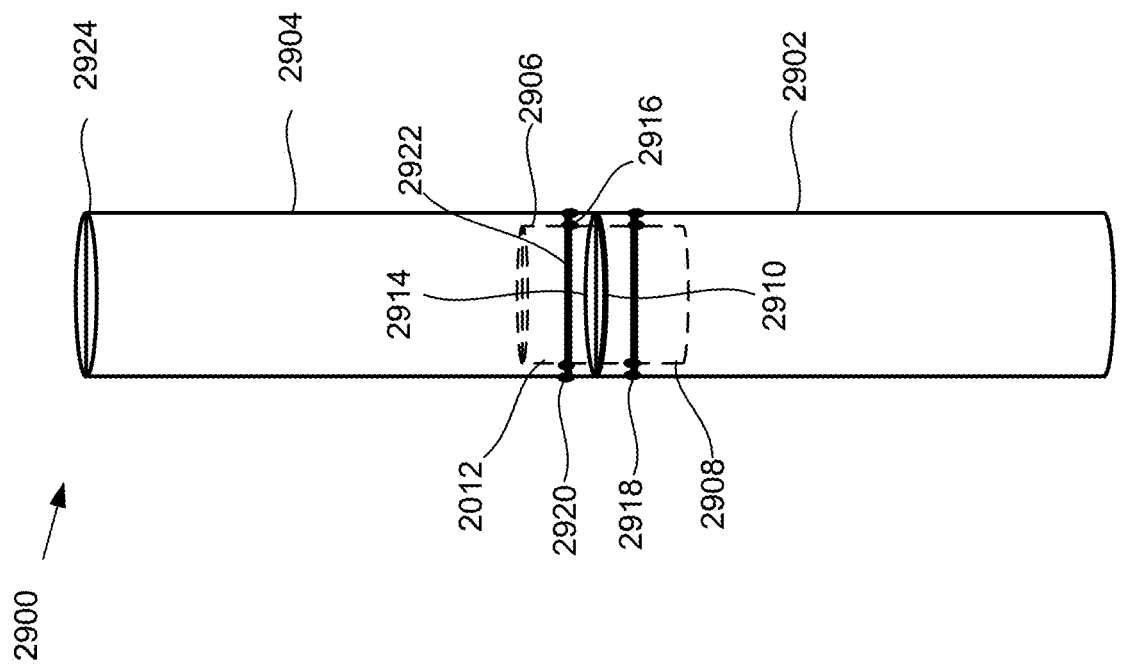
FIG. 29 illustrates an exemplary extendable support pole, consistent with some embodiments of the present disclosure.

Reference is made to FIG. 29 which illustrates an exemplary extendable support pole 2900, consistent with some embodiments of the present disclosure. Extendable support pole 2900 may include a lower pole section 2902 and an upper pole section 2904 connected by a bridging piece 2906. A diameter of bridging piece 2906 may be smaller than diameters of lower pole section 2902 and upper pole section 2904, permitting insertion of a lower portion 2908 of bridging piece 2906 into an upper end 2910 of lower pole section 2902, and insertion of an upper portion 2912 of bridging piece 2906 into a lower end 2914 of upper pole section 2904. Bridging piece 2906 may include a plurality of holes 2916 configured to engage with a plurality of holes 2918 and 2920 of lower pole section 2902 and upper pole section 2904, respectively, using a plurality of pins 2922.

In some disclosed embodiments, the support pole includes at least one channel therein configured to facilitate upward airflow. A channel refers to a conduit, duct, and/or tube permitting fluid flow therethrough. Upward airflow (e.g., vertical airflow) refers to movement of air in a vertical direction, typically from a lower elevation to a higher elevation. Upward airflow may occur naturally due to differences in air temperature, density, and/or pressure, causing hotter air to flow upwards, and colder air to sink downwards. To facilitate refers to advance and/or encourage. A support pole including a channel therein configured to facilitate upward airflow refers to an at least partially hollow support pole permitting hotter air to enter the support pole at a lower section thereof, and rise through the support pole to exit from a higher section thereof. For example, hot air may become trapped under a canopy connected to a support pole, leading to an increase in temperature in a region beneath the canopy. A channel in a support pole permitting upward airflow may facilitate evacuation of heat from beneath the canopy, causing the region under the canopy (e.g., in proximity to a bench and/or a bicycle rack) to cool.

In some disclosed embodiments, the support pole includes at least one service door. A service door refers to an opening, hatch, and/or portal for accessing one or more associated functions and/or services. For example, a support pole may house one or more electronic components associated with a green energy charging station. The one or more electronic components may require periodic servicing, maintenance, and/or replacement. A service door may enable a technician to access the one or more electronic components housed within a support pole without having to dismantle the green energy charging station.

In some disclosed embodiments, the at least one service door is vented. A vented service door refers to a service door including one or more openings permitting airflow therethrough. A vented service door may include one or more slats and/or bars partially enclosing the service door, while leaving one or more openings for airflow. For example, one or more electronic components housed inside a support pole may generate heat during operation. A vented service door may permit some heat to escape from the support pole to prevent an electronic components housed therein from overheating.

By way of a non-limiting example, in FIG. 26, support pole 2502 may include at least one channel 2606 therein configured to facilitate upward airflow. Support pole 2502 may additionally include at least one service door 2608. Service door 2608 may be vented. For example, hot air trapped beneath canopy 2508 may enter channel 2606 of support pole 2502 through vents 2610 of service door 2608, permitting the hot air to escape from an upper end of support pole 2502 (e.g., see upper end 2924 of support pole 2900 in FIG. 29).

In some disclosed embodiments, the bench is configured to be supported on one side thereof by the support pole. A bench supported on one side thereof by a support pole refers to a support pole connected to one side of a bench in a manner to cause the support pole to bear at least some of the weight on the one side of the bench connected thereto. For example, a bench may be connected to one or more legs on one side thereof, and to a support pole on the other side thereof. The one or more legs and the support pole together may exert balancing forces for supporting the bench and one or more individuals sitting thereon. A support pole may support one side of a bench by being connected to the bench via one or more brackets, bars, screws, nuts, bolts, and/or using welding and/or brazing to distribute at least some load associated with the bench onto the support beam. In some embodiments, a bench may be associated with one or more electric outlets for charging one or more electronic devices (e.g., a mobile phone, a smart watch, and/or any other electronic device). The one or more electric outlets may be electrically connected to one or more batteries storing energy generated by the at least one solar collector and/or wind turbine of the green energy charging station. For instance, one or more electric outlets may be disposed on a support pole, in proximity to a bench connected thereto. Additionally or alternatively, one or more electrical outlets may be located on a bench connected to a support pole (e.g., near an arm rest, a back rest, and/or any other part of a bench). In such a case, the bench may be connected to the support pole mechanically for distributing a load, and electrically for receiving power from a battery storing energy generated by a green energy source.

Some disclosed embodiments involve a bicycle rack configured to be supported on one side thereof by the support pole. A bicycle rack refers to a device and/or structure for holding, supporting, and/or locking one or more bicycles and/or scooters when not in use. A bicycle rack may include on or more bars, slats, and/or plates arranged into bike slots for supporting a plurality of bicycles. A bicycle rack configured to be supported on one side thereof by a support pole refers to a support pole connected to one side of a bicycle rack in a manner to cause the support pole to bear at least some of the weight of the bicycle rack connected thereto. A support pole may support one side of a bicycle rack by being connected to the bicycle rack via one or more brackets, bars, screws, nuts, bolts, and/or using welding and/or bracing to distribute at least some load associated with the bicycle rack onto the support pole. For example, a bicycle rack may be connected to a stand and/or supporting leg on one side thereof, and a support pole on the other side thereof. The stand and/or supporting leg and the support pole together may exert balancing forces for supporting the bicycle rack and any bicycles supported thereon in a substantially upright orientation. In some embodiments, a bicycle rack may be associated with one or more electric outlets connected to one or more batteries of a green energy charging station for charging one or more electric bicycles and/or scooters supported thereon. For instance, one or more electric outlets may be located on a support pole connected to a bicycle rack, and/or located on the bicycle rack. Thus, a bicycle rack may be connected to a support pole mechanically for distributing a load, and electrically to permit a flow of electrical energy from one or more batteries located within the support pole to the one or more electric outlets of the bicycle rack.

In some disclosed embodiments, the canopy is sized to at least partially shade the bench, and the bicycle rack. Sized refers to shaped, adapted, fashioned, and/or having dimensions capable of performing an action or a task. A canopy may be shaped and/or fashioned to cover an area for accommodating one or more objects located underneath. A canopy sized to at least partially shade a bench and a bicycle rack refers to a canopy spreading over a sufficient area such that the canopy blocks direct sunlight from reaching at least part of the bench and/or at least part of the bicycle rack. In some embodiments, a canopy may completely block sunlight from directly reaching portions of a bench and/or bicycle rack, and may leave other portions of the bench and/or bicycle rack exposed to direct sunlight. For example, such a canopy may be opaque and may cover a smaller area than an area occupied by a bench and/or bicycle rack. In some embodiments, a canopy may partially block sunlight from directly reaching portions of a bench and/or bicycle rack. For example, such a canopy may include holes, vents, slats, and/or cracks permitting some sunlight to pass through the canopy and reach a bench and/or bicycle rack located underneath. A section of a bench and/or bicycle rack that may be shaded by a canopy may change depending on the time of day.

Some disclosed embodiments involve an additional bench, and wherein the support pole is configured to support two benches. An additional bench refers to another bench (as described earlier), such that a green energy charging station may include two or more benches. A support pole configured to support two benches refers to a support pole connected to two benches in a manner to distribute loads associated with the two benches and one or more individuals resting thereon. In some embodiments, a support pole may support a first bench on one side thereof, and a second bench on another side thereof. The first bench and the second bench may be oriented at 90 degrees, 180 degrees, and/or at any other orientation relative to each other. In some embodiments, a support pole may support two benches arranged side-by-side on one side of a support pole. A support pole may be connected to the additional bench as described above, e.g., using one or more screws, bolts, nails, brackets, clamps, adhesives, nails, and/or using brazing and/or welding.

By way of a non-limiting example, in FIG. 25, bench 2504 may be supported on one side thereof by support pole 2502, e.g., using one or more brackets 2532, screws, and/or bolts. By way of another non-limiting example, in FIG. 26, green energy electrical charging station 2600 may include a bicycle rack 2612 supported on one side thereof by support pole 2502, e.g., using one or more brackets, screws, and/or bolts. Canopy 2506 may be sized to at least partially shade bench 2504, and bicycle rack 2612. In some embodiments, support pole 2502 may support two benches, and green energy electrical charging station 2600 may include additional bench 2602. Additional bench 2602 may be connected to support pole 2502 on one side thereof, similar to bench 2504. Similarly, canopy 2506 may be sized to at least partially shade bench 2504, additional bench 2602, and bicycle rack 2612.

In some disclosed embodiments, the at least one battery is located internal to the support pole. A battery located internal to a support pole refers to a battery held, propped, and/or braced inside an inner volume of a support pole. For example, a support pole may be sized to have sufficient volume therein to accommodate one or more batteries. The support pole may include one or more shelves, rails, screws, bolts, nails, brackets, hooks, clamps, and/or any other type of connector to support one or more batteries therein. In some embodiments, at least one charge controller may be located internal to a support pole, in association with at least one battery. In some embodiments, a battery and/or charge controller located internal to a support pole may be additionally located in proximity to a service door, to enable performance of servicing, maintenance, and/or replacement by a technician.

In some disclosed embodiments, the at least one first electrical circuit is located at least partially internal to the support pole. A first electrical circuit located at least partially internal to a support pole refers to storing and/or keeping at least some electronic components of an electrical circuit conveying electrical energy from at least one solar collector and/or at least one wind turbine to a battery located inside a support pole. For example, the first circuit may include components (e.g., wiring) located external to a support pole for conveying electrical energy generated by at least one solar collector and/or wind turbine supported thereon to an inner volume of the support pole, and components (e.g., wiring, resistors, inductors, capacitors) located internal to the support pole for conveying the electrical energy to a battery stored therein. In some embodiments, a support pole may include one or more openings at an upper end thereof for accommodating one or more wires associated with the first circuit. For example, one or more wires and/or cables may transfer current generated by one or more green energy sources located external to the support pole to electronic components located internal to the support pole. Some examples of components associated with the first circuit that may be located internal to the support pole may include an AC-DC converter (e.g., a rectifier), one or more switches and an associated controller for selectively channeling current from a specific green energy source to a specific battery, one or more adapters (e.g., DC-DC converters) for conforming an electric signal generated by a green energy source to a range in compliance with one or more batteries, and/or any other electronic component for delivering current from one or more green energy sources for storing in one or more batteries.

In some disclosed embodiments, the at least one second electrical circuit is located at least partially internal to the support pole. A second electrical circuit located at least partially internal to a support pole refers to at least some electronic components of an electrical circuit mounted, positioned, or otherwise maintained wholly or partially within the support pole. Such as circuit may convey electrical energy from one or more batteries located inside a support pole to one or more outlets located external to the support pole. For example, the second circuit may include at least some components (e.g., wiring, resistors, inductors, capacitors) located internal to a support pole for conveying electrical energy stored in at least one battery housed inside the support pole to an electrical outlet disposed on an external wall thereof, e.g., using one or more racks, rails, hooks, screws, bolts, clamps, shelves, brackets, and/or any other type of mechanical connector. Some examples of components associated with the second circuit that may be located internal to the support pole may include a switch and an associated controller for selectively channeling current from a specific battery to one or more outlets, as described earlier, one or more adapters, converters, and/or any other electronic component for delivering current from one or more batteries to charge one or more electronic devices.

By way of a non-limiting example, in FIG. 25, battery 2518 and/or battery 2520 may be located internal to support pole 2502. Second electrical circuit 2524 may be located at least partially internal to support pole 2502. By way of another non-limiting example, in FIG. 27, at least one first electrical circuit 2700 may be located at least partially internal to support pole 2502. Second circuit 2524 may include electric panel 2526, inverter 2528, and/or a voltage regulator 2530 for regulating a voltage outputted by at least one battery 2518 and/or 2520 to electrical outlet 2522.

In some disclosed embodiments, the canopy includes a plurality of overlapping panels, wherein the at least one solar collector includes at least two solar collectors each located on differing ones of the plurality of overlapping panels. Overlapping refers to at least partially super-imposed and/or at least partially covering. A plurality of overlapping panels may be arranged such that some of the panels at least partially cover other ones of the panels. Overlapping panels may permit constructing a canopy from multiple smaller panels which may facilitate storage and/or transporting of the canopy, and may permit adapting a size of the canopy by adding and/or removing one or more panels, while preventing seepage of environmental elements through the canopy, thereby sheltering a space underneath. Some environmental elements that may be prevented from seeping through a canopy including a plurality of overlapping panels may include rain, snow, ice, wind, and/or sunlight.

By way of a non-limiting example, in FIG. 26, canopy 2506 may include a plurality of overlapping panels, e.g., panels 2614 and 2616. For example, at least a portion of panel 2614 may cover a portion of panel 2616. At least one solar collector 2510 in FIG. 25 may include at least two solar collectors 2618 and 2620. Each of solar collectors 2618 and 2620 may be located on a different one of overlapping panels 2614 and 2616, respectively.

In some disclosed embodiments, the at least one wind turbine includes at least two wind turbines. At least two wind turbines refers to more than one wind turbine. For example, a green energy charging station may include two, three, four, or more than four wind turbines. In some disclosed embodiments, the at least two wind turbines are vertical axis wind turbines arranged for fluid coupling therebetween. Vertical axis wind turbines arranged for fluid coupling therebetween refers to vertical axis wind turbines (as described elsewhere herein) positioned sufficiently close to each other to enable wind outputted by an upstream one of the vertical axis wind turbines to impact operation of a downstream one of the vertical axis fluid turbines. Turbulence and/or wind generated by an upstream wind turbine may affect one or more of a rotational speed, a rotational direction, a power output, a vibration and/or any other operational aspect of a downstream turbine. In some embodiments, at least one processor may control rotation of at least two fluidly coupled wind turbines to positively affect an aggregate power output. For example, at least one processor may apply an MPPT protocol to improve turbine efficiency under a specific wind speed, and/or adjust a relative phase between an upstream wind turbine fluidly coupled to a downstream wind turbine to cause air pushed by a blade of the upstream wind turbines to accelerate a blade of the downstream wind turbine, thereby increasing an aggregate power collectively outputted by the upstream and downstream wind turbines. In some embodiments, a support pole of a green energy charging station may support a platform for supporting two or more fluidly coupled vertical axis wind turbines. In some embodiments, at least one processor for controlling two or more fluidly coupled wind turbines may be located inside a support pole of a green energy charging station.

By way of a non-limiting example, in FIG. 26, green energy electrical charging station 2600 may include a plurality of wind turbines 2622, 2624, and 2626. Wind turbines 2622, 2624, and 2626 may be vertical axis wind turbines arranged for fluid coupling therebetween. For example, wind turbines 2622, 2624, and 2626 may be a cluster of geographically associated wind turbines, as described elsewhere herein.

In some disclosed embodiments, at least one of the support pole and the bench and the rack has an associated wireless charging surface. A wireless charging surface refers to a plate and/or sheet capable of transferring electrical power using electromagnetic induction, and without use of a wired connection. A wireless charging surface may include a transmitter coil for generating an alternating magnetic field upon receiving electric current from a power source connected thereto (e.g., a battery of a green energy charging station). Placing an electronic device on the charging surface may cause a receiver coil included in the electronic device to receive the alternating magnetic field generated by the transmitter coil, thereby inducing an electric current in the receiver coil via electromagnetic induction. The electric current may be used to charge a battery of the electronic device, without having to connect the electronic device to a power supply using physical cables and/or connectors. Some examples of electronic devices that may be charged using a wireless charging surface may include a mobile phone, a tablet device, a smartwatch, smart glasses, and/or any other mobile electronic device. For example, at least one of a support pole, a bench, and/or a bicycle rack may include one or more shelves and/or ledges having a charging surface for charging a mobile electronic device.

Some disclosed embodiments involve a security camera and an illumination source associated with the pole. A security camera (e.g., a surveillance camera and/or a closed-circuit television (CCTV) camera) refers to at least one image sensor (as described elsewhere herein) for monitoring and/or recording activities in a specific area for safety and/or surveillance purposes. A security camera included in a charging station may store one or more images in a memory device to allow recording and/or monitoring of activities in proximity to the charging station. For example, a security camera may record activities relating to sabotage, theft, and/or vandalism in association with a green energy charging station. In some embodiments, a green energy charging station may include a first security camera for monitoring a first region associated with a bench connected to a support pole of a green energy charging station, and a second security camera for monitoring a second region associated with a bicycle rack connected to the support pole of the green energy charging station. An illumination source refers to a device capable of emitting light. Some examples of illumination sources may include light emitting diodes (LEDs), Organic Light Emitting Diodes (OLEDs), Solid-State Lighting (SSL), Electroluminescent Panels (ELs), Plasma lighting, incandescent lighting, and/or fluorescent lighting. Placing an illumination source in proximity to a security camera may enable the security camera to capture images and/or record activities at night and/or under shady and/or cloudy conditions. In some embodiments, a green energy charging station may include a first illumination source associated with a first camera for monitoring a first region associated with a bench, and a second illumination source associated with a second camera for monitoring a second region associated with a bicycle rack.

In some disclosed embodiments, the security camera and the illumination source are configured to receive electrical power from the at least one battery. Receiving electrical power from the at least one battery refers to receiving a flow of current and or a voltage from a power source such as a battery. The security camera and/or illumination source may receive the flow of current or the voltage by being electrically connected to at least one battery using one or more wires, adapters (e.g., DC-DC converters), switches, and/or any other electrical component. Thus, a green energy charging station may use energy harvested by one or more green energy sources to power one or more associated electronic components, such as one or more security cameras, one or more illuminations sources, one or more processors, controllers, memory devices, and/or any other electronic component providing functionality to a green energy charging station.

By way of a non-limiting example, in FIG. 26, support pole 2502 of green energy electrical charging station 2600 may include an associated wireless charging surface 2630. In the example, shown, wireless charging surface 2630 may face bench 2504, however this is for illustrative purposes only, and wireless charging surface 2630 and/or an additional wireless charging surface may be associated with any of additional bench 2602 and bicycle rack 2612. Wireless charging surface 2630 may be sized for wireless charging of one or more mobile communications devices. By way of another non-limiting example, in FIG. 25, green energy electrical charging station 2500 may include a security camera 2534 and one or more illumination sources 2536 associated with support pole 2502. For example, illumination sources 2536 may include LEDs integrated with security camera 2534. Security camera 2534 and/or any of illumination sources 2536 may receive electrical power from battery 2518 and/or 2520.

In some disclosed embodiments, the support pole includes a base section for association with the bench, a top section for association with the at least one wind turbine and canopy, and a middle section for interconnecting the base section with the top section. A base section for association with a bench refers to a bottom portion and/or foundation of a support pole for connecting to a bench. A base section of a support pole may include connecting features, such as one or more holes, slots, ridges for supporting a bench thereto using one or more brackets and/or clamps. In some embodiments, a base section of a support pole may include a welded and/or brazed portion connecting a bench thereto. In some embodiments, a base section of a support pole may additionally connect to a bicycle rack. A top section for association with at least one wind turbine and canopy refers to an upper portion of a support pole for connecting to one or more wind turbines and a canopy. A top section of a support pole may include first connecting features (as described earlier) for connecting to a canopy and second connecting features, above the first connecting features, for connecting to one or more wind turbines, located above the canopy. For example, the first connecting features may include a plurality of first brackets for supporting the canopy, and the second connecting features may include a plurality of second brackets for supporting the at least one wind turbine. A middle section for interconnecting the base section with the top section refers to a third section for locating between and attaching to the base section and top section, such that the base section connects to the middle section and the middle section connects to the top section.

Figure 30:
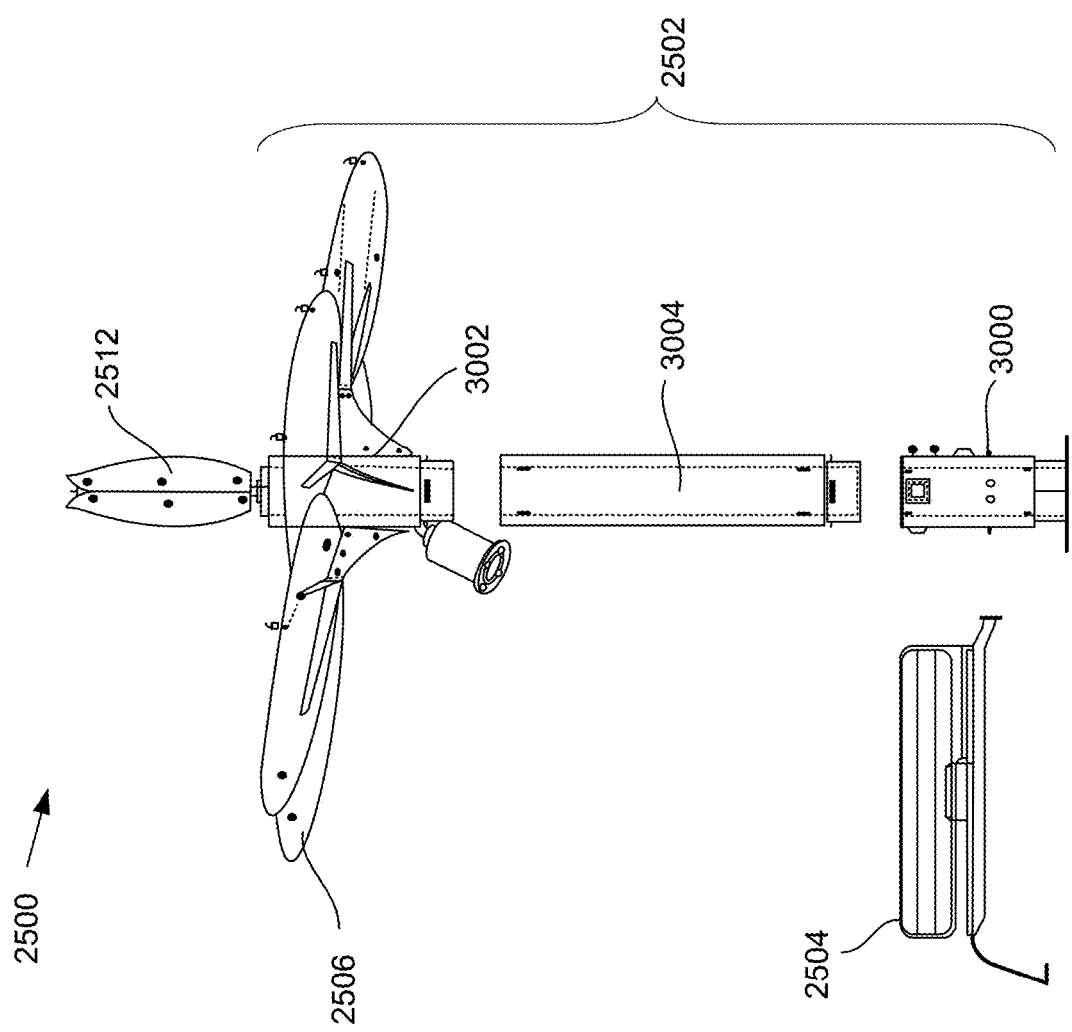
FIG. 30 is an exemplary exploded view of the green energy electrical charging station of FIG. 25, consistent with some embodiments of the present disclosure.

Reference is made to FIG. 30, which illustrates an exemplary exploded view of green energy electrical charging station 2500 of FIG. 25, consistent with some embodiments of the present disclosure. Support pole 2502 may include a base section 3000 for association with bench 2504, a top section 3002 for association with at least one wind turbine 2512 and canopy 2506, and a middle section 3004 for interconnecting base section 3000 with top section 3002. In some embodiments, one or more of base section 3000, middle section 3004, and/or top section 3002 may be connected to each other using one or more hinges for a foldable support pole, as described earlier. In some embodiments, one or more of base section 3000, middle section 3004, and/or top section 3002 may include different sections of an extendable support pole for interconnecting with one or more pins, as described earlier.

Some disclosed embodiments involve at least one third electrical circuit for connectivity to an electrical grid. A third electrical circuit for connectivity to an electrical grid refers to a third set of electronic components for electrical communication between a green energy charging station and an electrical grid, as described elsewhere herein. For example, the third circuit may be used to convey energy generated by one or more green energy sources to an electrical grid during periods of high green energy production and/or low green energy consumption, and/or to convey energy from the electrical grid to one or more batteries of a green energy charging stations during periods of low green energy production and/or high green energy consumption. Some examples of electronic components that may be included in a third circuit connecting a green energy charging station to an electrical grid may include an inverter for converting a DC signal to a grid-compatible AC signal, a rectifier and/or adapter for converting a grid-compatible AC signal to a battery-compatible DC signal, one or more adapters switches, transformers, capacitors, controllers, and/or any other electronic component for connecting a green energy charging station to an electrical grid. In some embodiments, a third electrical circuit for connectivity to an electrical grid may be housed at least partially inside a support pole of a green energy charging station.

Some disclosed embodiments involve a controllable switch configured to alternately toggle between a battery mode of operation and a grid mode of operation. A battery mode of operation refers to a manner and/or set of conditions and/or settings for operating a green energy charging station in association with one or more batteries, independent of an electrical grid. For example, during a battery mode of operation, one or more batteries storing energy generated by one or more green energy sources may supply electricity for charging one or more electric appliances. A grid mode of operation refers to a manner and/or set of conditions and/or settings for operating a green energy charging station in association with an electrical grid. For example, during a grid mode of operation, energy from an electric grid may be delivered for charging one or more electric appliances instead of energy from a green energy source. In some embodiments, a grid mode of operation may include using electrical energy supplied by an electrical grid to charge one or more batteries of a green energy charging station, e.g., instead of using electrical energy generated by one or more associated green energy sources. Thus, one or more batteries may supply electrical energy during both a battery mode of operation and a grid mode of operation, where, in the battery mode of operation, at least some of the supplied energy may originate from one or more associated green energy sources, and in the grid mode of operation, at least some of the supplied energy may originate from an electrical grid. In other words, a controllable switch may alternately toggle between a green-energy mode of operation and a grid mode of operation, where the green-energy mode may involve delivering energy generated by one or more green energy sources, and the grid mode may involve delivering energy supplied by an electrical grid. A switch may refer to an electronic component or device capable of toggling an electrical circuit to interrupt a signal and/or allow a signal to flow uninterrupted (e.g., capable of turning a signal on or off) and/or capable of diverting a signal from one path to at least one other path. An electronic switch may include one or more diodes and/or transistors. A controllable switch may include a switch associated with a trigger signal configured to operate a switch (e.g., by turning the switch on or off). In some embodiments, a controllable switch may include a switch associated with at least one processor. Alternately may refer to capable of changing or switching back and forth, e.g., in succession. To toggle may include to switch, flip, swap, or otherwise change a state. To alternately toggle between a battery mode of operation and a grid mode of operation may include switching back and forth between that battery and grid operation modes, e.g., in response to changing supply of energy from one or more green energy sources and/or demand for energy from a green energy charging station.

For example, at least one processor may receive one or more indications from one or more sensors indicative of supply of energy from one or more green energy sources and/or demand for energy from a green energy charging station. Sensors associated with supplying energy from one or more wind turbines of a green energy charging station may include, for example, one or more of an anemometer, a rotational speed sensor, a voltage and/or current sensor, an image sensor, and/or any other sensor for measuring energy produced by one or more wind turbines, as described elsewhere herein. Sensors associated with supplying energy from one or more solar collectors of a green energy charging station may include, for example, a pyranometer for detecting solar irradiance, one or more photovoltaic cells of a solar collector for measuring an amount of electricity generated in proportion to solar light intensity, and/or any other sensor for measuring energy produced by one or more solar collectors. Sensors associated with supplying energy from one or more batteries of a green energy charging station may include, for example, a coulomb counter, a voltage sensor, a current sensor, and/or any other sensor for measuring a level of electrical energy stored in one or more batteries. Sensors associated with demand for energy from a green energy charging station may include, for example, an electricity meter, a current transformer, a voltage transformer, a power quality analyzer, and/or any other sensor for measuring electrical energy demand. During periods of high energy demand (e.g., mid-day and/or evenings) and/or low green energy supply (e.g., low wind speed and/or dark, overcast, and/or cloudy conditions), the at least one processor may operate the controllable switch to engage the grid mode of operation. During periods of low energy demand (e.g., early morning and/or night-time) and/or high green energy supply (e.g., high wind speed and/or sunny conditions), the at least one processor may operate the controllable switch to engage the battery mode of operation.

Figure 31:
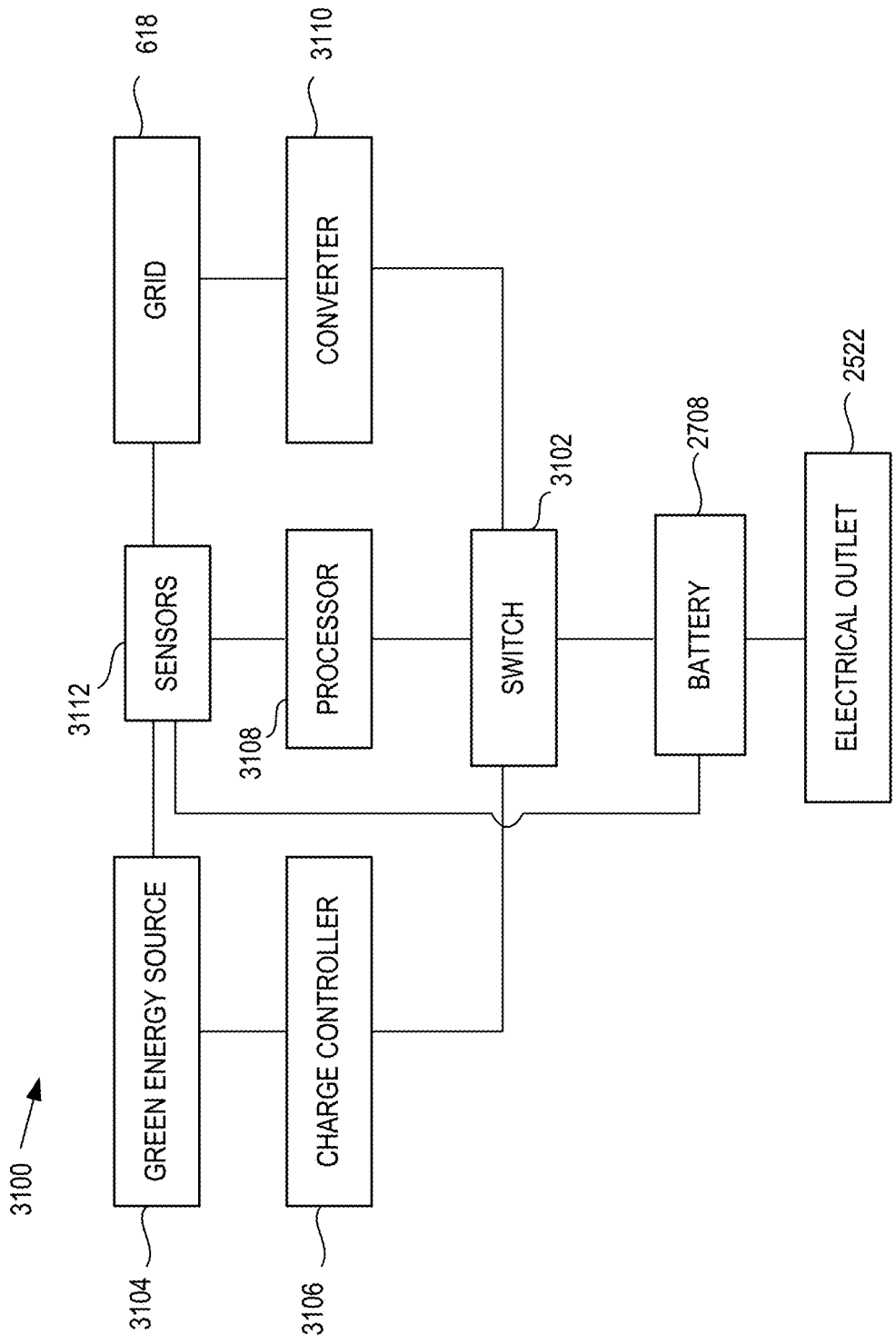
FIG. 31 is an exemplary block diagram of the components of a circuit for connecting at least one outlet of a green energy electrical charging station to an electrical outlet, consistent with some embodiments of the present disclosure.

By way of a non-limiting example, reference is made to FIG. 31 illustrating an exemplary circuit 3100 for connecting at least one outlet of a green energy electrical charging station to an electrical grid, consistent with some embodiments of the present disclosure. Circuit 3100 may include controllable switch 3102 for alternately toggling between a battery mode of operation and a grid mode of operation. For example, electrical energy generated by a green energy source 3104 (e.g., including at least one wind turbine 2512 and/or at least one solar collector 2510 of FIG. 25) may flow to a charge controller 3106. Charge controller 2702 may include circuitry for regulating a flow of electric charge from at least one solar collector 2702 of FIG. 27 (e.g., corresponding to charge controller 2702) and/or for regulating a flow of electric charge from at least one wind turbine 2512 (e.g., corresponding to rectifier 530 of FIGS. 6-8). At least one processor 3108 (e.g., corresponding to processor 428) may receive signals from one or more sensors 3112 (e.g., including any of sensors 418 and/or solar collector 2510) to determine one or more of a supply of green electrical energy by green energy source 3104, and/or a demand of electrical energy associated with electrical outlet 2522. For example, during periods of high green energy supply and/or low energy demand, the at least one processor may operate controllable switch 3102 to channel energy generated by green energy source 3104 to charge battery 2708 (e.g., including battery 2518 and/or battery 2520) for delivery via electrical outlet 2522. During periods of low green energy supply and/or high energy demand, the at least one processor may operate controllable switch 3102 to channel energy from grid 618 via a converter 3110 to charge battery 2708 for delivery via electrical outlet 2522.

Various example embodiments of fluid turbines technology are articulated below in the form of clauses. It is to be understood the term "technology" refers equally to systems (e.g., industrial structures, apparatuses, and charging stations) and methods for operating these systems:

Clause 1. An industrial structure for wind energy harvesting, the structure comprising: an industrial housing requiring venting; a vent outlet in the industrial housing; at least one industrial fan within the industrial housing and associated with the vent outlet for evacuating exhaust from the industrial housing through the vent outlet and for forming an exhaust flow zone outside the industrial housing opposite the vent outlet, the exhaust flow zone being defined by a first boundary extending from the industrial structure on a first side of the vent outlet and a second boundary extending from the industrial structure on a second side of the vent outlet; and at least one wind turbine positioned external to the vent outlet and including a turbine blade portion and an electric generator; wherein the at least one wind turbine is positioned with respect to the vent outlet such that during each rotational cycle, the blade portion of the at least one wind turbine is partially within the exhaust flow zone and partially outside the exhaust flow zone straddling the first boundary.

Clause 2. The technology of clause 1, wherein the at least one wind turbine includes an additional wind turbine positioned with respect to the vent outlet such that during each rotational cycle, a blade portion of the additional wind turbine is partially within the exhaust flow zone and partially outside the exhaust flow zone straddling the second of the boundaries.

Clause 3. The technology of each preceding clause, wherein a gap exists between the at least one wind turbine and the additional wind turbine in the exhaust flow zone to thereby enable exhaust from the vent outlet to pass between the at least one wind turbine and the additional wind turbine.

Clause 4. The technology of each preceding clause, where the exhaust flow zone has a width, and wherein the gap spans at least a quarter of the width.

Clause 5. The technology of each preceding clause, where the exhaust flow zone has a width between the first boundary and the second boundary, and wherein the gap spans at least a third of the width.

Clause 6. The technology of each preceding clause, wherein the first wind turbine is a vertical axis wind turbine and the second wind turbine is a horizontal axis wind turbine.

Clause 7. The technology of each preceding clause, wherein the first wind turbine is a vertical axis wind turbine and the second wind turbine is a vertical axis wind turbine.

Clause 8. The technology of each preceding clause, wherein during each rotational cycle, for no greater than one half of the rotational cycle, the turbine blade portion is within the exhaust flow zone.

Clause 9. The technology of each preceding clause wherein the at least one wind turbine includes no more than two blades.

Clause 10. The technology of each preceding clause, wherein during each rotational cycle, for no greater than three quarters of the rotational cycle, the turbine blade portion is within the exhaust zone.

Clause 11. The technology of each preceding clause, wherein the at least one wind turbine includes a first blade and a second blade, the first blade being at least partially nested within a space defined by the second blade.

Clause 12. The technology of each preceding clause, wherein, during each rotational cycle, for no greater than one quarter of the rotational cycle, the turbine blade portion is within the exhaust zone.

Clause 13. The technology of each preceding clause, wherein the at least one wind turbine includes at least three blades.

Clause 14. The technology of each preceding clause, where the exhaust flow zone is defined by a height and a width, and wherein an upper edge of the exhaust flow zone corresponds to upper edge location of the turbine blade portion.

Clause 15. The technology of each preceding clause, where the exhaust flow zone is defined by a height and a width, and wherein upper edge locations of the turbine blade portion are below the exhaust flow zone height.

Clause 16. The technology of each preceding clause, where the exhaust flow zone is defined by a height and a width, and wherein upper edge locations of the turbine blade portion extends beyond the height by no more than 10% of the height.

Clause 17. The technology of each preceding clause, wherein the vent outlet is louvered.

Clause 18. The technology of each preceding clause, wherein the industrial housing is a building containing machinery, and wherein the vent outlet is located in an exterior wall of the building.

Clause 19. The technology of each preceding clause, wherein the industrial housing is part of an HVAC system, and wherein the vent outlet is associated with a heat exchanger of the HVAC system.

Clause 20. The technology of each preceding clause, wherein the industrial housing is a frame of a water chiller, and wherein the vent outlet is located in the frame of the water chiller.

Clause 21. The technology of each preceding clause, wherein the industrial housing is part of an air conditioning system, and wherein the vent outlet is part of the air conditioning system.

Clause 22. The technology of each preceding clause, wherein the industrial housing is a parking garage, and wherein the industrial fan is configured to evacuate gases from the parking garage.

Clause 23. The technology of each preceding clause, wherein the first boundary and the second boundary extend orthogonally from opposing edges of the vent.

Clause 24. The technology of each preceding clause, wherein the first boundary and the second boundary are defined by kinetic energy such that kinetic energy of exhaust flow on sides of the first boundary and the second boundary opposite the exhaust flow zone is less than 10% of the kinetic energy in a center of the exhaust flow zone at a location of the at least one turbine.

Clause 25. The technology of each preceding clause, wherein the first boundary and the second boundary are defined by kinetic energy such that kinetic energy of exhaust flow on sides of the first boundary and the second boundary opposite the exhaust flow zone is less than 5% of the kinetic energy in a center of the exhaust flow zone at a location of the at least one turbine.

Clause 26. An apparatus for mounting a plurality of green energy sources on a flat roof, the apparatus comprising: a plurality of triangular external roof trusses configured for mounting atop the flat roof, each triangular external roof truss including a pair of upper chords, each upper chord having a proximal end configured to meet another of the pair of upper chords at a peak, and each upper chord having a distal end, and wherein each triangular external roof truss further includes a transversely extending support beam having opposing ends, each opposing end being configured to meet an associated one of the distal ends of the upper chords at a heel location, such that each triangular external roof truss has a pair of heel locations associated therewith; a plurality of heel weight bases, each heel weight base being connectable to an associated one of the plurality of triangular external roof trusses at an associated heel location, and each heel weight base being configured to lie on the flat roof for securing the associated heel location of the associated triangular external roof truss to the flat roof; a plurality of vertical support beams, each vertical support beam being configured to project from an associated one of the transversely extending support beams through and beyond the peak, wherein a portion of each vertical support beam beyond the peak is configured to support a wind turbine; and a scaffold structure for maintaining the plurality of triangular external roof trusses at a spaced distance from each other, the spaced distance being selected such that adjacent ones of the plurality of upper chords are enabled to support at least one solar panel thereon at an acute angle relative to the flat roof.

Clause 27. The technology of each preceding clause, wherein each transversely extending support beam is constructed of multiple bars.

Clause 28. The technology of each preceding clause, wherein the multiple bars are pivotably connectable to each other to enable the transversely extending support beam to assume a non-linear configuration.

Clause 29. The technology of each preceding clause, wherein each pair of upper chords is configured to be adjustably connected to an associated one of the plurality of vertical support beams, to thereby permit an angle of the associated vertical support beam to be adjusted relative to a pitch of the flat roof, thereby enabling vertical support of an associated wind turbine.

Clause 30. The technology of each preceding clause, wherein the pivotable connection and the adjustable connection are achieved with a tightenable fastener to thereby enable the adjusted angle of the associated vertical support beam to be fixed.

Clause 31. The technology of each preceding clause, wherein the each of the plurality of upper chords includes a plurality of connection locations at proximal ends thereof for connection to an associated one of the plurality of vertical support beams, such that each of the plurality of connection locations corresponds to a differing angle of the associated vertical support beam relative to the flat roof pitch.

Clause 32. The technology of each preceding clause, wherein each connection location is associated with a hole.

Clause 33. The technology of each preceding clause, wherein the transversely extending support beam is constructed of a single bar having a central adjustment slot therein for connection to an associated one of the plurality of vertical support beams.

Clause 34. The technology of each preceding clause, wherein each of the plurality of heel weight bases includes a container configured to hold weights therein.

Clause 35. The technology of each preceding clause, wherein each of the containers includes a cover for mitigating environmental degradation of weights within the container.

Clause 36. The technology of each preceding clause, wherein each container is sized to hold a plurality of roof tiles therein.

Clause 37. The technology of each preceding clause, wherein the container includes an adjustable cover for enabling a volume of the container to be adjustable.

Clause 38. The technology of each preceding clause, wherein the adjustable cover includes at least one slot therein and the container includes at least one adjustable fastener therein such that the adjustable cover is enabled to be adjusted to a volume of container contents and secured in place with the at least one adjustable fastener.

Clause 39. The technology of each preceding clause, wherein the at least one adjustable fastener is further arranged to secure an associated container to an associated one of the plurality of triangular external roof trusses.

Clause 40. The technology of each preceding clause, wherein the plurality of weight bases each include a slip-reducing material on an undersurface thereof.

Clause 41. The technology of each preceding clause, wherein each triangular external roof truss further includes a plurality of web members, each web member configured for extending between and interconnecting at least one of the plurality of upper chords with the transversely extending support beam.

Clause 42. The technology of each preceding clause, wherein the scaffold structure includes a plurality of crossbars for interconnecting the plurality of vertical support beams.

Clause 43. The technology of each preceding clause, further including at least one additional vertical support beam disassociated with the plurality of triangular external roof trusses, for supporting an additional wind turbine.

Clause 44. The technology of each preceding clause, further comprising a plurality of wind turbines, each wind turbine being connectable to an associated one of the plurality of vertical support beams.

Clause 45. The technology of each preceding clause, wherein each wind turbine is a vertical axis wind turbine.

Clause 46. The technology of each preceding clause, further comprising a plurality of solar panels, each of the plurality of solar panels being mountable on adjacent upper chords.

Clause 47. A green energy electrical charging station, comprising: a support pole; a bench configured for connecting to and extending from the support pole; a canopy configured for connecting to the support pole for shading at least a portion of the bench; at least one solar collector configured for location on at least a portion of the canopy; at least one wind turbine configured to be supported by the support pole above the canopy; at least one battery for electrical association with the at least one solar collector and the at least one wind turbine; at least one first electrical circuit for delivering electrical power from the at least one wind turbine and the at least one solar collector to the at least one battery; at least one electrical outlet for location in proximity to the bench; and at least one second electrical circuit for delivering electrical power from the at least one battery to the at least one electrical outlet.

Clause 48. The technology of each preceding clause, wherein the support pole is foldable.

Clause 49. The technology of each preceding clause, wherein the support pole is extendable.

Clause 50. The technology of each preceding clause, wherein the support pole includes at least one channel therein configured to facilitate upward airflow.

Clause 51. The technology of each preceding clause, wherein the support pole includes at least one service door.

Clause 52. The technology of each preceding clause, wherein the at least one service door is vented.

Clause 53. The technology of each preceding clause, wherein the bench is configured to be supported on one side thereof by the support pole.

Clause 54. The technology of each preceding clause, further comprising a bicycle rack configured to be supported on one side thereof by the support pole.

Clause 55. The technology of each preceding clause, wherein the canopy is sized to at least partially shade the bench, and the bicycle rack.

Clause 56. The technology of each preceding clause, further comprising an additional bench, and wherein the support pole is configured to support two benches.

Clause 57. The technology of each preceding clause, wherein the at least one battery is located internal to the support pole.

Clause 58. The technology of each preceding clause, wherein the at least one first electrical circuit is located at least partially internal to the support pole.

Clause 59. The technology of each preceding clause, wherein the at least one second electrical circuit is located at least partially internal to the support pole.

Clause 60. The technology of each preceding clause, wherein the canopy includes a plurality of overlapping panels, wherein the at least one solar collector includes at least two solar collectors each located on differing ones of the plurality of overlapping panels.

Clause 61. The technology of each preceding clause, wherein the at least one wind turbine includes at least two wind turbines.

Clause 62. The technology of each preceding clause, wherein the at least two wind turbines are vertical axis wind turbines arranged for fluid coupling therebetween.

Clause 63. The technology of each preceding clause, wherein at least one of the support pole and the bench and the rack has an associated wireless charging surface.

Clause 64. The technology of each preceding clause, further comprising a security camera and an illumination source associated with the support pole.

Clause 65. The technology of each preceding clause, wherein the security camera and the illumination source are configured to receive electrical power from the at least one battery.

Clause 66. The technology of each preceding clause, wherein the support pole includes a base section for association with the bench, a top section for association with the at least one wind turbine and canopy, and a middle section for interconnecting the base section with the top section.

Clause 67. The technology of each preceding clause, further comprising at least one third electrical circuit for connectivity to an electrical grid.

Clause 68. The technology of each preceding clause, further comprising a controllable switch configured to alternately toggle between a battery mode of operation and a grid mode of operation.

Disclosed embodiments may include any one of the following bullet-pointed features alone or in combination with one or more other bullet-pointed features, whether implemented as a system (e.g., an industrial structure, an apparatus, and a charging station) and/or method, by at least one processor or circuitry, and/or stored as executable instructions on non-transitory computer readable media or computer readable media.

- an industrial structure for wind energy harvesting.
- an industrial housing requiring venting.
- a vent outlet in the industrial housing.
- at least one industrial fan within the industrial housing and associated with the vent outlet for evacuating exhaust from the industrial housing through the vent outlet and for forming an exhaust flow zone outside the industrial housing opposite the vent outlet,
- the exhaust flow zone being defined by a first boundary extending from the industrial structure on a first side of the vent outlet and a second boundary extending from the industrial structure on a second side of the vent outlet.
- at least one wind turbine positioned external to the vent outlet and including a turbine blade portion and an electric generator.
- the at least one wind turbine is positioned with respect to the vent outlet such that during each rotational cycle, the blade portion of the at least one wind turbine is partially within the exhaust flow zone and partially outside the exhaust flow zone straddling the first boundary.
- the at least one wind turbine includes an additional wind turbine positioned with respect to the vent outlet such that during each rotational cycle, a blade portion of the additional wind turbine is partially within the exhaust flow zone and partially outside the exhaust flow zone straddling the second of the boundaries.
- a gap exists between the at least one wind turbine and the additional wind turbine in the exhaust flow zone to thereby enable exhaust from the vent outlet to pass between the at least one wind turbine and the additional wind turbine.
- the exhaust flow zone has a width, and wherein the gap spans at least a quarter of the width.
- the exhaust flow zone has a width between the first boundary and the second boundary, and wherein the gap spans at least a third of the width.
- the first wind turbine is a vertical axis wind turbine and the second wind turbine is a horizontal axis wind turbine.
- first wind turbine is a vertical axis wind turbine and the second wind turbine is a vertical axis wind turbine.
- during each rotational cycle, for no greater than one half of the rotational cycle, the turbine blade portion is within the exhaust flow zone.
- the at least one wind turbine includes no more than two blades.
- during each rotational cycle, for no greater than three quarters of the rotational cycle, the turbine blade portion is within the exhaust zone.
- the at least one wind turbine includes a first blade and a second blade, the first blade being at least partially nested within a space defined by the second blade.
- during each rotational cycle, for no greater than one quarter of the rotational cycle, the turbine blade portion is within the exhaust zone.
- the at least one wind turbine includes at least three blades.
- the exhaust flow zone is defined by a height and a width, and wherein an upper edge of the exhaust flow zone corresponds to upper edge location of the turbine blade portion.
- the exhaust flow zone is defined by a height and a width, and wherein upper edge locations of the turbine blade portion are below the exhaust flow zone height.
- the exhaust flow zone is defined by a height and a width, and wherein upper edge locations of the turbine blade portion extends beyond the height by no more than 10% of the height.
- the vent outlet is louvered.

the industrial housing is a building containing machinery, and wherein the vent outlet is located in an exterior wall of the building.

the industrial housing is part of an HVAC system, and wherein the vent outlet is associated with a heat exchanger of the HVAC system.

the industrial housing is a frame of a water chiller, and wherein the vent outlet is located in the frame of the water chiller.

the industrial housing is part of an air conditioning system, and wherein the vent outlet is part of the air conditioning system.

the industrial housing is a parking garage, and wherein the industrial fan is configured to evacuate gases from the parking garage.

the first boundary and the second boundary extend orthogonally from opposing edges of the vent.

the first boundary and the second boundary are defined by kinetic energy such that kinetic energy of exhaust flow on sides of the first boundary and the second boundary opposite the exhaust flow zone is less than 10% of the kinetic energy in a center of the exhaust flow zone at a location of the at least one turbine.

the first boundary and the second boundary are defined by kinetic energy such that kinetic energy of exhaust flow on sides of the first boundary and the second boundary opposite the exhaust flow zone is less than 5% of the kinetic energy in a center of the exhaust flow zone at a location of the at least one turbine.

an apparatus for mounting a plurality of green energy sources on a flat roof.

a plurality of triangular external roof trusses configured for mounting atop the flat roof.

each triangular external roof truss including a pair of upper chords.

each upper chord having a proximal end configured to meet another of the pair of upper chords at a peak.

each upper chord having a distal end, and wherein each triangular external roof truss further includes a transversely extending support beam having opposing ends.

each opposing end being configured to meet an associated one of the distal ends of the upper chords at a heel location, such that each triangular external roof truss has a pair of heel locations associated therewith.

a plurality of heel weight bases, each heel weight base being connectable to an associated one of the plurality of triangular external roof trusses at an associated heel location.

each heel weight base being configured to lie on the flat roof for securing the associated heel location of the associated triangular external roof truss to the flat roof.

a plurality of vertical support beams.

each vertical support beam being configured to project from an associated one of the transversely extending support beams through and beyond the peak.

a portion of each vertical support beam beyond the peak is configured to support a wind turbine.

a scaffold structure for maintaining the plurality of triangular external roof trusses at a spaced distance from each other.

the spaced distance being selected such that adjacent ones of the plurality of upper chords are enabled to support at least one solar panel thereon at an acute angle relative to the flat roof.

each transversely extending support beam is constructed of multiple bars.

the multiple bars are pivotably connectable to each other to enable the transversely extending support beam to assume a non-linear configuration.

each pair of upper chords is configured to be adjustably connected to an associated one of the plurality of vertical support beams.

to thereby permit an angle of the associated vertical support beam to be adjusted relative to a pitch of the flat roof, thereby enabling vertical support of an associated wind turbine.

the pivotable connection and the adjustable connection are achieved with a tightenable fastener to thereby enable the adjusted angle of the associated vertical support beam to be fixed.

each of the plurality of upper chords includes a plurality of connection locations at proximal ends thereof for connection to an associated one of the plurality of vertical support beams, such that each of the plurality of connection locations corresponds to a differing angle of the associated vertical support beam relative to the flat roof pitch.

each connection location is associated with a hole.

the transversely extending support beam is constructed of a single bar having a central adjustment slot therein for connection to an associated one of the plurality of vertical support beams.

each of the plurality of heel weight bases includes a container configured to hold weights therein.

each of the containers includes a cover for mitigating environmental degradation of weights within the container.

each container is sized to hold a plurality of roof tiles therein.

the container includes an adjustable cover for enabling a volume of the container to be adjustable.

the adjustable cover includes at least one slot.

the container includes at least one adjustable fastener.

the adjustable cover is enabled to be adjusted to a volume of container contents and secured in place with the at least one adjustable fastener.

the at least one adjustable fastener is further arranged to secure an associated container to an associated one of the plurality of triangular external roof trusses.

the plurality of weight bases each include a slip-reducing material on an undersurface thereof.

each triangular external roof truss further includes a plurality of web members.

each web member configured for extending between and interconnecting at least one of the plurality of upper chords with the transversely extending support beam.

the scaffold structure includes a plurality of cross-bars for interconnecting the plurality of vertical support beams.

the at least one additional vertical support beam disassociated with the plurality of triangular external roof trusses, for supporting an additional wind turbine.

comprising a plurality of wind turbines, each wind turbine being connectable to an associated one of the plurality of vertical support beams.

each wind turbine is a vertical axis wind turbine.

comprising a plurality of solar panels, each of the plurality of solar panels being mountable on adjacent upper chords.

a green energy electrical charging station.

a support pole.

a bench configured for connecting to and extending from the support pole.

a canopy configured for connecting to the support pole for shading at least a portion of the bench.

at least one solar collector configured for location on at least a portion of the canopy.

at least one wind turbine configured to be supported by the support pole above the canopy.

at least one battery for electrical association with the at least one solar collector and the at least one wind turbine.

at least one first electrical circuit for delivering electrical power from the at least one wind turbine and the at least one solar collector to the at least one battery.

at least one electrical outlet for location in proximity to the bench.

at least one second electrical circuit for delivering electrical power from the at least one battery to the at least one electrical outlet.

the support pole is foldable.

the support pole is extendable.

the support pole includes at least one channel therein configured to facilitate upward airflow.

the support pole includes at least one service door.

the at least one service door is vented.

the bench is configured to be supported on one side thereof by the support pole.

comprising a bicycle rack configured to be supported on one side thereof by the support pole.

the canopy is sized to at least partially shade the bench, and the bicycle rack.

comprising an additional bench, and wherein the support pole is configured to support two benches.

the at least one battery is located internal to the support pole.

the at least one first electrical circuit is located at least partially internal to the support pole.

wherein the at least one second electrical circuit is located at least partially internal to the support pole.

the canopy includes a plurality of overlapping panels, wherein the at least one solar collector includes at least two solar collectors each located on differing ones of the plurality of overlapping panels.

the at least one wind turbine includes at least two wind turbines.

the at least two wind turbines are vertical axis wind turbines arranged for fluid coupling therebetween.

at least one of the support pole and the bench and the rack has an associated wireless charging surface.

comprising a security camera and an illumination source associated with the support pole.

the security camera and the illumination source are configured to receive electrical power from the at least one battery.

the support pole includes a base section for association with the bench, a top section for association with the at least one wind turbine and canopy, and a middle section for interconnecting the base section with the top section.

comprising at least one third electrical circuit for connectivity to an electrical grid.

comprising a controllable switch configured to alternately toggle between a battery mode of operation and a grid mode of operation.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof. And other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

The invention claimed is:

1. An apparatus for mounting a plurality of green energy sources on a flat roof, the apparatus comprising:
   a plurality of triangular external roof trusses configured for mounting atop the flat roof, each triangular external roof truss including a pair of upper chords, each upper chord having a proximal end configured to meet another of the pair of upper chords at a peak, and each upper chord having a distal end, and wherein each triangular external roof truss further includes a transversely extending support beam having opposing ends, each opposing end being configured to meet an associated one of the distal ends of the upper chords at a heel location, such that each triangular external roof truss has a pair of heel locations associated therewith;
   a plurality of heel weight bases, each heel weight base being connectable to an associated one of the plurality of triangular external roof trusses at an associated heel location, and each heel weight base being configured to lie on the flat roof for securing the associated heel location of the associated triangular external roof truss to the flat roof;
   a plurality of vertical support beams, each vertical support beam being configured to project from an associated one of the transversely extending support beams through and beyond the peak, wherein a portion of each vertical support beam beyond the peak is configured to support a wind turbine; and a scaffold structure for maintaining the plurality of triangular external roof trusses at a spaced distance from each other, the spaced distance being selected such that adjacent ones of the plurality of upper chords are enabled to support at least one solar panel thereon at an acute angle relative to the flat roof.

2. The apparatus of claim 1, wherein each transversely extending support beam is constructed of multiple bars.

3. The apparatus of claim 2, wherein the multiple bars are pivotably connectable to each other to enable the transversely extending support beam to assume a non-linear configuration.

4. The apparatus of claim 3, wherein each pair of upper chords is configured to be adjustably connected to an associated one of the plurality of vertical support beams, to thereby permit an angle of the associated vertical support beam to be adjusted relative to a pitch of the flat roof, thereby enabling vertical support of an associated wind turbine.

5. The apparatus of claim 4, wherein the pivotable connection and the adjustable connection are achieved with a tightenable fastener to thereby enable the adjusted angle of the associated vertical support beam to be fixed.

6. The apparatus of claim 1, wherein the each of the plurality of upper chords includes a plurality of connection locations at proximal ends thereof for connection to an associated one of the plurality of vertical support beams, such that each of the plurality of connection locations corresponds to a differing angle of the associated vertical support beam relative to the flat roof pitch.

7. The apparatus of claim 6, wherein each connection location is associated with a hole.

8. The apparatus of claim 7, wherein the transversely extending support beam is constructed of a single bar having a central adjustment slot therein for connection to an associated one of the plurality of vertical support beams.

9. The apparatus of claim 1, wherein each of the plurality of heel weight bases includes a container configured to hold weights therein.

10. The apparatus of claim 9, wherein each of the containers includes a cover for mitigating environmental degradation of weights within the container.

11. The apparatus of claim 9, wherein each container is sized to hold a plurality of roof tiles therein.

12. The apparatus of claim 9, wherein the container includes an adjustable cover for enabling a volume of the container to be adjustable.

13. The apparatus of claim 12, wherein the adjustable cover includes at least one slot therein and the container includes at least one adjustable fastener therein such that the adjustable cover is enabled to be adjusted to a volume of container contents and secured in place with the at least one adjustable fastener.

14. The apparatus of claim 13, wherein the at least one adjustable fastener is further arranged to secure an associated container to an associated one of the plurality of triangular external roof trusses.

15. The apparatus of claim 1, wherein the plurality of weight bases each include a slip-reducing material on an undersurface thereof.

16. The apparatus of claim 1, wherein each triangular external roof truss further includes a plurality of web members, each web member configured for extending between and interconnecting at least one of the plurality of upper chords with the transversely extending support beam.

17. The apparatus of claim 1, wherein the scaffold structure includes a plurality of cross-bars for interconnecting the plurality of vertical support beams.

18. The apparatus of claim 1, further including at least one additional vertical support beam disassociated with the plurality of triangular external roof trusses, for supporting an additional wind turbine.

19. The apparatus of claim 1, further comprising a plurality of wind turbines, each wind turbine being connectable to an associated one of the plurality of vertical support beams.

20. The apparatus of claim 19, wherein each wind turbine is a vertical axis wind turbine.

21. The apparatus of claim 1, further comprising a plurality of solar panels, each of the plurality of solar panels being mountable on adjacent upper chords.

* * * * *